(12) United States Patent
Dunlap et al.

(10) Patent No.: US 12,054,336 B1
(45) Date of Patent: *Aug. 6, 2024

(54) BULK BAG BOTTOM AND DISCHARGE ASSEMBLY INCLUDING A REINFORCER

(71) Applicant: AMERIGLOBE, LLC, Lafayette, LA (US)

(72) Inventors: Clifford Dunlap, Baton Rouge, LA (US); Daniel Schnaars, Jr., Lafayette, LA (US); Daniel R. Schnaars, Sr., Lafayette, LA (US)

(73) Assignee: AMERIGLOBE, LLC, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,727

(22) Filed: Apr. 28, 2022

Related U.S. Application Data

(63) Continuation of application No. 17/007,509, filed on Aug. 31, 2020, now Pat. No. 11,319,144.

(Continued)

(51) Int. Cl.
*B65D 88/16* (2006.01)
*B31D 5/00* (2017.01)

(52) U.S. Cl.
CPC ....... *B65D 88/1631* (2013.01); *B31D 5/0034* (2013.01); *B65D 88/1668* (2013.01); *B65D 88/1681* (2013.01)

(58) Field of Classification Search
CPC ............ B65D 88/1631; B65D 88/1668; B65D 88/1681

(Continued)

(56) References Cited

U.S. PATENT DOCUMENTS

| 2,696,235 A | 12/1954 | Toffolon |
| 3,443,832 A | 5/1969 | Ehlinger |

(Continued)

FOREIGN PATENT DOCUMENTS

| EP | 2570365 | 3/2013 |
| GB | 1604213 | 12/1981 |

(Continued)

OTHER PUBLICATIONS

PCT International Search Report and the Written Opinion of the Searching Authority for International Application No. PCT/US2014/041154 (Nov. 13, 2014).

(Continued)

*Primary Examiner* — Jes F Pascua
(74) *Attorney, Agent, or Firm* — Garvey, Smith & Nehrbrass, Patent Attorneys, L.L.C.; Julia M. FitzPatrick; Gregory C. Smith

(57) ABSTRACT

A bottom and discharge assembly for a flexible fabric bulk bag of the type having heat sealed joints includes a piece of reinforcing fabric positioned under a heat sealed joint of a bottom portion and a discharge tube, around a periphery of a discharge tube opening and bottom opening that are each substantially square, wherein the reinforcing fabric prevents bag failure at or about at corners of the bottom opening and discharge tube opening. The assembly can be formed by overlapping the reinforcing fabric, discharge tube, and bottom portion so that the bottom is heat sealed to both a portion of the discharge tube fabric and a portion of the reinforcing fabric and wherein a portion of the reinforcing fabric is under the discharge tube and bottom joint, and wherein the discharge tube fabric and reinforcing fabric are not joined together.

20 Claims, 38 Drawing Sheets

Related U.S. Application Data

(60) Provisional application No. 63/046,248, filed on Jun. 30, 2020, provisional application No. 62/893,558, filed on Aug. 29, 2019.

(58) Field of Classification Search
USPC ........................................................ 383/119
See application file for complete search history.

(56) References Cited

U.S. PATENT DOCUMENTS

| | | | |
|---|---|---|---|
| 3,542,032 | A | 11/1970 | Spencer, Jr. |
| 4,143,796 | A | 3/1979 | Williamson et al. |
| 4,194,652 | A | 3/1980 | Williamson et al. |
| 4,211,266 | A | 7/1980 | Massey |
| 4,284,229 | A * | 8/1981 | Schmidt .............. B29C 66/1122 383/125 |
| 4,364,424 | A | 12/1982 | Nattrass |
| 4,408,643 | A | 10/1983 | Laske et al. |
| 4,457,456 | A | 7/1984 | Derby et al. |
| 4,596,040 | A * | 6/1986 | LaFleur .............. B65D 88/1618 383/7 |
| 4,646,357 | A | 2/1987 | Nattrass |
| 4,865,218 | A | 9/1989 | Derby et al. |
| 4,917,507 | A | 4/1990 | Davidson |
| 5,181,900 | A * | 1/1993 | Watanabe .......... B65D 88/1612 493/213 |
| 5,340,218 | A | 8/1994 | Cuthbertson |
| 5,484,207 | A | 1/1996 | Schnaars et al. |
| 5,536,086 | A | 7/1996 | Nattrass |
| 5,695,598 | A | 12/1997 | Groshens et al. |
| 5,823,683 | A | 10/1998 | Antonacci et al. |
| 6,048,296 | A | 4/2000 | Futerman |
| 6,076,702 | A | 6/2000 | Hoffmann et al. |
| 6,161,960 | A | 12/2000 | Hiraoka et al. |
| 6,305,845 | B1 | 10/2001 | Navin |
| 6,318,594 | B1 | 11/2001 | Hutchins |
| 6,374,579 | B1 | 4/2002 | Muller |
| 6,467,955 | B1 | 10/2002 | Kim |
| 6,886,981 | B2 | 5/2005 | Taniguchi et al. |
| 6,935,500 | B1 | 8/2005 | Schnaars |
| 6,935,782 | B2 | 8/2005 | Cholsaipant |
| 7,276,269 | B2 | 10/2007 | Kraimer et al. |
| 8,297,840 | B2 | 10/2012 | Jansen |
| 9,016,521 | B2 | 4/2015 | Foster |
| 10,112,739 | B2 | 10/2018 | Dunlap et al. |
| 10,479,599 | B2 | 11/2019 | Dunlap et al. |
| 10,618,225 | B2 | 4/2020 | Dunlap |
| 10,745,192 | B2 | 8/2020 | Dunlap et al. |
| 11,319,144 | B1 | 5/2022 | Dunlap et al. |
| 2005/0167456 | A1 | 8/2005 | Levi |
| 2008/0115458 | A1 | 5/2008 | Funaki et al. |
| 2008/0176009 | A1 | 7/2008 | Chereau et al. |
| 2009/0260324 | A1 | 10/2009 | Funaki et al. |
| 2010/0209025 | A1 | 8/2010 | Futase |
| 2011/0019942 | A1 | 1/2011 | Piraneo |
| 2011/0085749 | A1 | 4/2011 | Frei et al. |
| 2011/0206300 | A1 | 8/2011 | Koesters et al. |
| 2012/0227363 | A1 | 9/2012 | Nussbaum |
| 2012/0314979 | A1 | 12/2012 | Heininga |
| 2013/0202231 | A1 | 8/2013 | Nowak et al. |
| 2013/0209002 | A1 | 8/2013 | Bazbaz |
| 2014/0360669 | A1 | 12/2014 | Schnaars, Sr. et al. |
| 2014/0363106 | A1 | 12/2014 | Schnaars, Sr. et al. |
| 2018/0050863 | A1 | 2/2018 | Dunlap et al. |
| 2018/0118451 | A1 | 5/2018 | Dunlap et al. |
| 2018/0126661 | A1 | 5/2018 | Dunlap et al. |
| 2019/0185212 | A1 | 6/2019 | Dunlap et al. |
| 2020/0156863 | A1 | 5/2020 | Dunlap et al. |
| 2020/0254697 | A1 | 8/2020 | Dunlap et al. |

FOREIGN PATENT DOCUMENTS

| | | |
|---|---|---|
| KR | 101651546 B1 * | 8/2016 |
| SU | 1533636 | 1/1990 |
| WO | 9429189 | 12/1994 |
| WO | 1998011291 | 3/1998 |
| WO | 2003032763 | 4/2003 |
| WO | 2012121716 | 9/2012 |
| WO | 2014197727 | 12/2014 |
| WO | 2014197728 | 12/2014 |
| WO | 2018085843 | 5/2018 |
| WO | 2018089504 | 5/2018 |
| WO | 2018118975 | 6/2018 |

OTHER PUBLICATIONS

PCT International Search Report and the Written Opinion of the Searching Authority of International Application No. PCT/US2014/041155 (Sep. 30, 2014).

PCT International Search Report and the Written Opinion of the Searching Authority of International Application No. PCT/US2017/060411(Mar. 15, 2018).

* cited by examiner

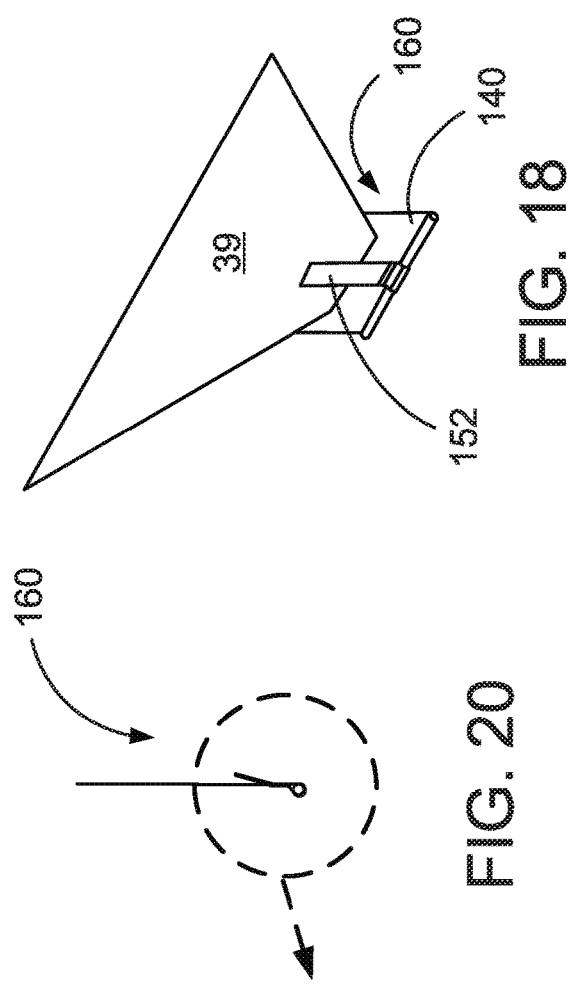
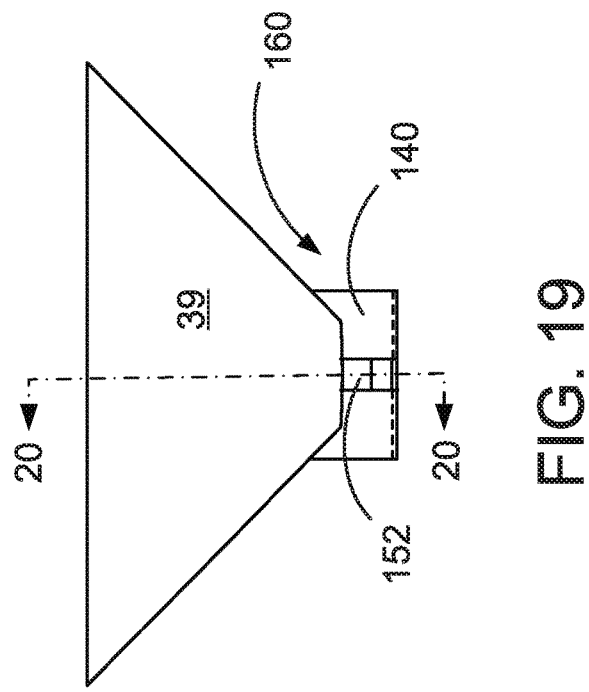
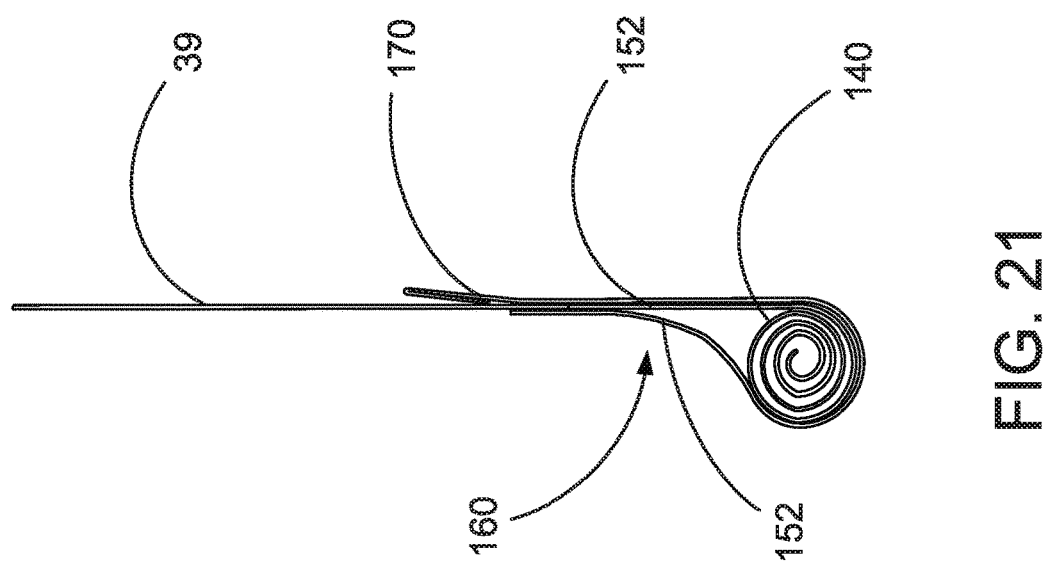

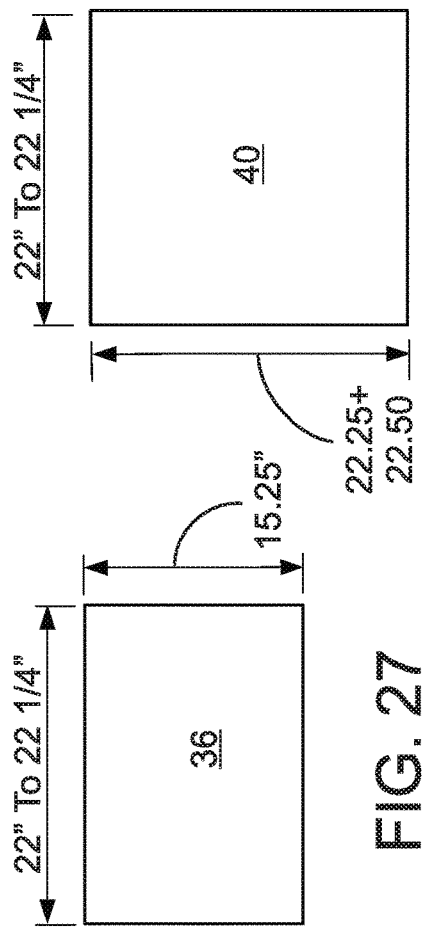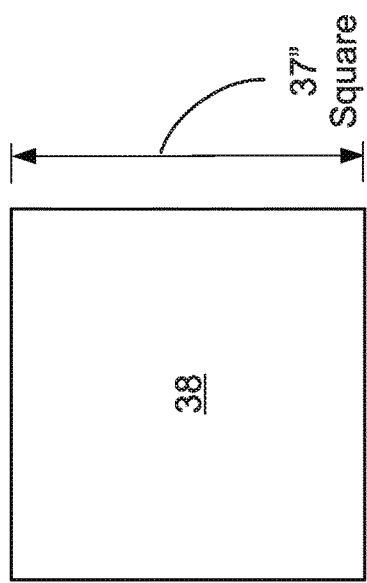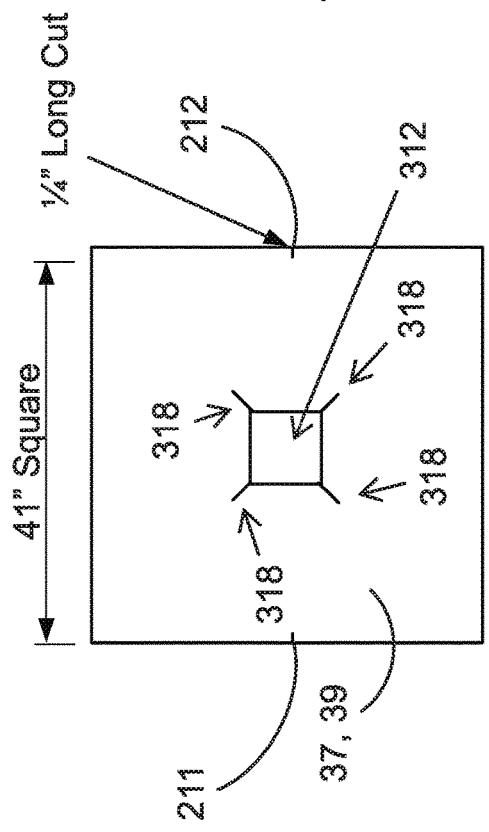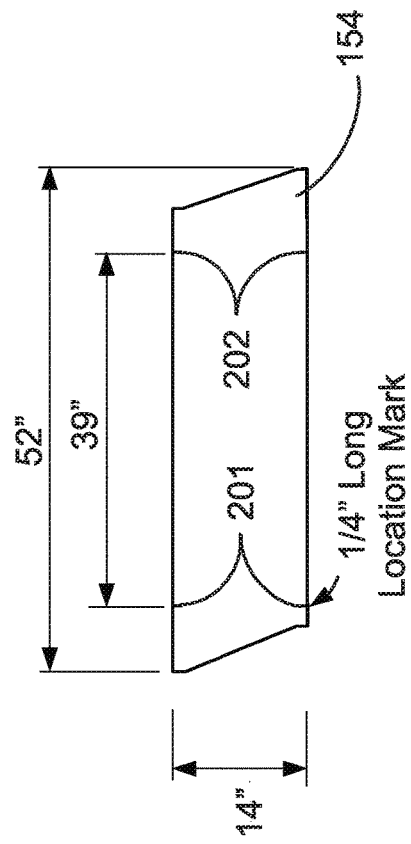

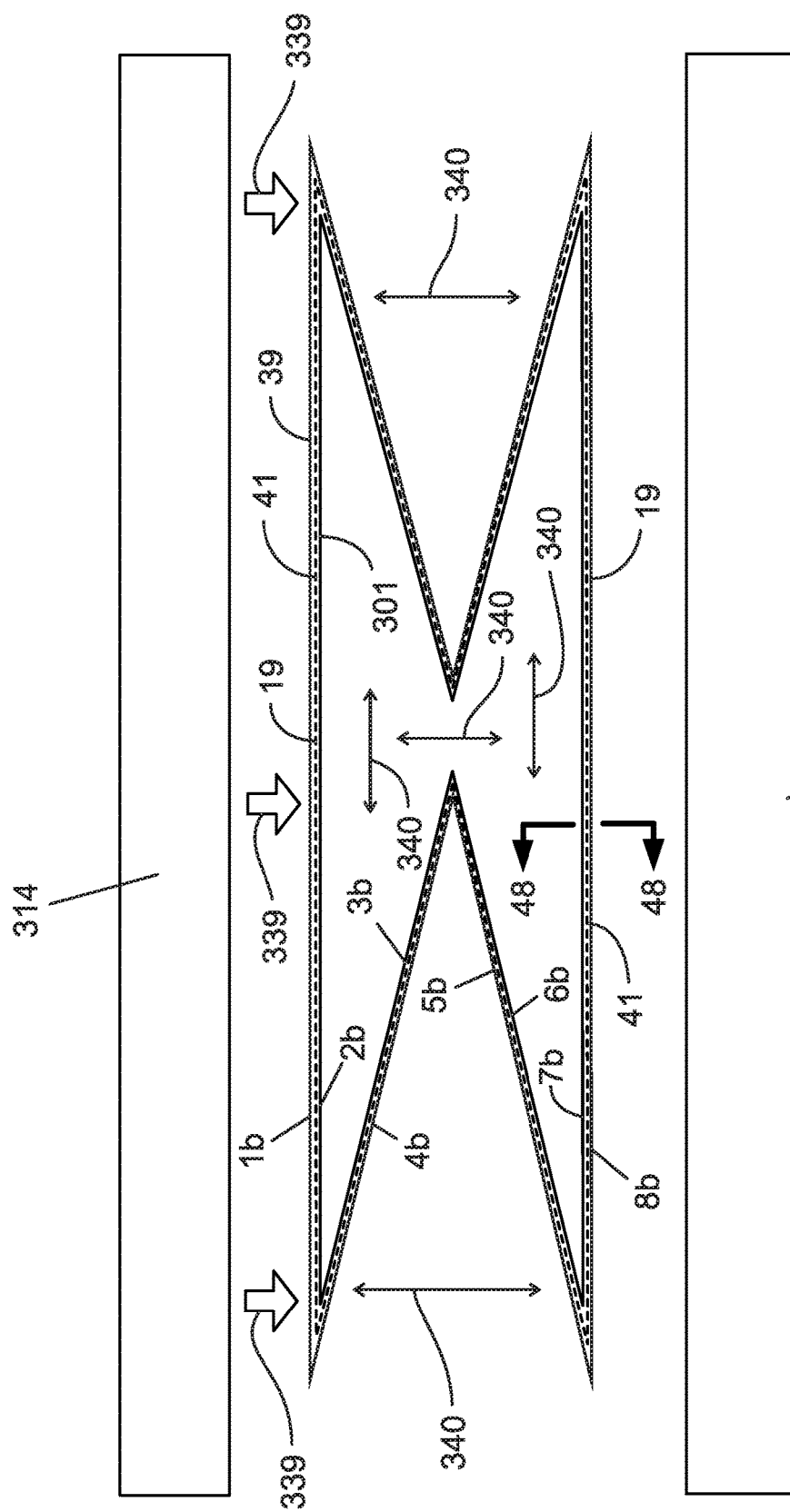

NOTE: 16" Spout and 18" Spout 5-1 Test Results

| Bag No. | Line No. | Load Reached (lbs) | Target Load (lbs) | Pass/Fail | Comments | SWL (lbs) | Safety Factor | Product Weight (lbs) | Cycle Time (Seconds) |
|---|---|---|---|---|---|---|---|---|---|
| 1124-4 | 3 | 14670 | 11000 | PASS | 18" discharge tube | 2200 | 5 | 1300 | 159 |
| 1124-3 | 3 | 15520 | 11000 | PASS | 18" discharge tube | 2200 | 5 | 1300 | 158 |
| 1124-1 | 3 | 14460 | 11000 | PASS | 18" discharge tube | 2200 | 5 | 1300 | 162 |
| 1124-2 | 3 | 16460 | 11000 | PASS | 18" discharge tube | 2200 | 5 | 1300 | 152 |

BULK BAG BOTTOM AND DISCHARGE ASSEMBLY INCLUDING A REINFORCER

CROSS-REFERENCE TO RELATED APPLICATIONS

This is a continuation of U.S. patent application Ser. No. 17/007,509, filed on 31 Aug. 2020 (issued as U.S. Pat. No. 11,319,144 on 3 May 2022), which claims the benefit of and/or priority to U.S. Provisional Patent Application Ser. No. 62/893,558 filed on 29 Aug. 2019 and U.S. Provisional Patent Application Ser. No. 63/046,248 filed on 30 Jun. 2020, each of which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

A bottom and discharge assembly for a flexible fabric bulk bag of the type having heat sealed joints includes a piece of reinforcing fabric positioned under a heat sealed joint of a bottom portion and a discharge tube, around a periphery of a discharge tube opening and bottom opening that are each at least substantially square, wherein the reinforcing fabric prevents bag failure at or about at corners of the bottom opening and discharge tube opening. The assembly can be formed by overlapping the reinforcing fabric, discharge tube, and bottom portion so that the bottom is heat sealed to both a portion of the discharge tube fabric and a portion of the reinforcing fabric and wherein a portion of the reinforcing fabric extends below the discharge tube fabric under the discharge tube and bottom heat sealed joint.

2. General Background of the Invention

Many industries exist in which large quantities of materials or products must be contained and transported. Such materials or products can be free-flowing, making it necessary to fully support the entire volume of the materials or products. Industries that deal with storing and transporting such dry, flowable products, e.g., sand, fertilizer, granules of plastic, powdered chemicals, carbon black, grains and food products use what are known as flexible intermediate bulk containers (FIBC), also known as bulk bags, industrial bags, or big bags. The bags are generally made from flexible fabric, typically woven polypropylene or polyethylene fabric. For example, the bags can be made from 5 oz polypropylene fabric. The bags can be assembled from multiple pieces of flexible fabric and sewn together at stitched joints. Some bags use heat fusion or heat sealing to create joints instead of stitched seams, and reference is made to the following published patent applications, each of which is incorporated herein by reference. The following patent applications by the same Applicant discuss various preferred embodiments of a bulk bag including heat seal connections, each of which is incorporated herein by reference:

i) U.S. patent application Ser. No. 14/297,441, filed on 5 Jun. 2014, titled "METHOD OF PRODUCTION OF FABRIC BAGS OR CONTAINERS USING HEAT FUSED SEAMS", published as No. US2014/0363106 on 11 Dec. 2014, and issued as U.S. Pat. No. 10,112,739, on 30 Oct. 2018;

ii) International PCT Patent Application No. PCT/US2014/041155, filed on 5 Jun. 2014, titled "METHOD OF PRODUCTION OF FABRIC BAGS OR CONTAINERS USING HEAT FUSED SEAMS", published as No. WO2014/197728A1 on 11 Dec. 2014;

iii) U.S. patent application Ser. No. 15/345,452, filed 7 Nov. 2016, titled "INDUSTRIAL BAG DISCHARGE SPOUT", published as No. US2018/0050863A1 on 22 Feb. 2018, and issued as U.S. Pat. No. 10,745,192 on 18 Aug. 2020;

iv) International PCT Patent Application No. PCT/US2017/060411, filed 7 Nov. 2017, titled "INDUSTRIAL BAG DISCHARGE SPOUT", published as No. WO2018/085843A1 on 11 May 2018;

v) U.S. patent application Ser. No. 15/383,841, filed 19 Dec. 2016, titled "INDUSTRIAL BAG LIFT LOOP ASSEMBLY", published as No. US2018/0118451A1 on 3 May 2018, and issued as U.S. Pat. No. 10,479,599 on 19 Nov. 2019;

vi) International PCT Patent Application No. PCT/US2017/067393, filed 19 Dec. 2017, titled "INDUSTRIAL BAG LIFT LOOP ASSEMBLY", published as No. WO2018/118975A1 on 28 Jun. 2018;

vii) U.S. patent application Ser. No. 15/807,272, filed 8 Nov. 2017, titled "CARRIER PLATE FOR USE IN MANUFACTURING STITCHLESS BULK BAGS WITH HEAT FUSED SEAMS", published as No. US2018/0126661A1 on 10 May 2018, and issued as U.S. Pat. No. 10,618,225 on 14 Apr. 2020;

viii) International PCT Patent Application No. PCT/US2017/060652, filed 8 Nov. 2017, titled "STITCHLESS BULK BAG WITH HEAT FUSED SEAMS AND METHOD OF PRODUCTION", published as No. WO2018/089504A1 on 17 May 2018;

ix) U.S. patent application Ser. No. 16/126,635, filed on 10 Sep. 2018, titled "METHOD OF PRODUCTION OF FABRIC BAGS OR CONTAINERS USING HEAT FUSED SEAMS", published as US2019/0185212A1 on 20 Jun. 2019;

x) U.S. patent application Ser. No. 16/687,196, filed on 18 Nov. 2019, titled "INDUSTRIAL BAG LIFT LOOP ASSEMBLY", published as US2020/0156863A1 on 21 May 2020; and xi) U.S. patent application Ser. No. 16/796,521, filed on 20 Feb. 2020, titled "STITCHLESS BULK BAG WITH HEAT FUSED SEAMS AND METHOD OF PRODUCTION", published as US2020/0254697A1 on 13 Aug. 2020.

Prior art methods of preventing discharge of material through a discharge spout typically include ropes or other tie straps, or cords to close off discharge spouts. When it comes time to release material contained in the bag, such discharge spouts are opened via untying the rope tie, strap, or cord, or by cutting the tie or rope or strap or cord, for example.

At some point during use of the bulk bag, the contained material must be discharged from the bag.

Knots in any ties, straps or ropes closing off a discharge spout must be untied while under pressure from the materials contained in the bag and such pressure, generally, makes knots difficult to untie; the knots often tangle or do not slip open properly. If the knots do not untie properly, the operator must reach under the bag, typically with both hands to untie the knots. Due to the weight of the materials above the knots, the operator is quite often unable to untie the knots. Further, such an effort requires the operator to expose the operator's head, shoulders, and arms underneath the large volume of materials within the bag. The downward forces being applied by the operator to untie the knots increase the risk of unpredictable discharge, or the bag dropping. If the operator cuts the knots to release the materials, then loose pieces of tie can fall into and mix with the materials, causing expensive contamination of the materials or damage to the conveying equipment.

Additionally, although prior art methods of tying off a discharge tube can prevent discharge of all the materials in the bulk bag, some of the materials often leak or sift out the point of closure with the tie.

Prior art discharge tubes also typically are bunched up or folded to one side, during filling of a bulk bag with materials, resulting in a bottom surface of a bulk bag that is not flat and can cause leaning of a bulk bag during transport.

There is thus a need in the art for a discharge assembly that effectively closes off or seals a discharge tube or spout on a bulk bag while it is containing materials, but which enables quick and effective discharge of the materials without risk of contaminating the materials, damaging the equipment, or injuring an operator.

There is also a need in the art for a discharge assembly that helps provide a flatter surface for a bulk bag to rest upon during transport.

In bulk bags of the type that include heat sealed connections or joints for a bottom and discharge tube, for example, and/or a substantially square opening in a bottom portion for discharge of bulk material, and/or slits in a bottom portion extending from a bottom opening, e.g., as shown and described in U.S. Pat. No. 10,618,225 and U.S. patent application Ser. No. 16/796,521, a weakness in the joint between a bottom portion and a discharge tube can arise at zero point locations or areas. In construction of a heat sealed bag wherein a bottom portion opening is constructed with four slits, for example, a zero point area can occur at about the 90 degree angle, wherein two pieces are at about 90 degrees respective to each other, going from the horizontal to the vertical, at bottom portion slit areas, which can be weak areas in a heat sealed bag. Taping configurations, e.g., as described U.S. Pat. No. 10,618,225 and U.S. patent application Ser. No. 16/796,521, can help overcome the weak area at a zero point. However, the taping configurations are not preferred because it is a somewhat cumbersome process that is not easily controlled. Initial tests also indicated that the taping configurations would not consistently meet the 5 to 1 safety standard, which is generally accepted in the industry. The FIBCA (Flexible Intermediate Bulk Container Association) has provided general industry accepted 5 to 1 safety testing guidelines.

If a bag failure or tear in a bag occurs at the zero point area, there is generally a quick migration of the tear from the zero point at about a 45 degree angle and sometimes at about a 90 degree angle, toward the outer edges of the bottom. This can be a catastrophic failure that causes loss of product.

The geometric physics at play with a zero point are the following. The zero point has zero strength which is why it is referred to as a zero point. The reason for that is when the discharge spout material intersects with the bottom material at a 90 degree angle and with no overlap, it has zero strength at that intersection point. The intersection point can be a few microns away from each other to where it can become noticeable as a small pin hole. As the stresses become stronger, that very small pin hole enlarges to the point that the horizontal strength and vertical strength of the two fabrics begin to tear apart and break—at that point product starts falling out and the amount of falling product increases as the tear/tears become larger. One or more preferred embodiments of the present invention that includes a reinforcer or insert portion in a discharge assembly solves the problems in the art because a reinforcer or insert covers the zero points thus preventing the zero point stresses to begin. It is a simple but very effective solution to the problem.

BRIEF SUMMARY OF THE INVENTION

One or more preferred embodiments of the apparatus and method of the present invention(s) solves the problems in the art in a simple and straight forward manner.

One or more preferred embodiments of the apparatus and method of the present invention(s) comprises a discharge assembly for use with a flexible bag, e.g., a bulk bag, comprising a discharge spout coupled to a bottom panel of the bag, wherein the discharge spout is configured to be rolled. A releasable flexible fabric tape or tie preferably secures the discharge spout in rolled configuration to the bottom panel to define a closed configuration for the discharge spout. In the closed configuration, material contents of the bag are contained within the bag. When contents of the bag are ready to be discharged, releasing the tape or tie causes the discharge spout to unroll and materials contained in the bag to flow therethrough. A discharge tube cover can also be provided that extends across the bottom panel and discharge tube. The discharge tube cover helps provide a flatter surface for the bag to rest upon, provides another level of closure to help prevent material contents of the bag from leaking, and can provide additional support and strength to the bag.

In some embodiments a discharge assembly can include a tied off discharge spout and a discharge tube cover.

One or more preferred embodiments of the present invention include a flexible bag comprising: a body including a bottom panel, and a discharge assembly comprising: a discharge spout coupled to the bottom panel; and a releasable discharge spout coupler coupled to the bottom panel; wherein the discharge spout is configured to be rolled, and the releasable discharge spout coupler is configured to be releasably coupled across and to the discharge spout to maintain a rolled position against the bottom panel.

In various preferred embodiments, the discharge assembly further comprises a cover releasably attachable to the bottom panel across the rolled discharge spout and the releasable discharge spout coupler.

In various preferred embodiments, the releasable discharge spout coupler is knot-free.

In various preferred embodiments, the releasable discharge spout coupler includes an adhesive which releasably secures the discharge spout in a rolled position against the bottom panel.

In various preferred embodiments, the releasable discharge spout coupler coupled to the bottom of the bag and rolled layers prevents release of bulk material from the bag.

Additional preferred embodiments include a flexible bag comprising: a body including a bottom panel; and a discharge portion on the bottom panel, the discharge portion having a closed configuration and an open configuration; the closed configuration of the discharge portion having a plurality of rolled layers releasably secured against the bottom panel of the bag, wherein the plurality of rolled layers secured against the bottom panel prevents discharge of any material in the flexible bag through the discharge portion.

In various preferred embodiments, the plurality of rolled layers are releasably secured against the bottom panel with a releasable coupler positioned on the bottom panel and extending to the plurality of rolled layers in the closed configuration.

In various preferred embodiments, the releasable coupler is positioned on the bottom panel so that it is accessible for removing from the bottom panel without standing under the bottom panel.

In various preferred embodiments, the releasable coupler is releasable from the bottom panel by pulling.

In various preferred embodiments, the releasable coupler is releasable from the bottom panel without untying.

In various preferred embodiments, the discharge portion in an open configuration is not rolled.

In various preferred embodiments, the body has an interior, and the discharge portion is in communication with the interior of the body wherein material from the body can flow through the discharge tube.

In various preferred embodiments, changing the state of the closed configuration to the open configuration is affected by releasing the discharge coupler so that the rolled layers unroll.

In various preferred embodiments, a discharge spout cover is releasably attachable to the bag, said discharge spout cover extending across the rolled discharge portion.

In various preferred embodiments, the discharge spout cover extends from a first body side, across the bottom of the bag and over the rolled discharge portion to a second body side, the cover having a first bend at which the cover extends across a first bottom edge to the first body side and a second bend at which the cover extends across a second bottom edge to the second body side, and wherein a distance between the first and second bends of the discharge spout cover is shorter than a length of the bottom between the first and second bottom edges.

In various preferred embodiments, the distance between the first and second bends is one to two inches shorter than the length of the bottom between the first and second bottom edges.

In various preferred embodiments, the cover coupled to the bag across the discharge portion provides a substantially flat bottom surface for the bag, wherein attachment of the cover causes the rolled discharge portion to push up against the bottom of the bag and raise a portion of the bottom of the bag.

In various preferred embodiments, the cover increases the strength of the bag over 50%.

In various preferred embodiments, the discharge assembly in the closed configuration is configured to prevent discharge of 1 to 2 tons of bulk material.

In various preferred embodiments, the discharge assembly in the closed configuration is configured to prevent discharge of over 200 pounds of bulk material contained in the bag.

In various preferred embodiments, the releasable coupler prevents discharge of 1 to 2 tons of bulk material.

One or more preferred embodiments of the present invention include a method of containing and/or discharging material from a flexible bag comprising:
(a) providing a flexible bag having a body, a bottom, an interior, and a discharge portion having a closed and an open configuration, wherein the body is configured for housing material within the interior and wherein the discharge portion is in communication with the interior via an opening in the bottom, the discharge portion configured to contain material within the interior in the closed configuration and configured to discharge material through the discharge portion in the open configuration;
(b) changing the state of the discharge portion to the closed position prior to filling the flexible bag with material by rolling the discharge portion a distance towards the bottom of the bag to provide a plurality of rolled layers and coupling the rolled layers at or near the bottom of the bag;
(c) filling the flexible bag with material;
(d) changing the state of the discharge portion to the open configuration by releasing the rolled layers from the bottom of the bag and unrolling the rolled layers.

Various preferred embodiments of the method further comprise providing a discharge spout cover releasably attachable to the bag, which extends across the rolled discharge portion and bottom of the bag.

In various preferred embodiments of the method, the cover is positioned on the bag so that it extends from a first body side of the bag across the bottom of the bag and over the rolled discharge portion to a second body side of the bag, wherein the cover has a first bend location at which the cover extends across a first bottom edge to the first body side and a second bend location at which the cover extends across a second bottom edge to the second body side, wherein a distance between the first and second bend locations is shorter than a length of the bottom between the first and second bottom edges.

In various preferred embodiments of the method, the cover is positioned on the bag so that the distance between the first and second bend locations is one to two inches shorter than the length of the bottom between the first and second bottom edges.

One or more preferred embodiments of a flexible bag with a discharge assembly include: a body including a bottom panel; a discharge portion; and a discharge cover extending across the discharge portion and bottom panel, the discharge assembly configured to increase the strength of the bag by at least 50%.

One or more preferred embodiments of a flexible bag with a discharge assembly include: a body including a bottom panel; a discharge portion; and a discharge cover extending across the discharge portion and bottom panel, the discharge assembly configured to increase the strength of the bag up to over 50%.

One or more preferred embodiments of a flexible bag with a discharge assembly include: a body including a bottom panel; a discharge portion; and a discharge cover extending across the discharge portion and bottom panel, the discharge assembly configured to increase the strength of the bag from 1% to over 50%.

One or more embodiments of a flexible bag with a discharge assembly include: a body including a first body side and a second body side; a bottom including a first bottom edge and a second bottom edge; a discharge portion; and a discharge cover extending from the first body side, across the bottom of the bag and over the discharge portion to the second body side, the discharge cover having a first bend location at which the cover extends across the first bottom edge to the first body side and a second bend location at which the cover extends across the second bottom edge to the second body side, and wherein a distance between the first and second bend locations of the cover is shorter than a length of the bottom between the first and second bottom edges.

In various preferred embodiments, the distance between the first and second bend locations is one to two inches shorter than the length of the bottom between the first and second bottom edges.

In various preferred embodiments, the cover coupled to the bag across the discharge portion provides a substantially flat bottom surface for a filled bag, wherein when the bag is in a position to be filled, the cover is under the discharge portion and the cover provides a surface for making contact with another surface, the cover causing the discharge portion to push up against the bottom of the bag and raising a portion of the bottom of the bag.

In various preferred embodiments, the discharge portion includes a closed configuration wherein the discharge portion is closed off via a tie or strap that is wrapped around or tied around the discharge portion.

In various preferred embodiments, the discharge portion includes a closed configuration wherein the discharge portion is rolled towards a bottom of the bag to provide a plurality of rolled layers and wherein the rolled layers are coupled to the bottom of the bag with a releasable coupler.

In various preferred embodiments, the discharge portion includes a closed configuration wherein the discharge portion is closed off via a tie or strap that is wrapped around, or tied around the discharge portion, and wherein the cover pushes the discharge portion up against the bottom of the bag while the discharge portion is in the closed configuration.

In various preferred embodiments, the discharge portion includes a closed configuration wherein the discharge portion is rolled towards a bottom of the bag to provide a plurality of rolled layers, wherein the rolled layers are coupled to the bottom of the bag with a releasable coupler, and wherein the cover pushes the discharge portion up against the bottom of the bag while the discharge portion is in the closed configuration.

In one or more preferred embodiments, a discharge assembly of the present invention comprises a discharge tube configured to be rolled, the discharge tube coupled to a bottom of a bag and in communication with an interior of the bag, the discharge tube having a closed configuration and an open configuration, wherein in the closed configuration the discharge tube is rolled towards the bottom of the bag, and wherein a releasable coupler couples the discharge tube to the bag bottom, and wherein in the open configuration, the discharge tube is not rolled.

In various preferred embodiments to effect change from a closed configuration to an open configuration, the releasable coupler is removed to release the rolled discharge tube from the bottom of the bag.

In various preferred embodiments to effect change from an open configuration to a closed configuration, the discharge tube is rolled up towards the bottom of the bag.

In various preferred embodiments to effect change from an open configuration to a closed configuration, the discharge tube is rolled up towards the bottom of the bag and coupled to the bag with a releasable coupler.

In various preferred embodiments the releasable coupler couples the rolled discharge tube to the bag bottom via an adhesive.

In various preferred embodiments the releasable coupler couples the rolled discharge tube to the bag bottom via heat sealing.

In various preferred embodiments, a cover is provided extending from one bag body or intermediate panel side, across the bag bottom and rolled discharge tube, to an opposing bag body or intermediate side.

One or more preferred embodiments of a discharge assembly of the present invention includes a discharge tube that can be rolled, or tied to effect a closed configuration, and a cover extending from one bag body or intermediate panel side, across the bag bottom and closed discharge tube, to an opposing bag body or intermediate panel side.

In one or more preferred embodiments of the present invention, a flexible bag comprises:
  a body including a first body side and a second body side, wherein the first body side and the second body side are opposing sides;
  a bottom panel having an outer periphery, a bottom opening that is at least substantially square, a first bottom edge and a second bottom edge, wherein the first bottom edge and the second bottom edge are opposing edges of the bottom panel; and
  a discharge assembly comprising:
  a discharge spout having a pair of spout openings that are at least substantially square, the discharge spout coupled to the bottom panel at a location that is spaced away from the outer periphery of the bottom panel, the bottom panel coupled to the discharge spout at a heat seal joint, and wherein the discharge spout has a rolled configuration with a plurality of rolled layers held against the bottom panel and an unrolled configuration; and
  a releasable discharge spout coupler, the releasable discharge spout coupler releasably coupled to the discharge spout in the rolled configuration and to the bottom panel, to maintain the rolled configuration of the discharge spout in position against the bottom panel;
  wherein the releasable discharge spout coupler is tape that has a pull tab;
  wherein the tape couples the discharge spout in the rolled configuration to the bottom panel and wherein the pull tab is not attached to the bottom panel or to the discharge spout in the rolled configuration;
  wherein the tape is positioned on the bottom panel and the discharge spout in the rolled configuration so that the tape is only stressed by material contents in the bag in a shear direction and the tape does not release until the pull tab is pulled in a peel direction;
  wherein at least a portion of the discharge spout in the rolled configuration extends downward from, and exterior to, the bottom panel; and
  a cover that is adapted to cinch and push up against the bottom panel to provide an uplift to the bottom panel, maintain the discharge spout in position, prevent downward movement of the bag, and strengthen the heat seal joint between the bottom panel and discharge spout to provide additional support to the bag;
  the cover having a first bend and a second bend, the cover positioned on the bag so that the first bend is positioned at or about at a first connection of the first bottom edge and the first body side and so that the second bend is positioned at or about at a second connection of the second bottom edge to the second body side;
  the cover releasably attached via a heat seal bond to each of the first and second sides of the body at a location that is spaced above the first connection and the second connection of the bottom panel and the body; and
  wherein the cover is positioned at least about centrally across the bottom panel without completely covering the bottom panel, the cover extending from the first body side, across the bottom panel and over the discharge spout in the rolled configuration, and to the second body side.

In one or more preferred embodiments of the present invention, the releasable discharge spout coupler is knot-free.

In one or more preferred embodiments of the present invention, the releasable discharge spout coupler coupled to the bottom of the bag and to the discharge spout in the rolled configuration prevents release of bulk material from the bag.

In one or more preferred embodiments of the present invention, the body has an interior and wherein the discharge spout is in communication with the interior of the body.

In one or more preferred embodiments of the present invention, changing from the rolled configuration to the unrolled configuration is affected by releasing the releasable coupler so that the rolled layers unroll.

In one or more preferred embodiments of the present invention, the cover increases the strength of the bag by one to over fifty percent.

In one or more preferred embodiments of the present invention, the flexible bag is filled with 1 to 2 tons of bulk material and wherein the discharge spout in the rolled configuration prevents discharge of the 1 to 2 tons of bulk material.

In one or more preferred embodiments of the present invention, the flexible bag is operable to hold 1 to 2 tons of bulk material, and the releasable discharge spout coupler of the discharge spout in the rolled configuration is operable to prevent discharge of the 1 to 2 tons of bulk material held within the flexible bag.

In one or more preferred embodiments of the present invention, a flexible bag comprises: a body including a first body side and a second body side;
  a bottom panel having a first bottom edge and a second bottom edge, and a bottom opening that is at least substantially square;
  a discharge portion having a pair of at least substantially square discharge openings wherein one of said discharge openings is overlapped with the bottom opening in an overlap portion and wherein the bottom panel and the discharge portion are joined together with a heat seal coupler at a heat seal joint in the overlap portion; and
  a cover adapted to cinch the bottom panel of the bag and apply pressure to the bag to maintain the discharge portion in position on the bag and strengthen the heat seal joint of the bottom panel and discharge tube, the cover extending across the discharge portion and the bottom panel without completely covering the bottom panel, wherein the cover extends from the first body side at a first location that is below a first lift loop of the bag, across the bottom of the bag and over the discharge portion to the second body side at a second location that is below a second lift loop of the bag, the cover having a first bend at which the cover extends across the first bottom edge to the first body side and a second bend at which the cover extends across the second bottom edge to the second body side, and wherein a distance between the first bend and the second bend of the cover is shorter than a length of the bottom panel between the first and second bottom edges;
  a first heat seal connection connecting the cover to the first body side and a second heat seal connection connecting the cover to the second body side, wherein the first heat seal connection and the second heat seal connection are positioned on the body so that forces of material contained within the bag only stress the first heat seal connection and the second heat seal connection in a shear direction;
  at least one tab portion on the cover, wherein the at least one tab portion is not connected to the bag, the at least one tab portion located above the first heat seal connection, and the at least one tab portion adapted to be pulled in a peel direction to release the first heat seal connection; and
  wherein the shorter distance between the first bend and the second bend locations of the cover provides an uplift for the bag and increases strength of the bag by at least 50%.

In one or more preferred embodiments of the present invention, a flexible bag comprises:
  a body including a first body side and a second body side;
  a bottom including a first bottom edge and a second bottom edge, and a bottom opening that is at least substantially square;
  a discharge portion having a pair of opposing discharge openings that are each at least substantially square; and
  a cover that covers the discharge portion, maintains the discharge portion in position, pushes the discharge portion up against the bottom, strengthens a heat seal connection between the bottom and discharge portion, and provides additional strength to the bag, the cover extending from the first body side, across the bottom of the bag and over the discharge portion to the second body side, the cover having a first bend at which the cover extends across the first bottom edge to the first body side and a second bend at which the cover extends across the second bottom edge to the second body side, and wherein a distance between the first bend and the second bend of the cover is shorter than a length of the bottom between the first and second bottom edges;
  wherein the shorter distance between the first bend and the second bend of the cover provides an uplift to the bottom and increases the strength of the bag; and
  wherein the distance between the first bend and the second bend is one to two inches shorter than a length of the bottom between the first and second bottom edges.

In one or more preferred embodiments of the present invention, the cover coupled to the bag across the discharge portion provides a substantially flat bottom surface for a filled bag, wherein when the bag is in a position to be filled the cover is under the discharge portion and the cover provides a surface for making contact with another surface, the cover causing the discharge portion to push up against the bottom of the bag and raising a portion of the bottom of the bag, while at least a portion of the discharge portion remains exterior to the bottom.

In one or more preferred embodiments of the present invention, the discharge portion includes a closed configuration wherein the discharge portion is rolled towards a bottom of the bag to provide a plurality of rolled layers and wherein the rolled layers are coupled to the bottom of the bag with a releasable coupler.

In one or more preferred embodiments of the present invention, the discharge portion includes a closed configuration wherein the discharge portion is rolled towards a bottom of the bag to provide a plurality of rolled layers, wherein the rolled layers are coupled to the bottom of the bag with a releasable coupler, and wherein the cover pushes the discharge portion up against the bottom of the bag while the discharge portion is in the closed configuration.

In one or more preferred embodiments of the present invention, a discharge assembly for a flexible bag comprises:
- a discharge tube coupled to a bag bottom and in communication with a bag interior;
- the discharge tube having a closed configuration and an open configuration, and a pair of discharge openings that are at least substantially square, and the bottom having a bottom opening that is at least substantially square, wherein the bottom opening is overlapped with one of said discharge openings at an overlap portion and wherein the discharge tube is coupled to the bag bottom at the overlap portion at a heat seal joint; and
- a cover that applies pressure to the bag to maintain the discharge tube in position and strengthen the heat seal joint between the bag bottom and the discharge tube, the cover extending from a first bag side, across the bag bottom and discharge tube in the closed configuration, to an opposing second bag side, the cover having a first bend at which the cover extends across a first bottom edge of the bag bottom to the first bag side and a second bend at which the cover extends across a second bottom edge of the bottom edges to the opposing second bag side, and wherein a distance between the first bend and the second bend of the cover is shorter than a length of the bottom between the first and second bottom edges;
- a first heat seal connection connecting the cover to the first bag side and a second heat seal connection connecting the cover to the second bag side, wherein the first heat seal connection and second heat seal connection are positioned on the bag so that forces of material contained within the bag only stress the first heat seal connection and the second heat seal connection in a shear direction; and
- wherein a free end of the cover above the first heat seal connection defines a tab portion that is adapted to be pulled in a peel direction to release the first heat seal connection.

In one or more preferred embodiments of the present invention, the discharge assembly is rolled in the closed configuration.

In one or more preferred embodiments of the present invention, a flexible bulk bag comprises:
a) a body having a first body side and a second body side, wherein the first body side and the second body side are opposing sides;
b) a bottom that is coupled to the body at a bottom coupler, the bottom having a bottom opening that is at least substantially square;
c) a discharge tube having a pair of discharge tube openings that are each at least substantially square, wherein one of said discharge tube openings is overlapped with the bottom opening at an overlap portion, and wherein the discharge tube is coupled to the bottom with a heat seal coupler at a discharge tube joint at the overlap portion, and wherein the discharge tube has an open configuration and a closed configuration; and
d) a cover releasably coupled at a first heat seal joint to the first body side and releasably coupled at a second heat seal joint to the second body side, wherein the cover extends from the first body side, across the bottom and the discharge tube in the closed configuration and to the second body side, and wherein the first heat seal joint and the second heat seal joint are spaced above the bottom coupler;
wherein the cover cinches the bottom and pushes the discharge tube in the closed configuration up against the bottom, providing support for the discharge tube joint and additional strength to the bag.

In one or more preferred embodiments of the present invention, the cover has a first bend where it extends from the first body side to the bottom and a second bend where it extends from the second body side to the bottom, and wherein a distance between the first bend and the second bend is shorter than a width of the bottom.

In one or more preferred embodiments of the present invention, the cover has a first bend where it extends from the first body side to the bottom and a second bend where it extends from the second body side to the bottom, and wherein a distance between the first bend and the second bend is the same as a width of the bottom or less than a width of the bottom.

In one or more preferred embodiments of the present invention, the distance between the first bend and the second bend is up to 2 inches shorter than a width of the bottom.

In one or more preferred embodiments of the present invention, the distance between the first bend and the second bend is up to 4 inches shorter than a width of the bottom.

In one or more preferred embodiments of the present invention, the bottom discharge structure is configured to strengthen the discharge structure and strengthen a zero point area at the discharge tube and bottom panel joint.

In one or more preferred embodiments of the present invention, a bottom and discharge assembly includes a reinforcer to reinforce a bottom and discharge tube heat seal connection at least at or about at corner locations of the heat seal connection between a bottom and discharge tube.

In one or more preferred embodiments of the present invention, a bottom and discharge assembly can be provided on a bulk bag of the type that has a heat sealed joint between a discharge tube and bottom portion to strengthen a zero point area, wherein the bottom and discharge assembly includes a reinforcer positioned under the discharge tube and bottom portion joint.

In one or more preferred embodiments of a bottom and discharge assembly of the present invention, a bottom is coupled to a reinforcer and to a discharge tube and wherein a portion of the reinforcer that is not coupled to the bottom extends under the connection of the discharge tube and bottom, and wherein the portion of the reinforcer extending under the discharge tube and bottom connection is a free portion that is neither coupled to the bag bottom nor to the discharge tube.

In one or more preferred embodiments of the present invention, a flexible fabric bulk bag includes a bottom and discharge assembly, the bottom and discharge assembly comprising:
a) a bottom having a bottom inner surface and a bottom opening with a bottom periphery;
b) a discharge tube having a first open end and a second open end;
d) an insert having an insert opening;
wherein the bottom inner surface is coupled to the insert and to the discharge tube;
wherein a portion of the insert that is not coupled to the bottom inner surface extends under the discharge tube at a location where the bottom inner surface is coupled to the discharge tube along the bottom periphery of the bottom opening; and
wherein bulk material contained within the bag can be discharged through the insert opening, through the bottom opening, and through the first open end and the second open end of the discharge tube.

In one or more embodiments, a bag with a discharge assembly including a reinforcer can hold at least 10.000 to 11,000 lbs on average of bulk material.

In one or more embodiments, a bag with a discharge assembly including a reinforcer can hold over 10,000 lbs of bulk material without a bottom failure.

In one or more embodiments, a bag with a discharge assembly including a reinforcer can hold over 11,000 lbs of bulk material without a bottom failure.

In one or more embodiments, a bag with a discharge assembly including a reinforcer can hold 11,000 lbs to 16,000 lbs without a bottom failure.

In one or more embodiments, a bag with a discharge assembly including a reinforcer can hold 14,000 lbs to 16,000 lbs without a bottom failure.

In one or more embodiments, a bag with a discharge assembly including a reinforcer can hold 10,000 lbs to 17,000 lbs without a bottom failure.

In one or more preferred embodiments of the present invention, a heat seal coupler couples the bottom to the insert and to the discharge tube.

In one or more preferred embodiments of the present invention, the insert is not coupled to the discharge tube, and a bond formed between the heat seal coupler of the bottom and the discharge tube and between the heat sealer coupler of the bottom and the insert holds the bottom and discharge assembly together and in place on the bag.

In one or more preferred embodiments of the present invention, the discharge tube is also coupled to the insert.

In one or more preferred embodiments of the present invention, the heat seal coupler includes a heat seal coating on a bottom inner surface that forms a bond with a coating that is on an outer surface of the discharge tube and on an outer surface of the insert.

In one or more preferred embodiments of the present invention, the heat seal coating on the bottom is different from the coating on the discharge tube and insert.

In one or more preferred embodiments of the present invention, the bottom opening has a substantially square shape with bottom opening corners and wherein bottom slits extend from at or about the bottom opening corners into bottom fabric.

In one or more preferred embodiments of the present invention, the insert opening has a substantially square shape with insert opening corners, and wherein an insert slit is included at a location that is in between each insert opening corner;

In one or more preferred embodiments of the present invention, each insert slit is offset from a bottom opening corner and from bottom slits such that the fabric of the insert reinforces the bottom opening corners.

In one or more preferred embodiments of the present invention, the bottom slits extend from the bottom opening into the bottom fabric at or about at an angle of about 45 degrees.

In one or more preferred embodiments of the present invention, the bottom slits extend from the bottom opening into the bottom fabric at or about at an angle of about 40 to 50 degrees.

In one or more preferred embodiments of the present invention, the insert slits extend from the insert opening into insert fabric at or about at an angle of about 90 degrees.

In one or more preferred embodiments of the present invention, the insert slits extend from the insert opening into insert fabric at or about at an angle of about 85 to 95 degrees.

In one or more preferred embodiments of the present invention, a flexible fabric bulk bag including a discharge and bottom assembly comprises:
a) a bottom having a bottom opening with a periphery and having a bottom gusseted configuration with a substantially trapezoidal shape and a bottom expanded configuration;
b) a discharge tube having a discharge tube first end that is open and a discharge tube second end that is open, and having a discharge tube gusseted configuration that is not a substantially trapezoidal shape and having a discharge tube expanded configuration; and
c) a reinforcer formed from a piece of fabric, the reinforcer for reinforcing a connection between the bottom and the discharge tube, the reinforcer having a reinforcer opening, having a reinforcer gusseted configuration with a substantially trapezoidal shape, and having a reinforcer expanded configuration;
e) a connection that connects the bottom to the discharge tube and to the reinforcer;
wherein the connection is formed by forming an overlapped area by positioning the reinforcer when in the reinforcer gusseted configuration into the discharge tube first end when the discharge tube is in the discharge tube gusseted configuration, and placing the insert and the discharge tube while overlapped together into the bottom opening when the bottom is in the bottom gusseted configuration and applying heat and pressure to the overlapped area until a bottom bond is formed between a heat seal coupler on the bottom and the discharge tube and between the heat seal coupler on the bottom and the reinforcer; and
wherein the discharge tube and the reinforcer are connected to the bag via the bottom bond.

In one or more preferred embodiments of the present invention, a bond is not formed between the discharge tube and the reinforcer when the connection including the bottom bond is formed.

In one or more preferred embodiments of the present invention, a bond is formed between the discharge tube and the insert when the connection including the bottom bond is formed.

In one or more preferred embodiments of the present invention, the discharge tube first end that is open has a substantially square shape with discharge tube corners, and wherein a discharge tube slit extends from the discharge tube corners into discharge tube fabric.

In one or more preferred embodiments of the present invention, each discharge tube slit extends into the discharge tube fabric at or about an angle of 90 degrees.

In one or more preferred embodiments of the present invention, each discharge tube slit extends into the discharge tube fabric at or about an angle of 80 to 100 degrees.

In one or more preferred embodiments of the present invention, said discharge tube slits are adapted to allow the insert in gusseted configuration with the substantially trapezoidal shape to be overlapped with the discharge tube in gusseted configuration.

In one or more preferred embodiments of the present invention, the bottom opening has a square shape with bottom opening corners and wherein a bottom slit is included at each of the bottom opening corners, each bottom slit extending from the bottom opening corners into bottom fabric.

In one or more preferred embodiments of the present invention, the insert opening has a substantially square shape with insert opening corners, and wherein the insert has an insert slit in between each of the insert opening corners that extend from the insert opening into insert fabric.

In one or more preferred embodiments of the present invention, each said insert slit is offset from each said bottom slit when the insert is overlapped with the bottom and with the discharge tube.

In one or more preferred embodiments of the present invention, each said insert slit is positioned about centrally in between two of said bottom opening corners.

In one or more preferred embodiments of the present invention, a method of forming a discharge tube assembly for a bulk bag comprises the following steps:
 a) folding a bottom portion into a bottom gusseted configuration that has a substantially trapezoidal shape with a first bottom opening and a second bottom opening, a first bottom end and a second bottom end, and wherein the first bottom opening is narrower than the second bottom opening;
 b) folding a reinforcing insert into a reinforcer gusseted configuration that has a substantially trapezoidal shape with a first insert opening and a second insert opening, a first insert end and a second insert end, and wherein the first insert opening is narrower than the second insert opening;
 c) folding a discharge tube portion that has a pair of substantially square open ends into a discharge tube gusseted configuration;
 d) overlapping the discharge tube portion and the reinforcing insert by placing the insert first end, while the insert is in gusseted configuration, into one said end of the discharge tube, while the discharge tube is in gusseted configuration, such that the insert second end remains exterior to the discharge tube;
 e) overlapping the discharge tube portion and the reinforcing insert with the bottom portion by placing the discharge tube portion and reinforcing insert while overlapped as in step (d) into the first bottom end when the bottom is in gusseted configuration such that an interior surface of the bottom portion is in contact with both an exterior surface of the discharge tube in gusseted configuration and an exterior surface of the reinforcing insert in gusseted configuration;
 f) applying heat and pressure to the bottom portion, the discharge tube portion and the reinforcing insert while overlapped as in step (e) to form a first bond between the bottom interior surface and the discharge tube exterior surface and a second bond between the bottom interior surface and the reinforcing insert exterior surface.

In one or more preferred embodiments of the present invention, a bond is not formed between the discharge tube portion and the reinforcer in step (f).

In one or more preferred embodiments of the present invention, the method further comprises also connecting the bottom portion to a body portion during step (f).

In one or more preferred embodiments of the present invention, the method also comprises connecting the bottom portion to a body portion after step (f).

In one or more preferred embodiments of the present invention, the method also comprises connecting the bottom portion to a body portion before step (f).

In one or more preferred embodiments of the present invention, the second end of the bottom portion while in gusseted configuration is placed within the body portion while in a body gusseted configuration before connecting the bottom portion to the body portion.

In one or more preferred embodiments a reinforcer or insert completely covers zero point areas in a bulk bag discharge assembly.

In one or more preferred embodiments a reinforcer or insert covers at least one zero point area in a bulk bag discharge assembly.

In a completed bag with a discharge tube and bottom, at openings of the discharge tube and bottom there is a turn that is at about 90 degrees when the bag is fully filled up. Where a spout line intersects with the bottom, the intersection has no seal or bond present at what is referred to as a zero point. This can be visualized as an infinitesimal small hole at the intersection of the bottom and discharge spout. The two fibers of yarn cross each other, and there is no strength. Strength can be gained as you move away from the small hole. Any small hole in geometry allows pressure to spread across and the hole to open up. In preferred embodiments of a bottom and discharge tube assembly, an insert or reinforcer prevents pressure from being applied to or on the zero point. Instead, pressure from material contents in the bag is on the insert, which has no zero point (at least in the area under the bottom and discharge tube connection), and including an insert or reinforcer provides sealing on both sides of the zero point.

Preferred embodiments of an insert or reinforcer have no zero point because it is a single piece of fabric with no intersection on the insert or reinforcer itself. In preferred embodiments an insert or reinforcer is positioned so that it extends right across the zero point and covers the zero point. When product opens up the bottom of a bag, no product is present between an insert or reinforcer and the bottom.

Preferably, in one or more embodiments an insert or reinforcer is positioned so that it extends below a zero point about 2 inches into the discharge spout area.

Preferably, in one or more embodiments an insert or reinforcer is positioned so that it extends below a zero point about 1¾ to 2¼ inches into the discharge spout area.

Preferably, in one or more embodiments an insert or reinforcer is positioned to cover a zero point and so that it extends below a zero point about 2 inches into the discharge spout area.

Preferably, in one or more embodiments an insert or reinforcer is positioned to cover a zero point and so that it extends below a zero point about 1½ to 2½ inches (and can extend about 4 inches) into the discharge spout area. The greater distance that an insert extends, e.g., if the insert extends 4 inches below a zero point, the insert can potentially restrict flow in the discharge portion.

In one or more preferred embodiments, there can be a two inch wide seal of an insert in a discharge tube assembly.

In one or more preferred embodiments, there can be a 1 to 4 inch wide seal of an insert in a discharge tube assembly.

In one or more preferred embodiments, an insert or reinforcer of the present invention is particularly useful in reinforcing connections of a discharge spout and bottom wherein the discharge spout connection is at or near an opening other than a circular one. e.g., when an opening in a bottom portion has a shape other than circular and an opening in a discharge tube has a shape other than circular.

In one or more preferred embodiments, an insert or reinforcer of the present invention is particularly useful in reinforcing connections of a discharge spout and bottom portion wherein the shape of an opening in a bottom portion and the shape of the discharge spout at or about at a connection area tends to cause a weak area or a zero point location in a connection formed between the discharge spout and a bottom.

In one or more preferred embodiments, an insert or reinforcer of the present invention is particularly useful in reinforcing connections of a discharge spout and bottom wherein the shape of an opening in a bottom portion is at least substantially square and the shape of an opening of a discharge spout is at least substantially square, which tends to cause weaknesses or zero point locations in a connection formed between the discharge spout and a bottom along or near said openings of the bottom and discharge spout.

In one or more preferred embodiments, an insert or reinforcer of the present invention is particularly useful in reinforcing connections of a discharge spout and bottom wherein the shape of an opening of a bottom portion is at least substantially square and the shape of an opening of a discharge spout is at least substantially square which tends to cause weaknesses or zero point locations in a heat seal connection, bond or joint between the discharge spout and a bottom formed along or near said openings of the bottom portion and the discharge tube.

In other embodiments, a reinforcer can also be used in a discharge assembly having a discharge tube with an at least substantially circular opening and/or bottom portion with an at least substantially circular opening, if desired to provided additional strength.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 18 is a perspective view of a bottom and discharge tube of a preferred embodiment of a bulk bag of the present invention depicting a first preferred embodiment of a discharge assembly with the discharge tube in a rolled configuration;

FIG. 19 is a front view of a preferred embodiment of the bottom and discharge tube of the present invention shown in FIG. 18;

FIG. 20 is a side view of a preferred embodiment of the bottom and discharge tube of the present invention, taken along lines 20-20 of FIG. 19;

FIG. 21 is an enlarged, detail view of FIG. 20;

FIGS. 26-30 illustrate views of preferred embodiments of fabric pieces for a body, fill tube, discharge tube, top, bottom and cover that can be used to manufacture a preferred embodiment of a bulk bag of the present invention;

FIG. 47 is a partial view of a preferred embodiment of a bottom and discharge assembly in folded, gusseted configuration under heat seal bars, illustrating an overlapped configuration of the bottom and discharge assembly taken along lines 47-47 of FIG. 31;

FIG. 48 is a sectional view taken along lines 48-48 of FIG. 47;

DETAILED DESCRIPTION OF THE INVENTION

Figure 1:
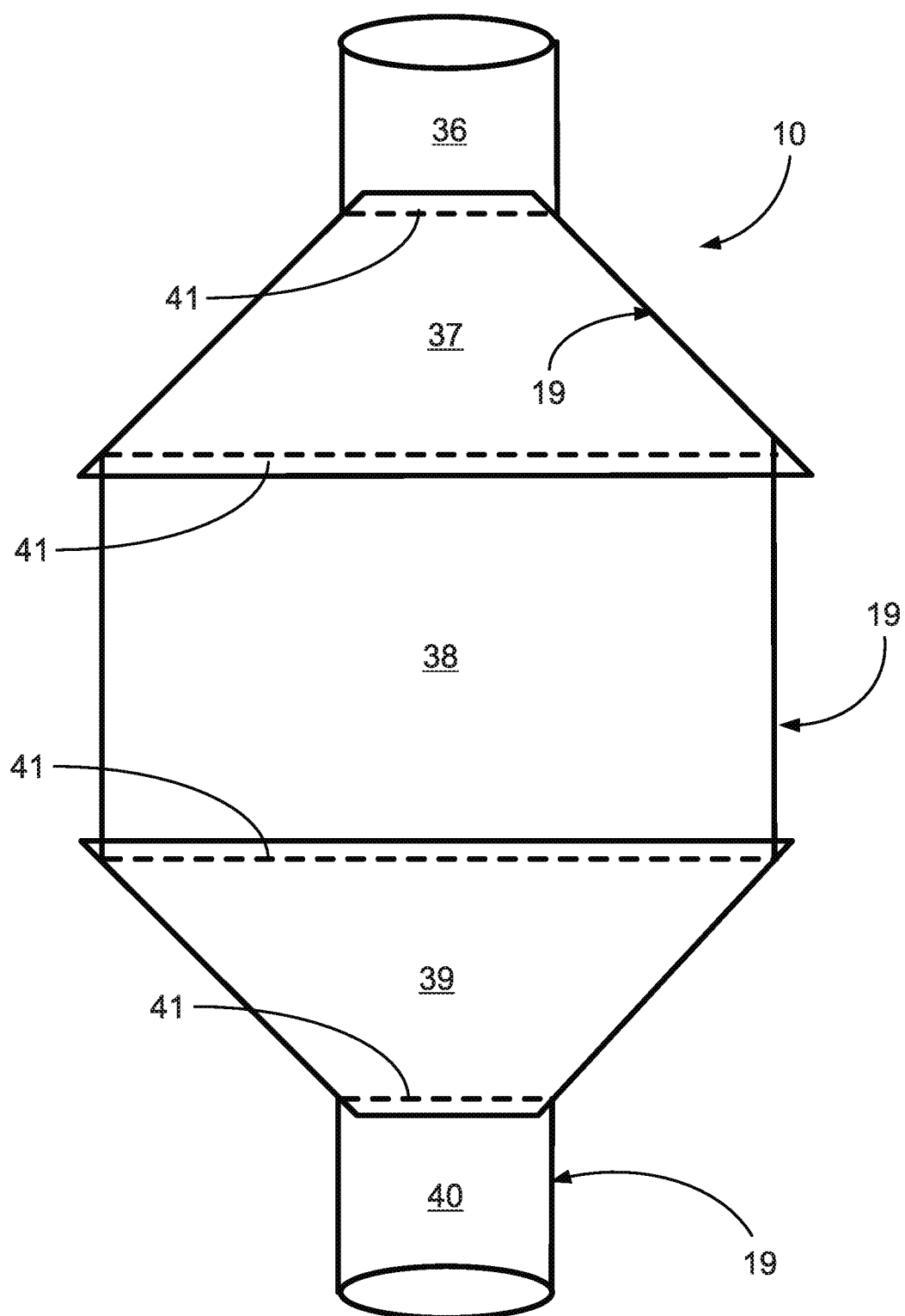
FIG. 1 is a schematic top view of a preferred embodiment of a bulk bag in a folded, gusseted configuration in which one or more preferred embodiments of a discharge assembly of the present invention can be included.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein.

It is to be fully recognized that the different teachings of the embodiments discussed below may be employed separately or in any suitable combination to produce desired results.

Unless otherwise specified, in the discussion and in the claims herein, the terms "including" and "comprising" are used in an open-ended fashion, and thus should be interpreted to mean "including, but not limited to . . . ".

Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

FIG. 1 is a schematic figure of a bulk bag 10. The bulk bag 10 is a large bag that can carry about one to two tons of materials, and in some cases more than 2 tons of material (e.g., 4,000 to 5,000 pounds of material), from one location to another. The discharge assemblies as described and shown herein can be used with such bulk bags, or can also be used with smaller bags, e.g., bags that are designed to carry about 15 to 80 pounds of bulk material, or bags of types that can hold about 80 to 5,000 pounds of bulk material.

A bag 10 can be filled with materials by gravity, for example, fed through a top spout or fill tube 36. The top spout or fill tube 36 can be coupled to an upper portion or top 37 at a seam or joint or heat seal connection 41, which may be sewn, heat fused or heat sealed, or connected by other means. The upper portion or top 37 can be coupled to an intermediate portion or body panel 38 at another joint or seam or heat seal connection 41. (Unless otherwise noted, all joints or seams 41 can be sewn, heat fused, or connected by other suitable means, e.g., as discussed herein). At a lower end of the intermediate portion or body 38, a lower portion or bottom 39 can be coupled at another joint or seam or heat seal connection 41. Finally, at a lower end of the lower portion or bottom 39, a bottom spout or discharge spout or discharge tube 40 can be coupled at another joint or seam 41. Various inner and outer surfaces of the bulk bag 10 and its components as described above may include a coating or lamination 19. The coating or lamination 19 can be a standard polypropylene fabric coating (e.g., a coating comprising a majority percentage of polypropylene and a small percentage of polyethylene) or a standard polyethylene fabric coating (e.g., a coating comprising polyethylene, or a mixture of polyethylene and other additives). Coating or lamination 19 can also be a heat sealing coating used in bonding (e.g., a coating having propylene based elastomers, propylene based plastomers or a combination thereof).

In bags including heat fused joints or seams, some surfaces of a bulk bag 10 as described herein and/or at least some of its components have a coating 19 that is a fusion or heat sealing coating which may be used in bonding, while other surfaces include a coating 19 that is a standard polypropylene fabric coating or standard polyethylene fabric coating (depending on whether the bag fabric is polyethylene or polypropylene, for example). A fabric piece with a heat fusion or heat sealing coating facing another fabric piece with a heat fusion or sealing coating can be joined to form a joint 41 by adding heat and pressure. A fabric piece with a heat fusion or heat sealing coating facing a fabric piece with a standard polypropylene fabric coating for example, can also be joined to form a joint 41 by applying heat and pressure. Reference is made to patent publication numbers WO2014/197728, US2014/0363106, WO2014/197727, and US2014/0360669, incorporated herein by reference.

A fusion or heat sealing coating preferably comprises propylene based elastomers, propylene based plastomers or a combination thereof. More preferably, the fusion or heat sealing coating comprises about 50% to 90% of propylene-based plastomers, propylene-based elastomers, or mixtures thereof and about 10% to 50% polyethylene resins and additives, having a melting point that is preferably at least about 5 degrees lower than the melting point of the fabrics to be joined together. Most preferably, the coating comprises about 50% to 90% of VERSIFY™ 3000 and about 10% to 50% polyethylene resins, having a melting point that is preferably at least about 5 degrees lower than the melting point of the polypropylene fabrics to be joined together. Suitable propylene based elastomers or plastomers can be purchased for example under the trademark VERSIFY™ 3000, and EXXON™.

Portions 37, 38, and 39 may sometimes together be referred to herein as a containment area or main body of a bag 10. Intermediate portion 38 may also be referred to as a body panel or body portion of a bag 10.

A bulk bag 10 can be emptied by gravity, or via other suitable discharge means, through a discharge spout 40. Before discharge, the spout 40 is preferably closed in such a manner that the contained materials are prevented from discharging until bag 10 is properly positioned over a receiving hopper or other desired receptacle.

Figure 3:
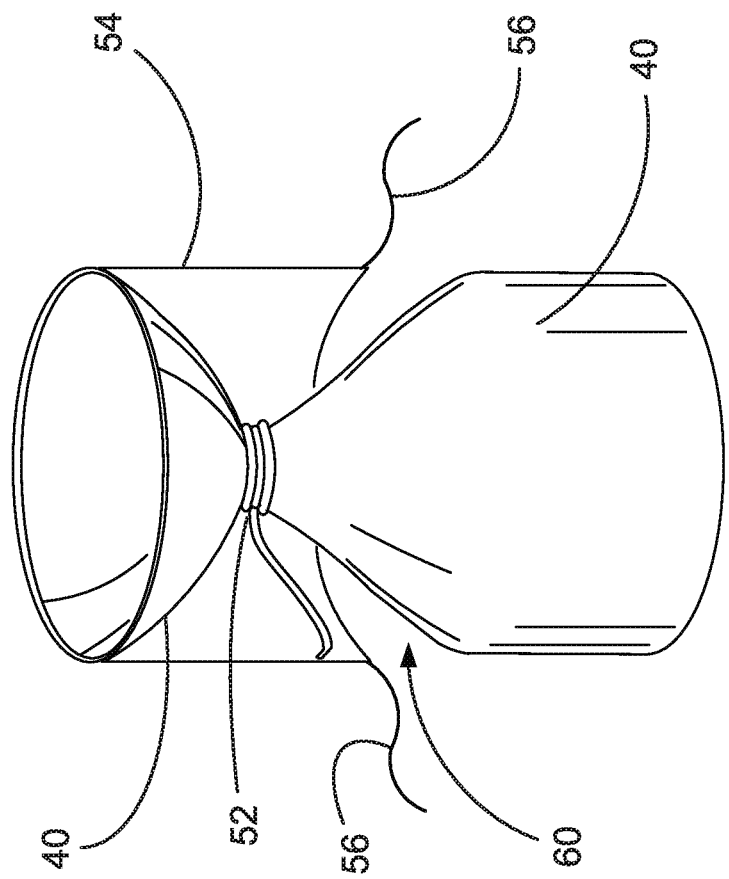
FIG. 3 is a detail view of the prior art discharge tube and cover shown in FIG. 2.
Figure 2:
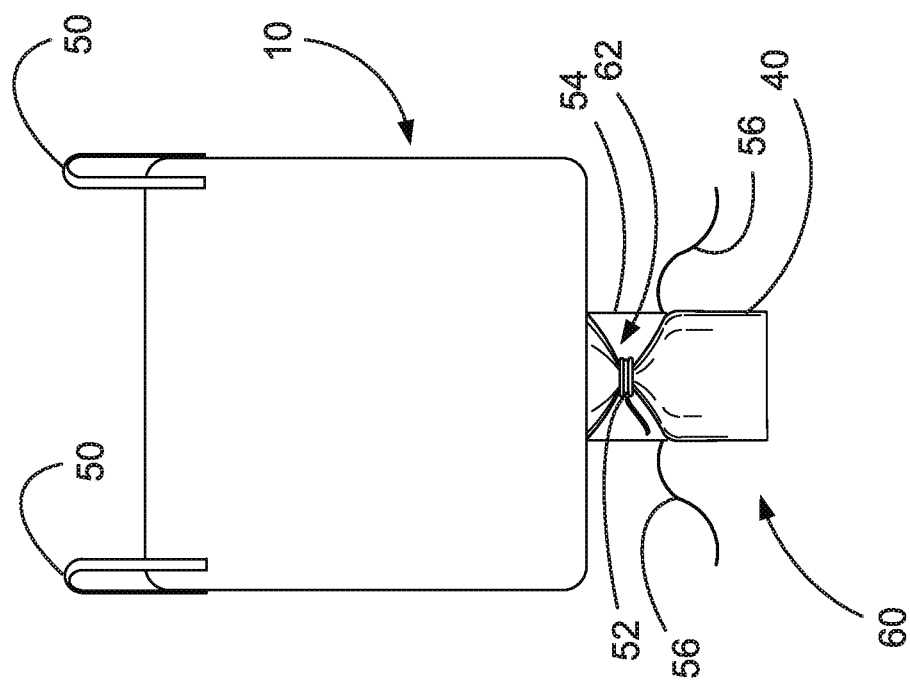
FIG. 2 is a prior art schematic side view of a bulk bag including a tied off discharge tube and a cut away view of a discharge cover with a drawstring tie.

Referring now to FIGS. 2 and 3, a prior art discharge assembly 60 is shown. A discharge spout 40 is gathered, bunched and pinched at a pinch point 62. The fabric is generally pinched tightly enough to prevent passage of material at pinch point 62. Pinch point 62 is then maintained by wrapping or tying a discharge spout tie 52 around pinch point 62. An outer cover 54, which can be hand tied with a cover tie or cord 56, can be provided. In the prior art embodiment as shown, when tying the cover 54 in place around the discharge tube 40, the tied-off discharge tube 40 would be folded up against the bag. The figures show a cutaway view of the cover, which includes a tie or cord 56, e.g., a drawstring tie, that can be pulled and tied off to effect closure of the cover over the discharge spout 40, e.g., after folded in half. The prior art discharge cover 54 does not extend across an entire width of the bag bottom from one side to an opposing side.

In the embodiment of a prior art discharge assembly 60 as described above, to change from a closed configuration to an open configuration during discharge, the knots in the tie 56 first must be untied while under pressure from the materials contained in bag 10, or will need to be cut or otherwise removed. Knots in ties 52 will also need to be untied, while under pressure from the material contents of the bag. Such pressure generally makes knots difficult to untie; the knots often tangle or do not slip open properly. If the knots do not untie properly, the operator must reach under bag 10 with both hands to untie the knots. Due to the weight of the materials above the knots, the operator is quite often unable to untie the knots. Further, such an effort requires the operator to expose the operator's head, shoulders, and arms underneath the large volume of materials within bag 10. The downward forces being applied by the operator to untie the knots increase the risk of unpredictable discharge, or bag 10 dropping. If the operator cuts the knots to release the materials, then loose pieces of tie can fall into and mix with the materials, causing expensive contamination of the materials or damage to the conveying equipment.

Figure 5:
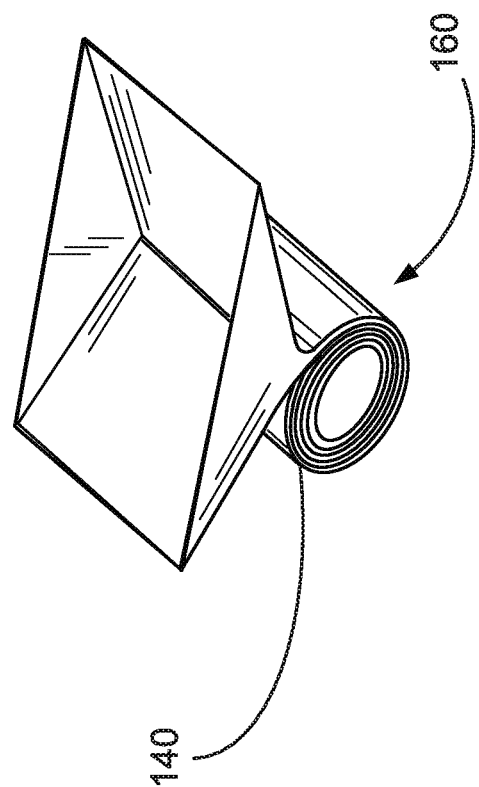
FIG. 5 is a partial detail view of a first preferred embodiment of a discharge assembly shown in FIG. 4.
Figure 4:
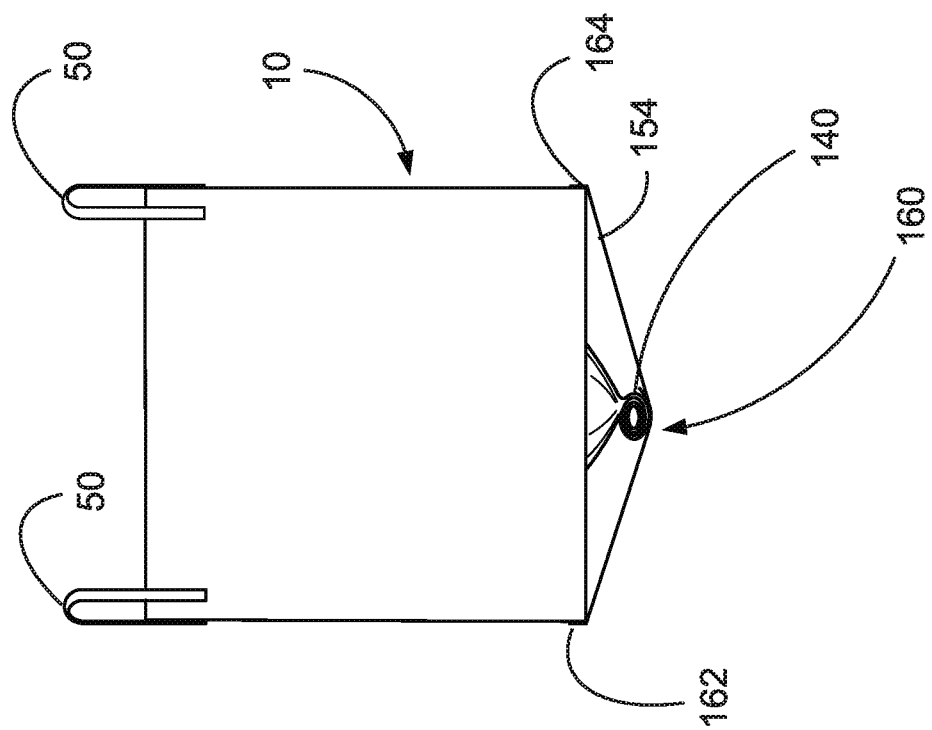
FIG. 4 is a schematic side view of a bulk bag including a first preferred embodiment of a discharge assembly of the present invention.

Referring now to FIGS. 4 and 5, a preferred embodiment of a discharge assembly 160 of the present invention is shown. Discharge assembly 160 on a bulk bag 10 eliminates problems associated with having to untie ties or knots on a cover and a discharge portion that is under pressure from material contents of the bag. Discharge assembly 160 preferably includes a discharge spout 40 rolled into a rolled configuration to define a rolled spout 140, and a releasable discharge spout coupler 152, which can be a tie or tape, e.g. fabric tape including an adhesive that preferably is not solvent based and wherein the adhesive remains active. Discharge spout coupler 152 will sometimes be referred to herein as tie or tape 152.

In some embodiments the discharge assembly 160 also includes a cover 154. Discharge spout 40 can be gathered or rolled toward the bottom of the bag 10. When rolled, discharge spout 40 has a plurality of rolled layers or stacked layers 148 and forms a rolled discharge spout 140. To maintain a rolled position adjacent to bottom 39 of bag 10, a releasable discharge spout coupler 152 can be applied. In some embodiments, discharge spout coupler 152 is an adhesive material, such as adhesive fabric tape, that can adhere to both rolled spout 140 and bottom 39 of bag 10 to capture rolled spout 140. Preferably, the adhesive fabric tape is a polypropylene fabric with an adhesive that is not solvent based and remains active. Other fabric tapes with an adhesive may also be used. The rolled spout 140 coupled to bottom 39 provides a closed configuration of discharge tube 140, which prevents discharge of materials from bag 10. The rolled layers 148 can also help prevent unwanted sifting of materials from bag 10.

In some embodiments, a cover 154 is included as part of discharge assembly 160 and preferably is disposed across rolled spout 140 that is coupled to bottom 39 of bag 10 via tie or tape 152. Cover 154 can be attached to bag 10 at couplings 162, 164. Couplings 162, 164 can attach cover 154 at two sides of body 38, e.g., at two opposing sides. Preferably, cover 154 is releasably attached to bag 10. In some embodiments, couplings 162, 164 include adhesives, while in other embodiments, couplings 162, 164 include heat fusion or heat sealing coatings. In some embodiments, the pressure from cover 154 helps maintain the rolled spout 140 or a tied spout 40 in position.

For discharge, if a cover 154 is part of discharge assembly 160, the cover 154 is first released from bag 10. In some embodiments, cover 154 can be released by peeling or detaching one or both couplings 162, 164. The rolled spout 140 can then be released by peeling or detaching tie or tape 152 coupled across spout 140. In this manner, an operator's hand is away from any material flow. An operator preferably can access both the cover 154 and the tie or tape 152 while positioned beside the bag and not standing under the bag. As the tie 152 is peeled or detached, the rolled layers 148 of rolled spout 140 unroll wherein materials flow easily from the bag 10. Preferably, peeling or detaching tie or tape 152 causes the rolled layers 148 to unroll and changes the closed configuration of rolled spout 140/discharge tube 40 to an open configuration. Preferably, no knots are used in discharge assembly 160, thus no knots need to be untied. Consequently, discharge assembly 160 of bag 10 can also be called knot-free.

Figure 13:
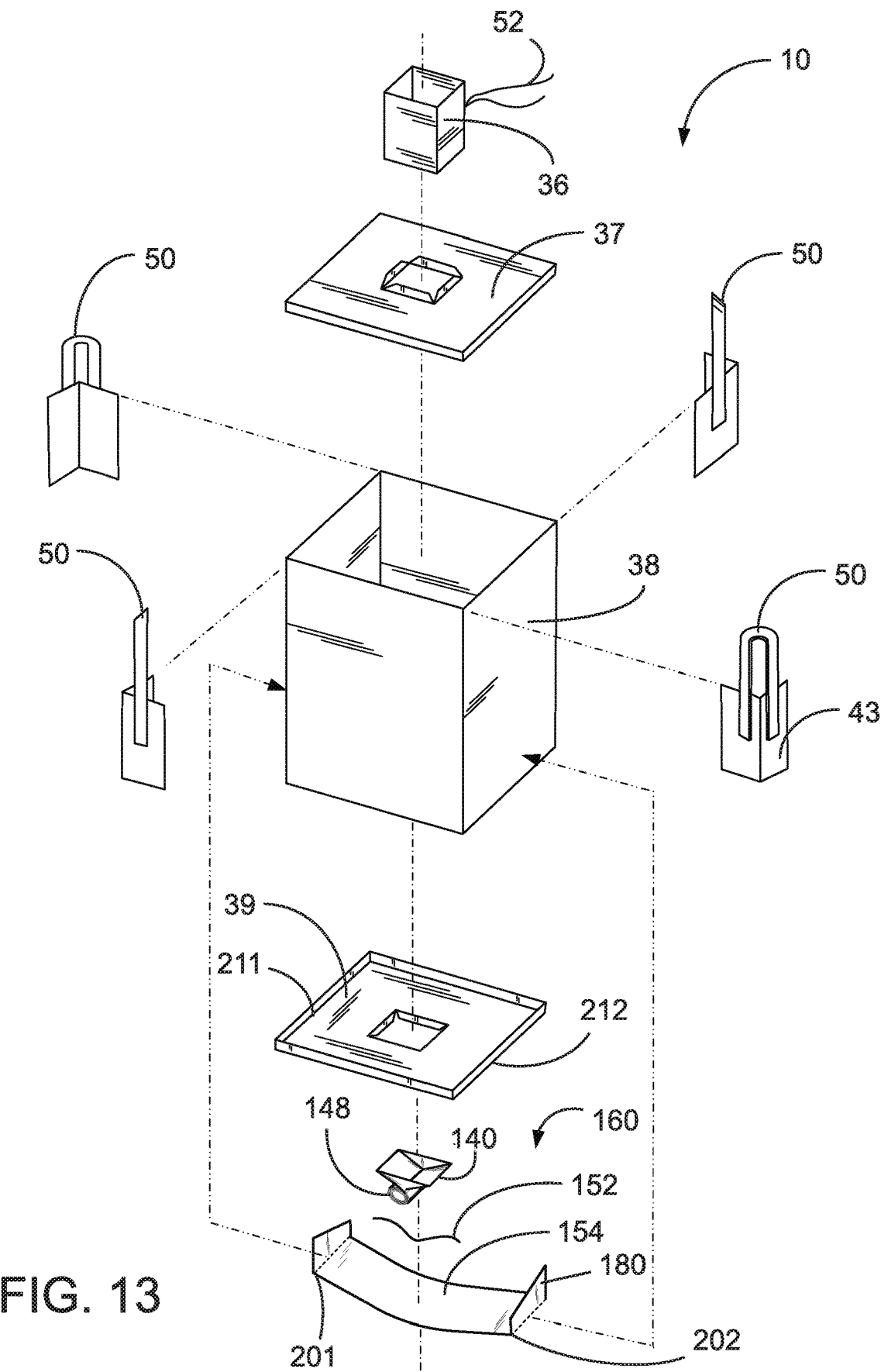
FIG. 13 is an exploded view of a preferred embodiment of a bulk bag of the present invention including a first preferred embodiment of a discharge assembly as shown in FIGS. 4 and 5 and a first preferred embodiment of a cover as shown in FIGS. 9-11.

FIG. 13 illustrates a bag 10 in exploded view including rolled discharge tube 140 with tie or tape 152 and cover 154. The bag 10 as shown also has a fill tube 36, top 37, body or intermediate portion 38, and bottom 39. Lift loops 50 can also be provided. In the embodiment as shown, the lift loops 50 can be sewn or otherwise attached to patches 43, which are preferably heat fused or sealed to body portion 38, or which can be attached to body portion 38 via other desired methods, e.g., sewing.

Figure 6:
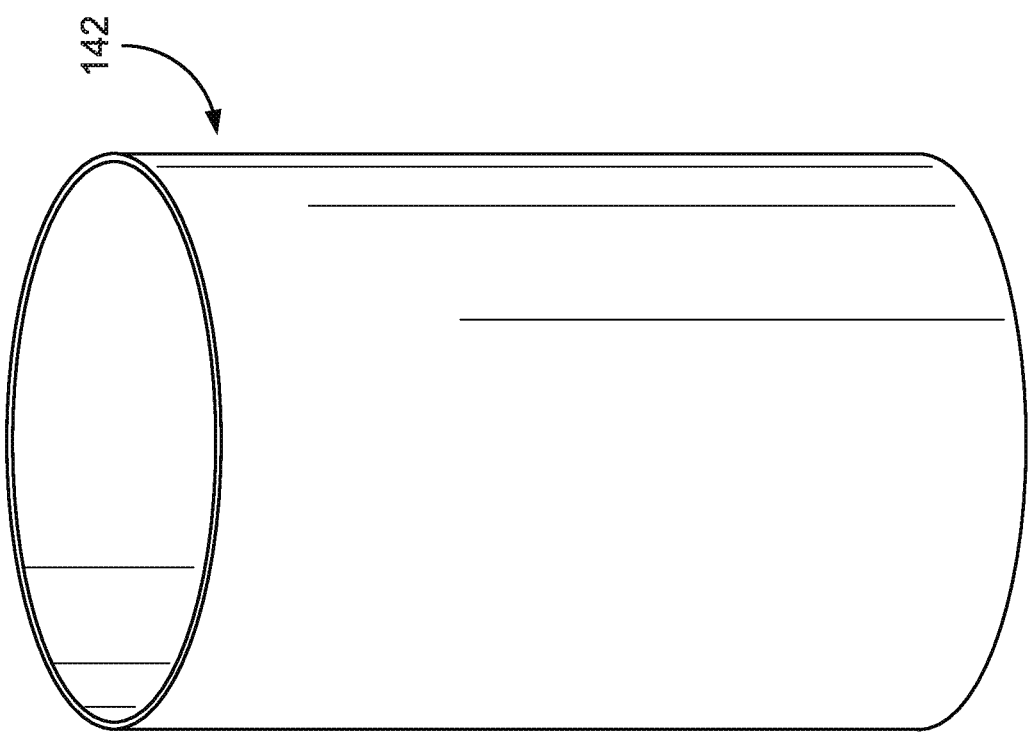
FIG. 6 is a perspective view of a circular or cylindrical discharge spout or tube that can be used in one or more preferred embodiments of the present invention.

Referring now to FIG. 6, in some embodiments, discharge spout/discharge tube 40 for use in discharge assembly 160 can be a discharge spout 142 with at least substantially circular openings. The circular discharge spout 142 may include, for example, about a 14-inch diameter. Such a circular discharge spout 142 will flatten out, for purposes of rolling, to about 22 inches. A cover 154 for the circular discharge spout would then preferably be about 23-24 inches wide, for example.

Figure 7:
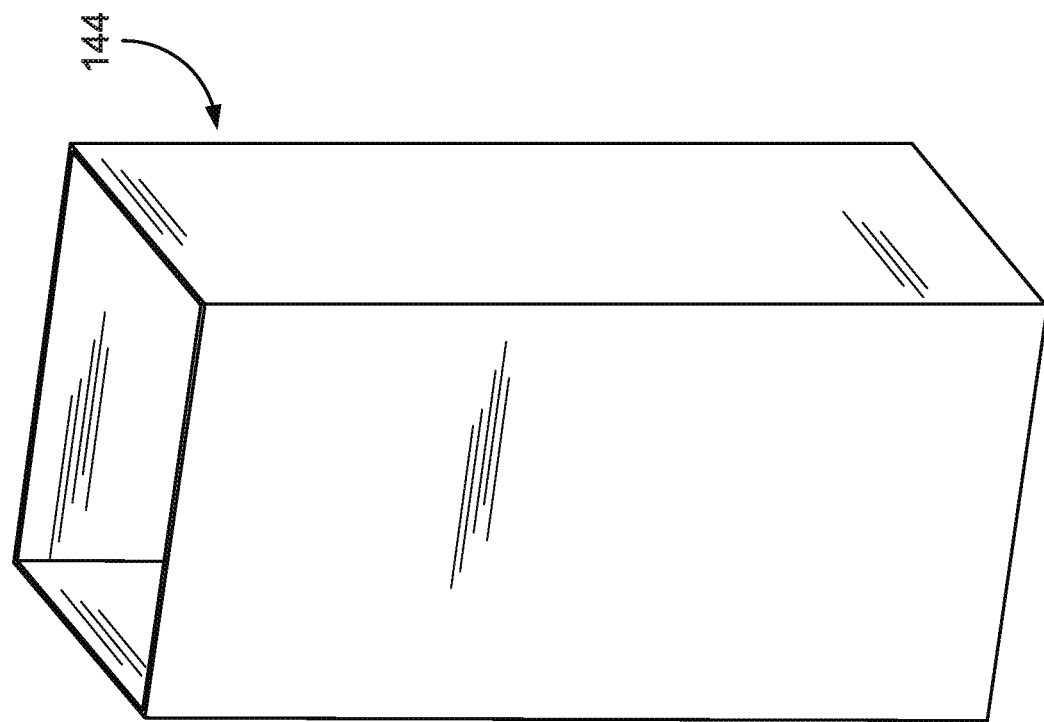
FIG. 7 is a perspective view of a square discharge spout or tube that can be used in one or more preferred embodiments of the present invention.
Figure 15:
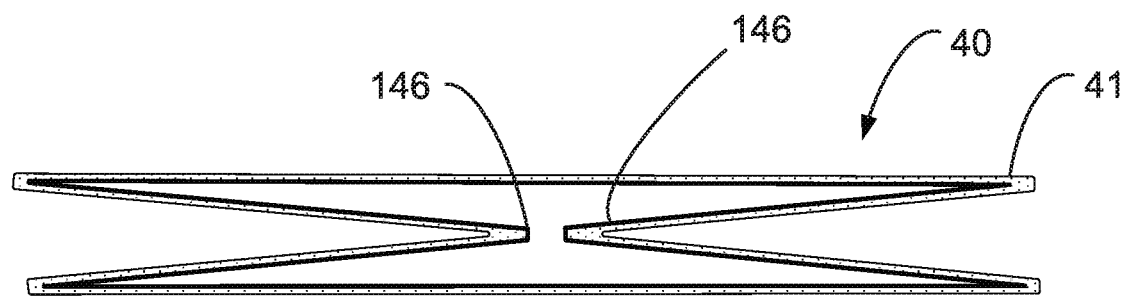
FIG. 15 illustrates an end view of a preferred embodiment of a discharge spout of the present invention in a folded, gusseted configuration.
Figure 16:
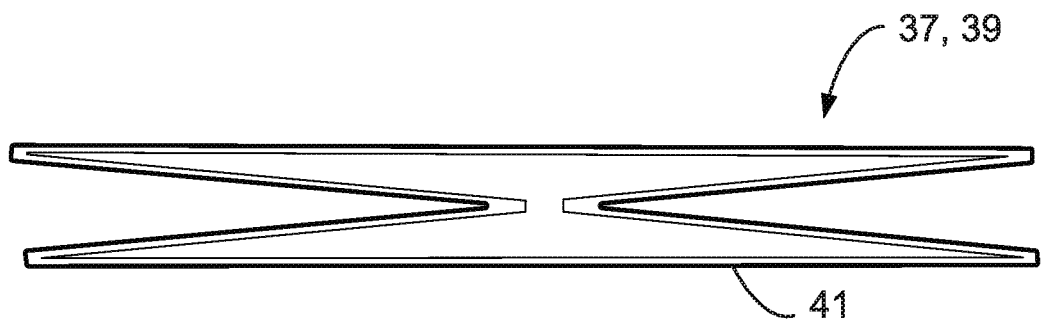
FIG. 16 illustrates an end view of a preferred embodiment of a bottom or top panel of the present invention in a folded, gusseted configuration.
Figure 17:
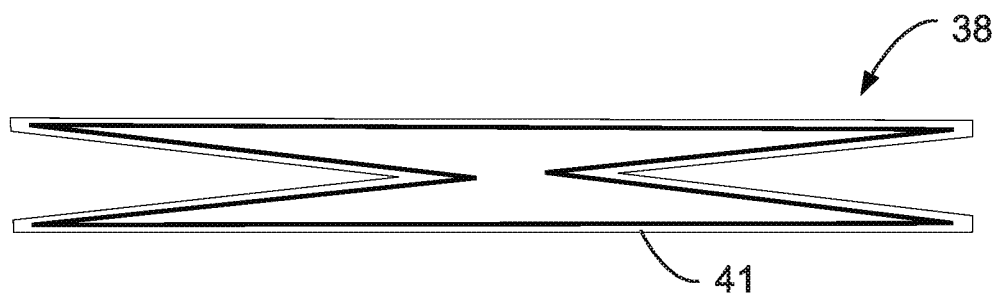
FIG. 17 illustrates an end view of a preferred embodiment of a bag body of the present invention in a folded, gusseted configuration.
Figure 22:
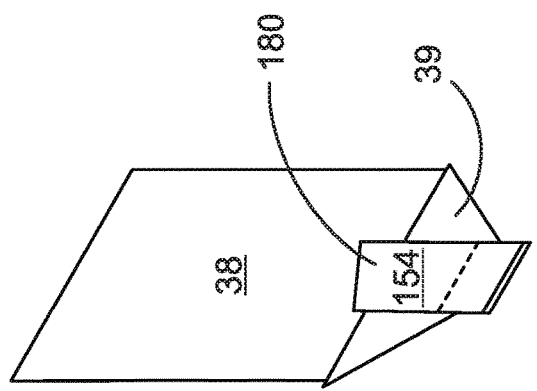
FIG. 22 is a perspective view of a rolled discharge tube, bottom and body panel of a bulk bag of the present invention including a first preferred embodiment of the cover and a first preferred embodiment of the discharge assembly with a rolled discharge tube.
Figure 23:
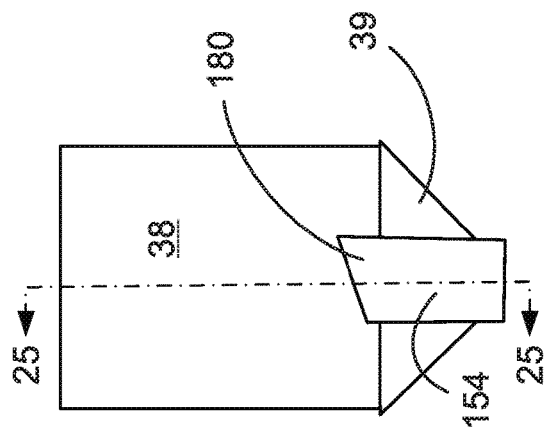
FIG. 23 is a front view of a preferred embodiment of the cover, discharge tube, bottom, and body panel of the present invention shown in FIG. 22.
Figure 24:
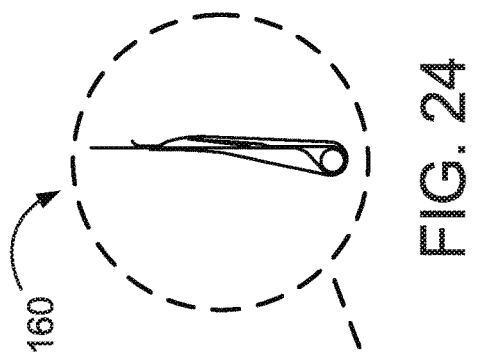
FIG. 24 is a side view of a preferred embodiment of the discharge tube, bottom, and body panel, taken along lines 24-24 of FIG. 23.
Figure 25:
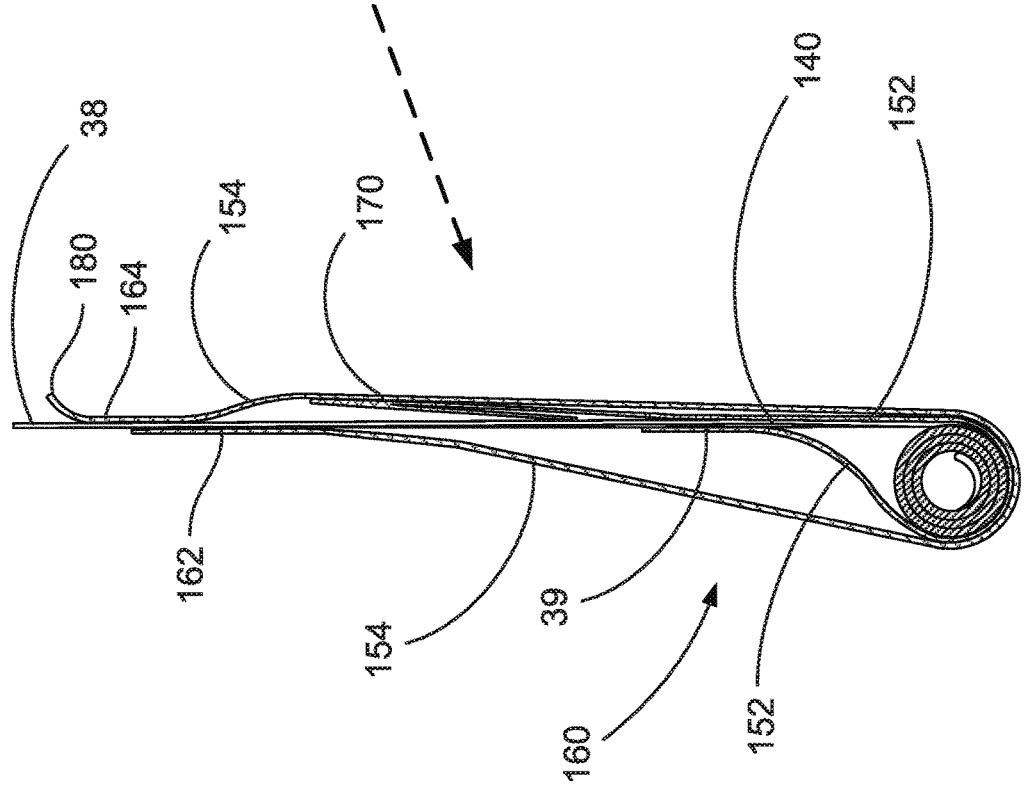
FIG. 25 is an enlarged, detail view of FIG. 24.

In other embodiments, as shown in FIG. 7, discharge spout/discharge tube 40 can be a discharge spout/discharge tube 144 with substantially square or rectangular discharge spout openings. Discharge spout/discharge tube 144 can be folded in a gusseted configuration. A discharge spout/discharge tube 40 that is a folded square or gusseted spout 144 can include gussets 146, e.g., see FIG. 15. By gusseting the discharge spout 144 first, it is easily rolled up from its open end to at or near bottom 39 of bag 10 into rolled configuration to form a rolled discharge spout 140. The square, gusseted spout 144 will flatten out, for purposes of rolling, to about 11 inches wide, for example. The corresponding cover 154 for the square, gusseted spout 144 would preferably be about 12-13 inches wide, for example. FIG. 16 also shows top 37 or bottom 39 in folded, gusseted configuration. FIG. 17 depicts body 38 in folded gusseted configuration.

In various preferred embodiments of a rolled spout 140, e.g., formed from a folded or square spout 144, the multiple, stacked or rolled layers (for example, see layers 148 of FIG. 8) of rolled spout 140, prevent any materials from leaving bag 10 prematurely. By securing rolled spout 140 by supporting it from the bag above, as described above, rolled spout 140 cannot open until released. Tie or tape 152 coupled to bottom 39 of bag 10 and to rolled discharge tube or spout 140 secures rolled discharge tube or spout 140 to bottom 39 of bag 10 and prevents discharge of material contents from bag 10. The single piece of tape 152 coupled to bottom 39 of bag 10 and rolled discharge tube or spout 140 can prevent 1,000 to 5,000 pounds of bulk material, for example, from discharging from bag 10.

Figure 8:
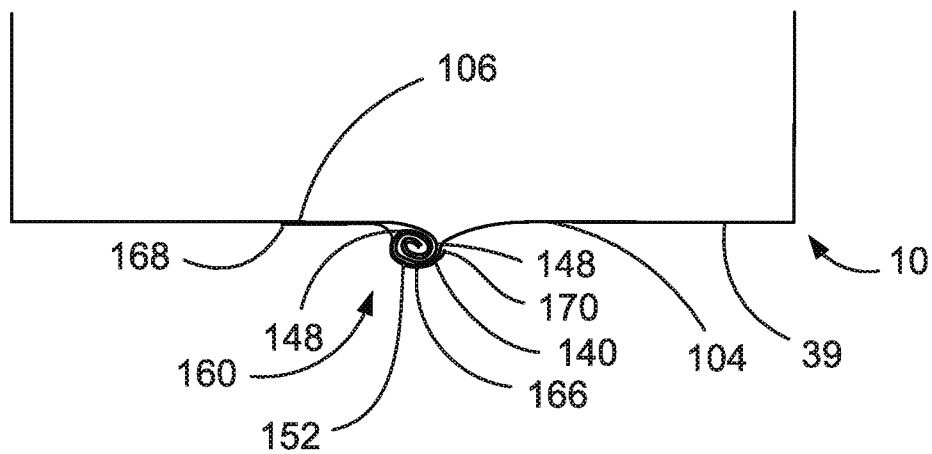
FIG. 8 is a side view of a first preferred embodiment of a discharge assembly illustrating a spiraled rolled spout retained by a releasable coupler.

Referring next to FIG. 8, rolled discharge spout 140 is shown attached to bottom 39 of bag 10, such as by sewing or heat sealing or heat fusion at locations 104, 106. A discharge spout 40 is then rolled up from the loose, bottom end in a tight spiral forming stacked or rolled layers 148 of a rolled spout 140. The tight spiral is preferably rolled until the roll is centered up against bottom 39 or near bottom 39. In some embodiments, an adhesive tape 152 is applied at location 168, such as two inches outside of spout heat sealing, fusion or sewn connection or coupling 106, for example. Tape 152 is then applied to extend across the gap to spiral rolled spout 140.

In some embodiments, a coupling 166 of the adhesive tape 152 does not wrap completely around rolled discharge spout 140, from one location on bottom 39 to another location on bottom 39. For example, coupling 166 of the adhesive tape 152 to rolled discharge spout 140 can be applied approximately two-thirds of the way around rolled discharge spout 140 as shown in FIG. 8.

Figure 9:
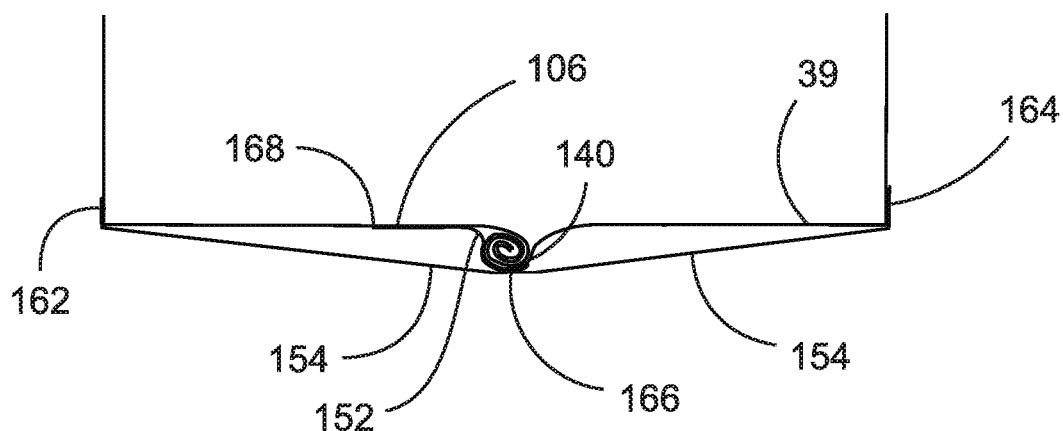
FIGS. 9 and 10 illustrate a first preferred embodiment of the discharge assembly of FIG. 8 further including a first preferred embodiment of a releasable cover of the present invention.
Figure 10:
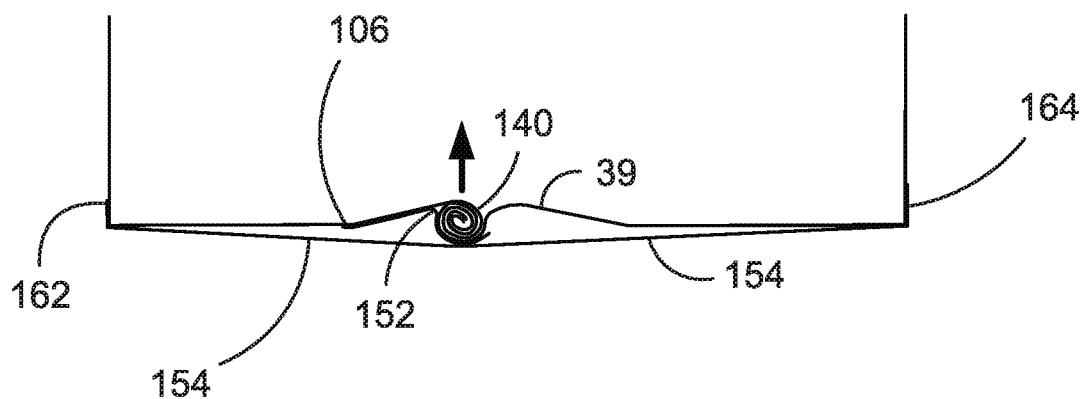

In some embodiments, an end of adhesive tape 152 is folded back on itself to form a release tab 170. When bag 10 is ready to be discharged, tab 170 is pulled, peeling back adhesive tape 152 until it clears rolled discharge spout 140 and releases the contained materials. Referring now to FIG. 9, cover 154 is preferably applied across rolled spout 140 and adhesive tape or coupler 152, with cover 154 being coupled to body portion 38 at releasable couplings 162, 164. As shown in FIG. 10, rolled discharge spout 140 can be compressed up into or against bottom 39 of bag 10 such that a portion of bottom 39 is pushed upward and a bottom surface of bag 10 at the cover 154 is made flatter for transport.

Figure 12:
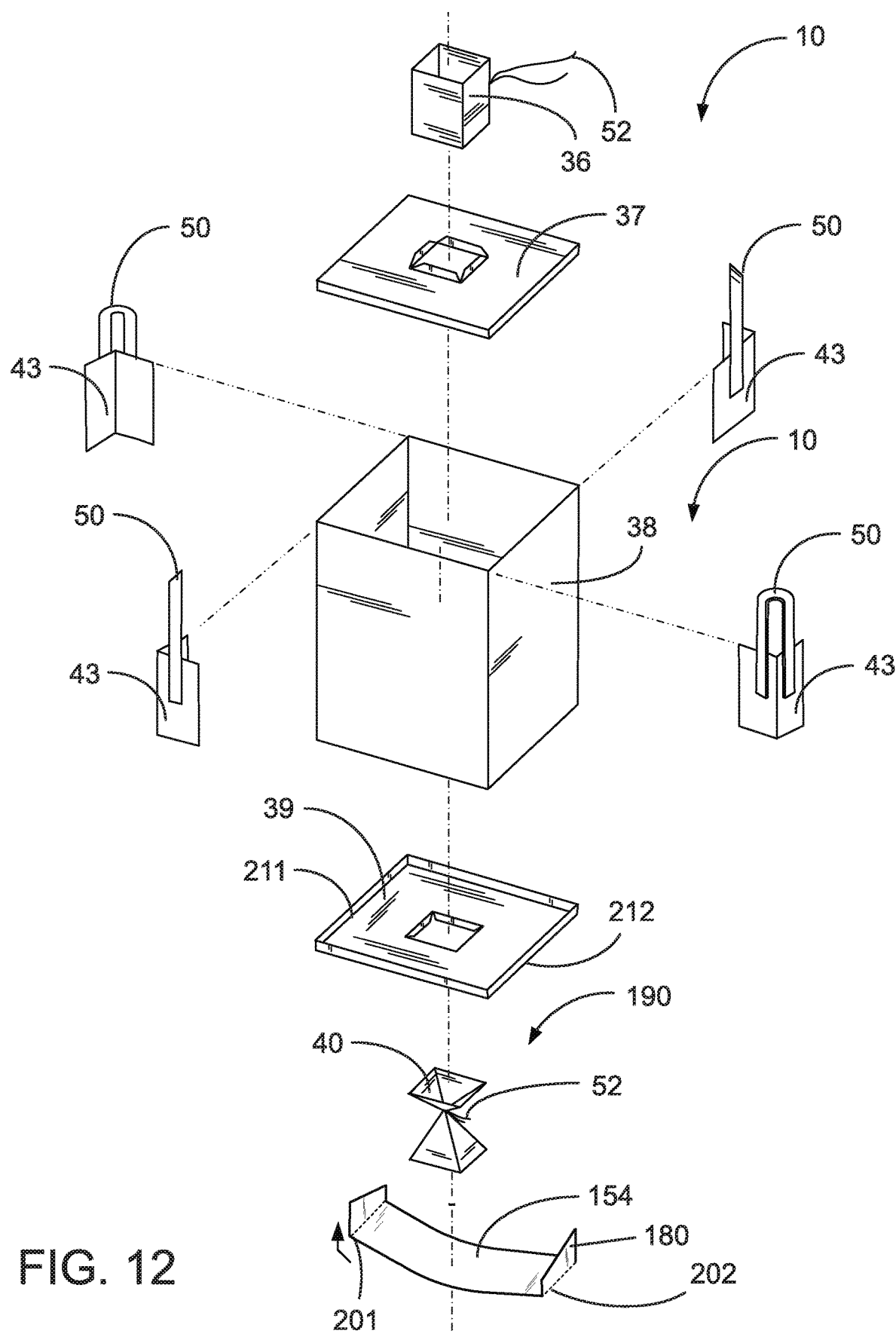
FIG. 12 is an exploded view of a preferred embodiment of a bulk bag of the present invention including a second preferred embodiment of a discharge assembly with a tied discharge tube and a first preferred embodiment of the cover as shown in FIGS. 9-11.

In some embodiments, cover 154 is shorter in length, e.g., about 2 inches shorter, than the length required to cross bottom 39 of bag 10 and has a sealable area. Referring to FIG. 12, for example, the distance between a bend line 201 and 202, on cover 154 can be shorter than the distance between edge 211 and edge 212 on bottom 39, wherein cover 154 can be coupled to bag 10 at or near or above bend line 201 and bottom edge 211, and cover 154 can also be coupled to bag 10 at or near or above bend line 202 and bottom edge 212. Thus, cover 154 can extend from a first body 38 side, across bottom 39 of bag 10 and over rolled discharge spout or tube 140 to a second body 38 side, the cover 154 having a first bend location 201 at which the cover can extend across a first bottom edge 211 to the first body 38 side and a second bend location 202 at which the cover can extend across a second edge 212 of bottom 39 to a second body 38 side.

When cover 154 is coupled to bag 10 as described above, the shorter distance between bend locations 201, 202 as compared to the distance between bottom edges 211 and 212 in effect cinches bag 10 bottom 39. In such a configuration, cover 154 provides support for rolled discharge tube or spout 140. Such support can help rolled discharge tube or spout 140 to pass the required five to one safety lifting margins in bags having material contents of about 1,000 pounds to 5,000 pounds for example, in a bag with heat fused joints. Such cover 154 also provides additional support for bag 10 bottom 39.

Figure 11:
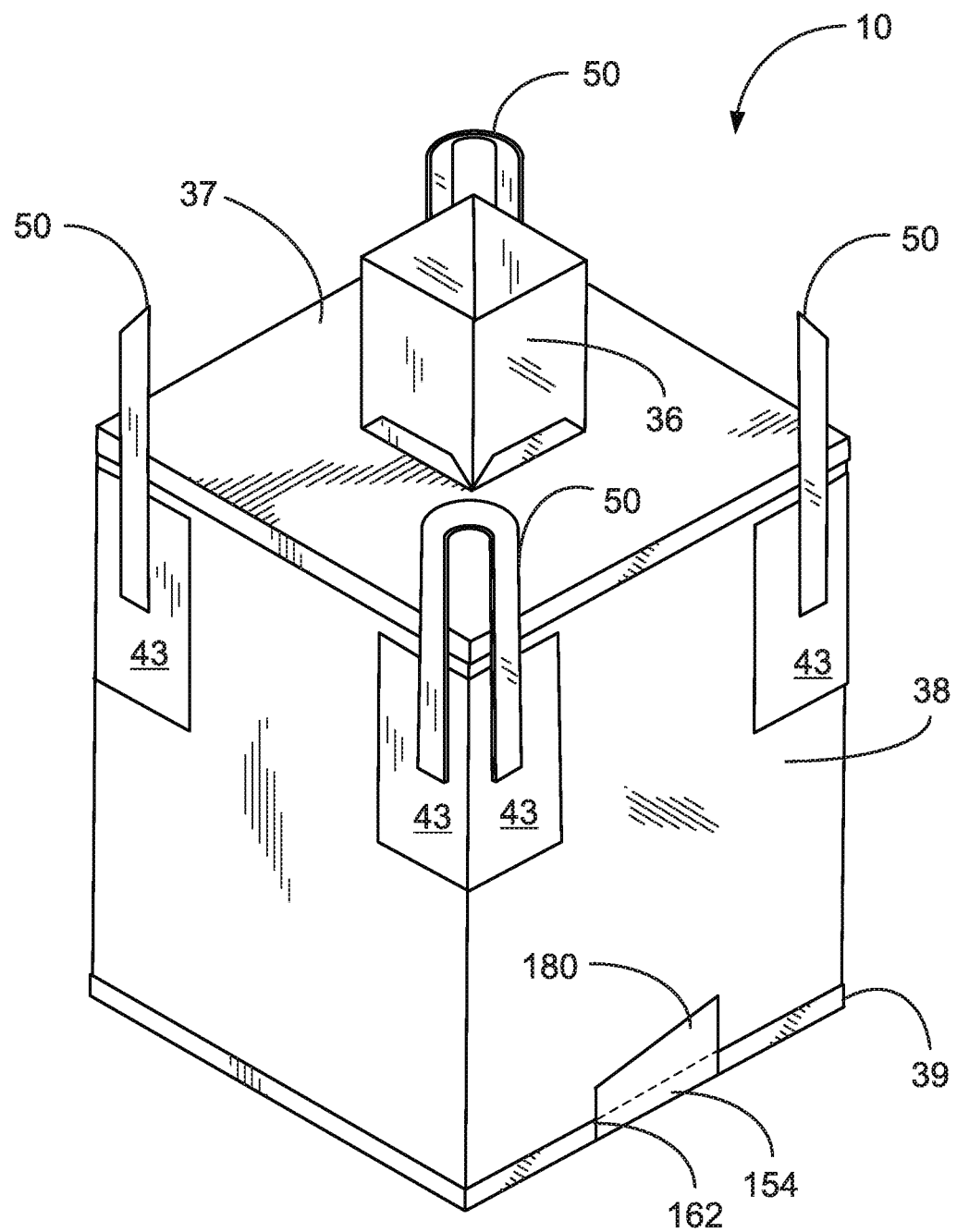
FIG. 11 is a perspective view of a bulk bag including a first preferred embodiment of a bottom cover.

Referring now to FIG. 11, a bag 10, which includes an installed or coupled cover 154 of FIGS. 9 and 10, is shown. Cover 154 preferably extends across bottom 39, and is releasably coupled at coupling 162, extending from a first body 38 side across bottom 39 over rolled discharge tube or spout 140 to an opposing body 38 side at coupling 164 (not shown). Preferably, an unattached portion or tab 180 is provided, which can be a pull tab to peel cover 154 from the side of bag 10 for releasing cover 154 away from bottom 39 of bag 10 and rolled spout 140.

Thus, as described above, a bulk bag 10 preferably includes a discharge spout 40 to be spiral rolled into position up against, adjacent or near bottom 39 of bag 10 to form a rolled discharge tube or spout 140. To retain the spiral rolled discharge tube or spout 140 in closed position, e.g., against the bottom 39, a first releasable coupler 152 is coupled to bottom 39, across or along rolled discharge tube or spout 140, and coupled to rolled discharge tube or spout 140. The first releasable coupler 152 is preferably attached or coupled with adhesive or heat sealing, thus it is knot-free. A second releasable coupler, or cover, 154 may also be releasably coupled over the spiral rolled discharge tube or spout 140 with adhesive or heat to body 38 sides.

Consequently, the spiral rolled discharge tube or spout 140 is maintained in rolled position, and can easily be released by pulling, peeling, or otherwise releasing the couplers 152, 154 in a knot-free manner. The spiral rolled discharge tube or spout 140 can easily and safely be released by pulling, peeling, or otherwise releasing the couplers 152, 154 in a knot-free manner while under pressure from the material contents of the bag.

Referring now to FIG. 12, an alternative embodiment of a discharge assembly 190 is shown. In this embodiment, a bulk bag 10 includes a discharge spout 40 that can be closed or pinched off with a tie or tape or cord 52, e.g., in a manner that is the same or similar to what is shown and described with regard to FIGS. 2, 3. Typically after being closed or pinched off and tied, discharge tube 40 is then folded against the bag bottom 39, e.g. folded in half against bottom 39, for storage or transport, prior to filling with materials. Cover 154 can be the same or similar to a cover 154 as described with regard to discharge assembly 160. The installed outer cover 154 can make the bottom surface of bulk bag 10, including discharge assembly 190, flatter for transport. Bulk bag 10 can then be filled and shipped to an end use location.

As shown in FIG. 12, in discharge assembly 190, cover 154 preferably extends from one side of a body or intermediate portion 38 of bag 10 across bottom 39 and over discharge tube 40, to another side of body or intermediate portion 38 of bag 10. In some embodiments, cover 154 can be heat fused or heat sealed to opposing sides of bag body 38 to couple cover 154 to body or intermediate portion 38. Preferably, cover 154 is releasably attached to the bag body 38, in the same or a similar manner as described with regard to discharge assembly 160, and wherein pulling on tab 180 from a side of bag 10 can effect release of cover 154. Preferably, a distance between bends 201 and 202 is also shorter than a distance between edges 211 and 212 in this embodiment as well.

A bag 10 with a discharge assembly 190 is shown in an exploded view in FIG. 12 and has a fill tube 36 with a tie or cord 52, top 37, body or intermediate portion 38, bottom 39 and discharge tube 40 with a tie or cord 52 thereupon. In the embodiment as shown, lift loops 50 can be sewn or otherwise attached to patches 43, which patches 43 are preferably heat sealed to body portion 38. Patches 43 may also be attached via sewing, for example.

The bulk bag 10 can then be filled and shipped to an end use location. Bag 10 is ultimately lifted over a receiving hopper or other receptacle and prepared for discharging. For lifting, the bag 10 may be provided with lift loops 50.

A tie 52 can be a rope or a woven fabric tie. In some embodiments, a slip knot is hand tied into the rope or woven fabric to complete the discharge spout tie 52.

In the embodiment of a discharge assembly 190 as described above, to change from a closed configuration to an open configuration during discharge, tab 180 of cover 154 can be pulled to effect release of the cover 154, which preferably can be done from the side of the bag 10 without requiring an operator, or an operator's hand(s) or arm(s) to go under the bag 10. The tie or cord 52 will then still need to be untied or otherwise removed while under pressure from the materials contained in the bag 10. This embodiment is an improvement over the prior art embodiment as shown in FIGS. 2 and 3 because only the tie or cord 52 on discharge tube 40 will need to be untied or otherwise removed. A tie or cord 52 on a discharge tube generally is easier to untie or otherwise remove, than a tie 56 on a discharge cover 54 as shown and described with regard to FIGS. 2 and 3. Additionally, in this embodiment, cover 154 can be removed without having to reach under bag 10, and can be removed while standing beside the bag 10.

A cover 154 as described with regard to embodiments 160, 190 of a discharge assembly is an improvement over prior art covers because it extends across an entire width of the bottom of a bag, makes a bag bottom surface flatter for transport, makes a bag bottom surface cleaner and helps prevent any unwanted leakage, or at least limits leakage, from the bag, and provides more support for the bag. A cover 154 as described with regard to embodiments 160, 190 of a discharge assembly is also an improvement over prior art covers because it provides additional support for a bag and bottom and discharge tube joint.

A cover 154 as shown can include tab portions 180 and comprise the shape as shown. A cover 154 can also comprise more of a spherical shape, e.g., oval or circular, or can be substantially rectangular, for example. A cover may also be square, but preferably less material is used for a cover 154, as a cover 154 does not need to completely cover bottom 39 of bag 10 in order to provide the advantages described herein.

As indicated herein, a discharge assembly 160, 190, can be used with a bag 10 that has sewn seams and/or has heat fused seams, or which has seams or joints otherwise connected. In embodiments where there are sewn or heat fused seams, the distance between bend locations 201, 202 of a cover 154 can be about equal to a width of the bag bottom 39, e.g., about equal to a width between edges 211 and 212. The distance between bends 201 and 202 can also be shorter than the distance between edges 211 and 212. For example, the distance between bends 201 and 202 can be any distance that is less than equal to the distance between bottom edges 211 and 212, e.g., a distance shorter than equal to about 4 inches shorter than the distance between bottom edges 211, 212.

When a bag 10 has heat fused joints, or at least a heat fused joint connecting a discharge tube 40 and bottom 39, preferably the distance between bends 201 and 202 is at least two inches shorter than the distance between bottom edges 211, 212. When the distance between bends 201 and 202 is any distance shorter than equal to the distance between edges 211 and 212, the bottom cover 154 provides additional support and strength to the discharge assembly 160, 190 and bag 10. By having a shorter distance between the bends 201, 202, it causes an uplift to the bottom 39 of the bag 10. When a cover 154 is in place as shown in the figures, pressure applied to joints of a bag at the bottom and discharge tube locations, from material contents within the bag must overcome and stretch the cover 154 in order to cause a failure of said joints. As the distance gets closer to 4 inches shorter or more than 4 inches shorter than the distance between edges 211 and 212, the bottom surface of the bag 10 gets more and more pinched and lifted up and becomes more uneven. The joints of the bag also start to become stressed.

Regarding discharge assemblies 160 and 190, when a bag 10 has a bottom 39 and discharge tube 40 that are connected with a heat fused joint, a cover 154 provides additional strength which can help the bag 10 to pass the required 5 to 1 safety requirements in the industry.

A rolled discharge tube assembly 160 with a cover 154 having a distance between cover 154 bends 201 and 202 that is about equal to the distance between edges 211 and 212 has passed the required 5 to 1 safety tests. A discharge assembly 160 with a cover 154 having a distance between cover 154 bends 201 and 202 that is equal to the distance between bottom edges 211 and 212, however, has only passed the require 5 to 1 safety tests 50% of the time. As the distance between a cover 154 bends 201 and 202 becomes shorter than equal, a heat fused bag 10 with a discharge assembly 160 was able to pass the safety 5 to 1 safety lifting requirements at least about 99% of the time.

In the FIBC/bulk bag industry, based on the 5 to 1 safety requirements, a bag that will be carrying 2,000 pounds of material for example, must pass testing with 10,000 pounds of pressure applied, before the bag breaks. To test the bag, the bag is hung from its lift loops and hydraulic pressure is applied from a top of the bag to measure the force needed to break the bag.

In testing, a bag designed to hold 2,000 pounds of bulk material and having a heat fused or heat sealed discharge tube 40 and bottom 39, and a rolled discharge tube 140 configuration or pinched 40 in a closed configuration failed when applying 7,000 pounds of pressure to the bag. When a cover 154 was added to form a discharge assembly 160 or 190, the bag designed to hold 2,000 pounds of bulk material with a heat fused joint connecting a discharge tube 40 and bottom 39 was able to withstand 13,000 pounds of pressure applied to the bag during testing. A cover 154 can thus increase the strength of a bag 10 by over 85% and at least by over 50%.

In embodiments where a bag 10 comprises sewn seams, a cover 154 is not needed in order for the bag 10 to pass the 5 to 1 safety requirements. A cover 154 is advantageous for a bag with sewn seams to provide additional support and strength to the bag 10, provide a cleaner bottom surface, and to provide a flatter bottom surface for the bag 10.

Figure 14:
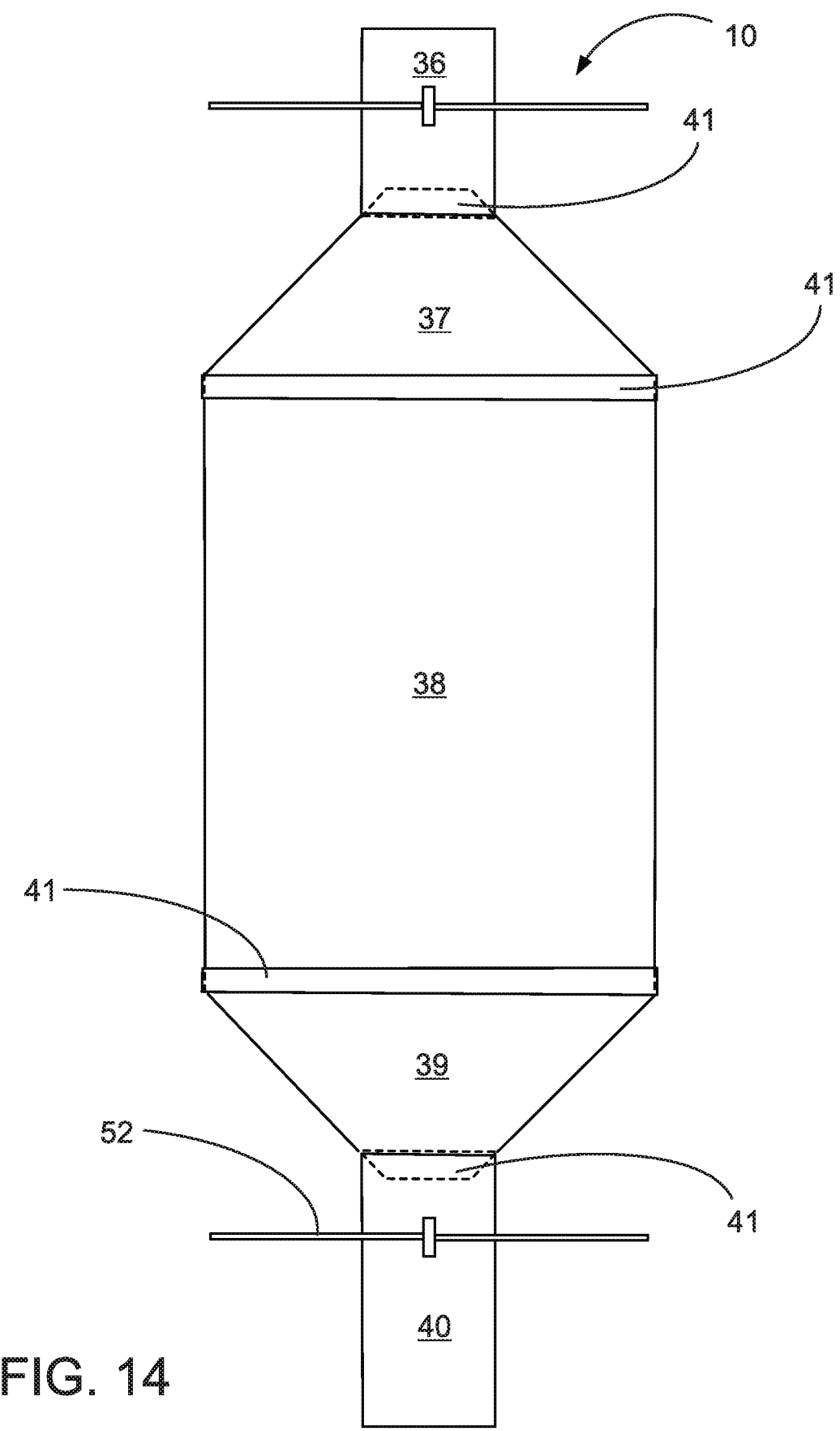
FIG. 14 is a top view of a preferred embodiment of a bulk bag of the present invention folded in a gusseted configuration.

In FIG. 14, a top view of a bag 10 is shown, in folded, gusseted formation, after it preferably has been pressed to maintain a substantially flat configuration. The discharge tube 40 shown is a rectangular gusseted tube 144 that has a pair of substantially square openings. The discharge tube 40 can be pinched closed and tied off with tie 52 to form a closed configuration of a discharge tube assembly 60. To change such a discharge tube assembly 60 from a closed to open configuration, the tie or strap 52 can be untied or otherwise removed.

Alternatively, the tie or strap 52 can be removed or not provided on a discharge tube 40, and the discharge tube or spout 40 can be rolled up towards bottom 39 and coupled thereto in accordance with forming a rolled discharge tube 140 and a closed configuration of a discharge tube assembly 160 as described herein. In some embodiments, discharge tube 40 can also be rolled with a strap or tie 52 still positioned on tube 40, although preferably the tie or strap 52 is not present in the embodiment of assembly 160.

FIG. 18 illustrates a perspective view of bottom 39 and discharge tube assembly 160 as shown in FIG. 13 in folded, gusseted configuration after discharge tube 40 has been rolled into a closed configuration to form rolled discharge tube 140. Tape or tie 152 is shown adhered to bottom 39 and rolled discharge tube 140. FIG. 19 illustrates a front view of bottom 39 and rolled discharge tube or spout 140 as shown in FIG. 18.

FIGS. 20 and 21 illustrate a side view of bottom 39 and rolled discharge tube or spout 140. As shown, tape 152 is adhered to bottom 39 and rolled discharge tube or spout 140 and extends from bottom 39 to under and around rolled layers 148 of rolled discharge tube or spout 140 and to a back side of rolled discharge tube or spout 140. The non-adhered portion or tab 170 of tape 152 provides a pull tab, which when pulled will release the rolled layers 148. The pull tab 170 can be formed by folding tape 152 back on itself, or by not heat fusing that portion, for example if a heat fusion or heat sealing method is utilized. As described above, alternatively, tape 152 does not have to be wrapped fully around rolled discharge tube or spout 140, see FIGS. 8-10.

FIGS. 22-25 illustrate the rolled discharge tube or spout 140 as shown in FIGS. 18-21 including a cover 154 extending from a front body portion/intermediate portion 38 side across bottom 39 and under the rolled discharge tube or spout 140 to a back body portion/intermediate portion 38 side.

In a preferred embodiment a cover 154, whether used with a rolled discharge spout 140 or tied off spout 40, is preferably adhered to opposing sidewalls of body or intermediate portion 38 via heat fusion or heat sealing to form a bond or joint 41, e.g., to establish couplings 162, 164. Preferably, cover 154 is attached to body 38 so that all forces of the material contained within bag 10 only stress cover 154 couplings 162, 164 in a shear position. A tab 180, however, preferably can easily be pulled in a peel position to release cover 154. Additionally, preferably tie or tape 152 attaching rolled discharge tube or spout 140 after it is rolled up to bottom 39, is preferably secured/adhered to bag bottom 39 so that it is only stressed by material contents in bag 10 in a shear position and does not release until a tab of tie or tape 152 is pulled in the peel direction, even when subject to the pressure and weight from the material contents in the bag pressing down on it.

The release tab 170 of tie or tape 152 on rolled discharge tube or spout 140 can also easily be pulled in a peel direction to cause the open configuration of rolled discharge tube or spout 140 and release the material contents of bag 10. With the configuration of cover 154 and rolled discharge tube or spout 140 as described herein, the couplings or bonds that must support the material contents of the bag have great shear strength, and can withstand the pressure upon them when a bag 10 is filled with 1,000 to 5,000 pounds of material, for example, yet the bonds or couplings 162, 164 or 166 can easily be released by pulling a tab 180 or 170 in the peel direction.

FIGS. 26-30 illustrate fill tube 36, top 37, body 38, bottom 39, discharge tube 40, and cover 154 fabric portions, along with some preferred dimensions, that can be included in a bag 10 or 30 and in a discharge tube assembly 160, 190, or 300.

Referring now to FIGS. 31 to 71, in one or more preferred embodiments, a bottom and discharge assembly includes a reinforcing insert or reinforcer 301 that is adapted to strengthen the bottom and discharge structure and strengthen a zero point area that can be present at a discharge tube and bottom portion joint.

Figure 49:
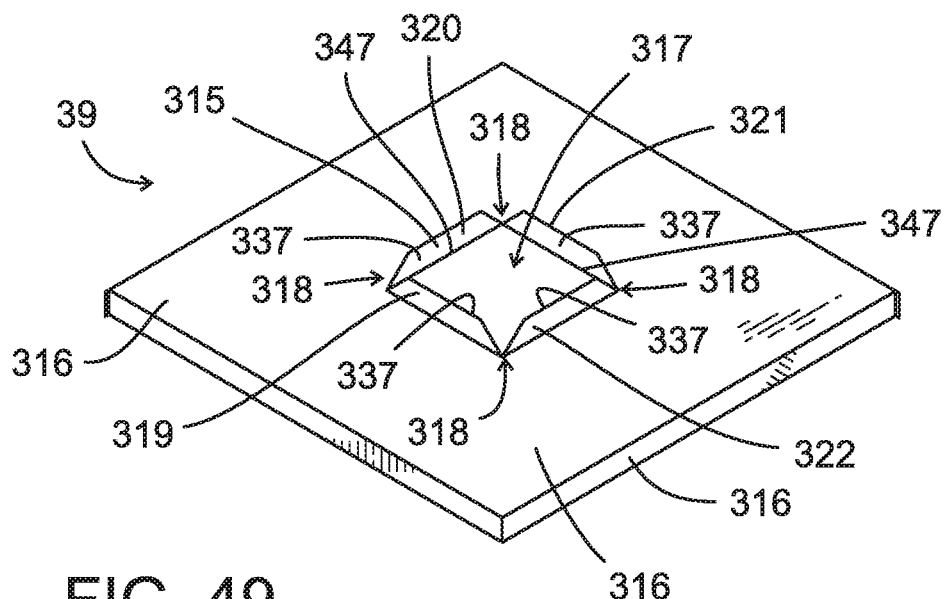
FIG. 49 is perspective view of a preferred embodiment of a bottom portion in expanded form that can be used in a preferred embodiment of a bottom and discharge assembly of the present invention.

In construction of a bulk bag with heat sealed joints wherein a bottom portion opening is constructed with four slits (e.g., as shown in FIG. 49), a zero point area can occur at about the 90 degree angle point, wherein two pieces are at about 90 degrees respective to each other, going from the horizontal to the vertical, at bottom portion slit areas, which are weak areas in a heat sealed bag. Taping configurations as described in U.S. Pat. No. 10,618,225 and U.S. patent application Ser. No. 16/796,521, incorporated herein by reference, can be used to overcome the weak area at the zero point.

In various preferred embodiments, the slits between the bottom opening flaps are preferred because the slits enable some expansion of the opening when the bag is formed and filled, going from a smaller square to a larger circular shape, but as discussed, a weakness can occur in bag joints at locations of the corners of bottom openings and slits at a bottom and discharge tube joint.

In various preferred embodiments, at least substantially square spouts, or spouts that have another shape, e.g., rectangular or at least substantially rectangular with at least substantially square openings, are utilized and are important to the gusseting designs of one or more preferred embodiments of a heat sealed bag. Spouts with at least substantially square shape openings allow for heavier weight to be successfully held in a bag, than in the other embodiments, e.g., embodiments with a spout having openings with a shape that is not at least substantially square. A spout can also have a substantially rectangular shape with a substantially square opening if desired, or another desired shape with a substantially square opening when in expanded configuration.

A preferred embodiment of a bottom and discharge assembly 300 on a bulk bag 30 is shown in FIGS. 31-53 and 64-66. Bottom and discharge assembly 300 is very effective in overcoming weaknesses caused at zero point locations, e.g., see arrow 303 of FIG. 31, as evidenced in the table of FIG. 54 showing testing results for bulk bags including a preferred embodiment of a bottom and discharge assembly 300 as shown and described herein. As referred to herein, generally, a zero point location is a tangent point between parts of a discharge tube 40 having an at least substantially square opening 115 and around an at least substantially square opening 317 in bottom 39 where a 90 degree angle begins for the discharge tube 40.

A bottom and discharge assembly 300 preferably includes a discharge tube 40 (see FIGS. 33-36), an insert 301 (see FIGS. 37-40) and a bottom portion 39 (see FIGS. 49-53). Discharge tube 40 preferably is formed from a continuous piece of fabric having an opening 115 with a substantially square shape at a first end 175 and another substantially square shape opening 115 at a second end 176 (see, e.g., FIGS. 35, 44). In some embodiments, opening 115 can be an irregular shape, e.g., a shape resembling an octagon. If opening 115 is an irregular shape, then preferably a discharge tube 40 opening 115 has an even multiple of even sides 4, 8, 12, 16, for example, and with a mating portion, e.g., a mating insert 301 or bottom 39, having an even number of gussets. Preferably rounded corners are not included with an opening 115 as this would not work efficiently because rounded corners would give a dimensional aspect to the zero point.

Figure 34:
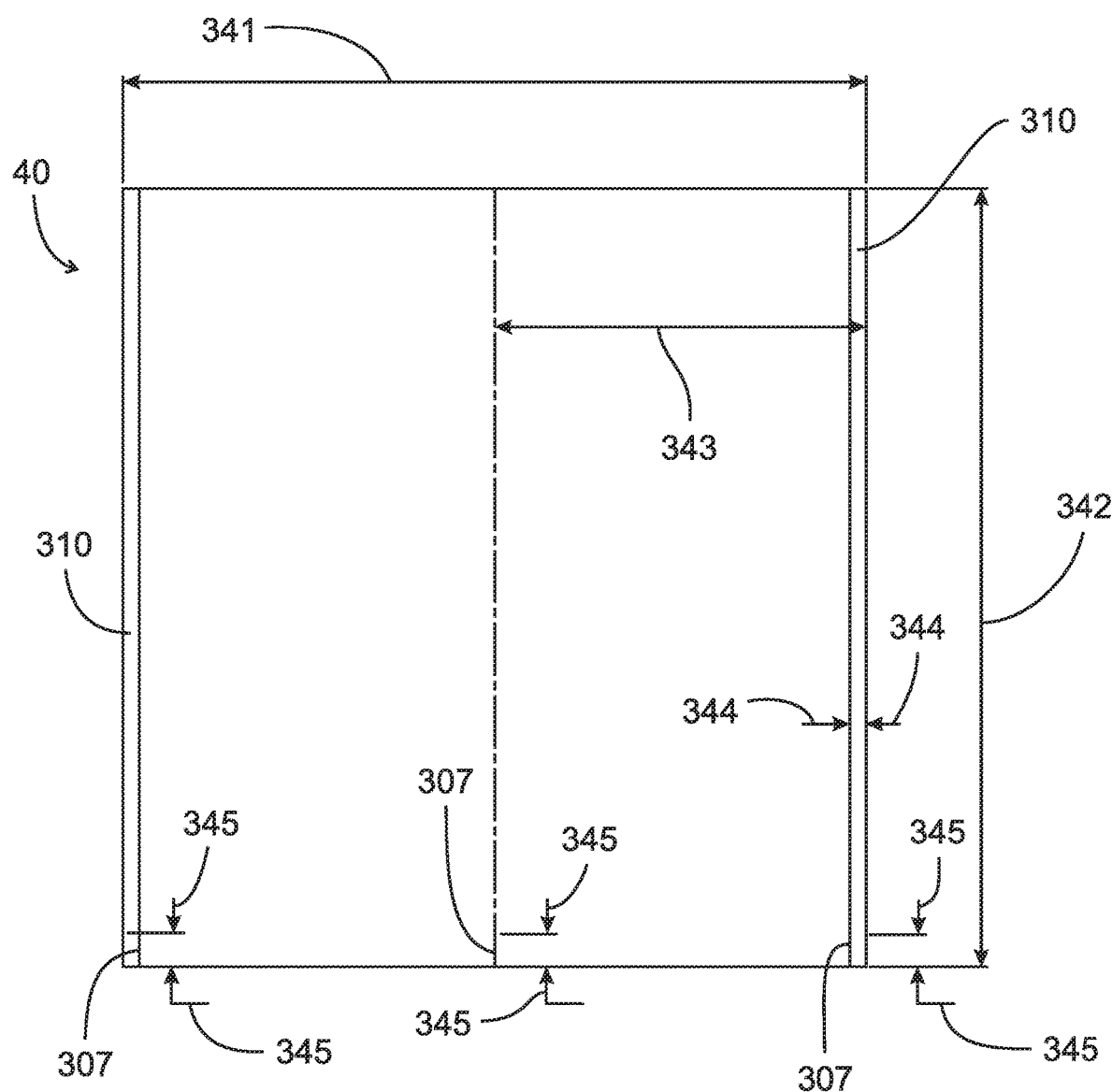
FIG. 34 is a front view of a preferred embodiment of a discharge tube of a bottom and discharge assembly of the present invention.

A width of discharge tube 40 is designated by arrow 341 in FIG. 34. Discharge tube 40 in non-gusseted configuration can have a width of about 22 to 23 inches, and more preferably about 22 to 22.5 inches and most preferably can be about 22 to 22⅜ in width in a 37×37 inch bag. A half width of discharge tube 40 (designated by arrow 343) can be about 11 to 11.25 inches, more preferably about 11 to 11.19 inches and most preferably a half width of about 11 to 11³⁄₁₆ inches. A length of discharge tube 40 is designated by arrow 342 in FIG. 34. Discharge tube 40 can have a length of about 15 to 26 inches in a 37×37 inch bag, more preferably about 22 to 24 inches and most preferably a length of about 23¼ to 23½ inches. Dimensions of a discharge tube 40 can be adjusted if desired for smaller or larger bags.

Slits 307 are also shown in FIG. 34, with arrows 345 designating a preferred depth of slits 307 into discharge tube 40 fabric. Two slits 307 can be included at side edges of discharge tube 40 when in non-gusseted configuration as shown in FIG. 34. Two slits 307 can also be included about centrally between side edges of discharge tube 40 on front and back sides of discharge tube 40, with one centrally located slit 307 on the front side shown in FIG. 34.

Figure 35:
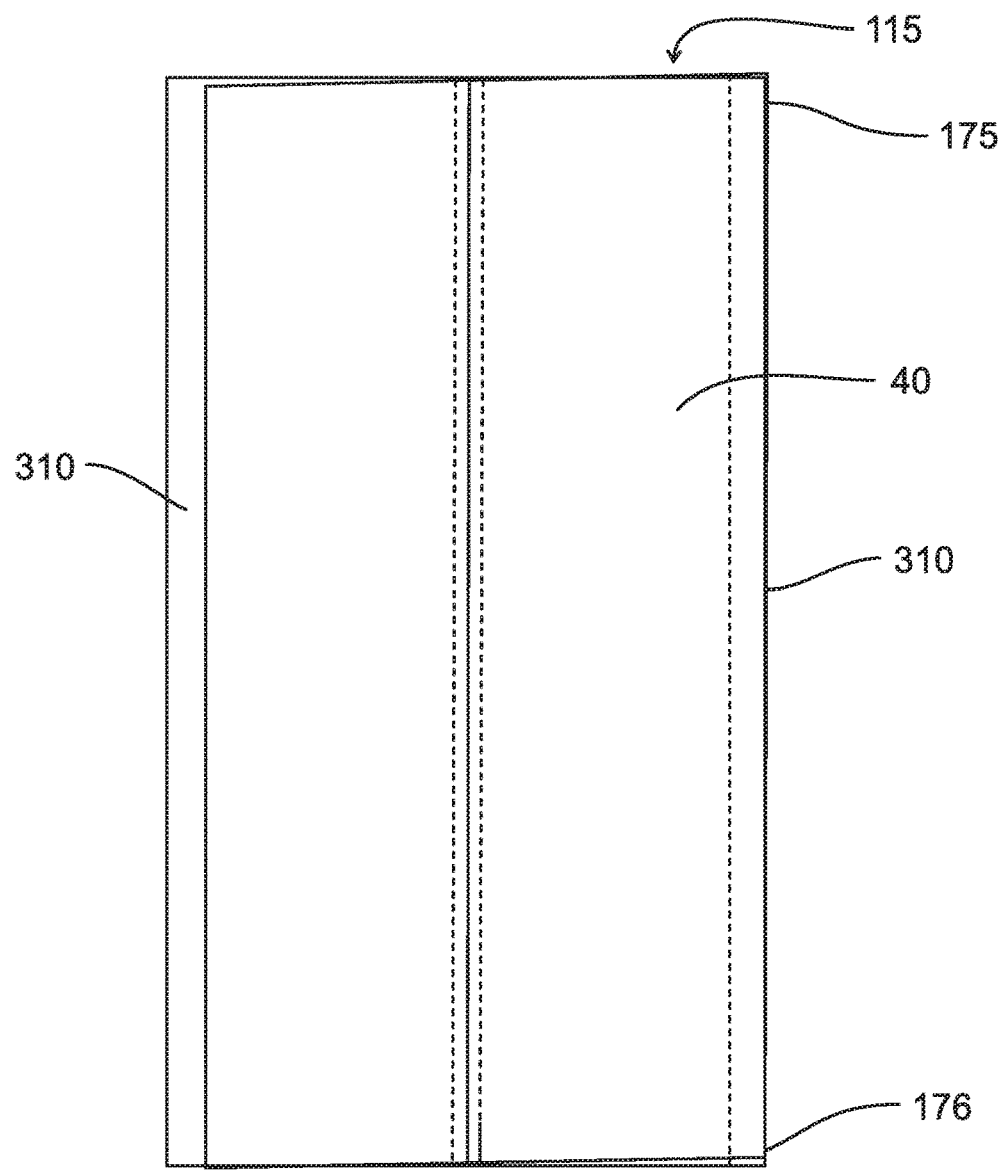
FIG. 35 is a top view of a preferred embodiment a discharge tube of a bottom and discharge assembly of the present invention in a folded, gusseted configuration.
Figure 36:
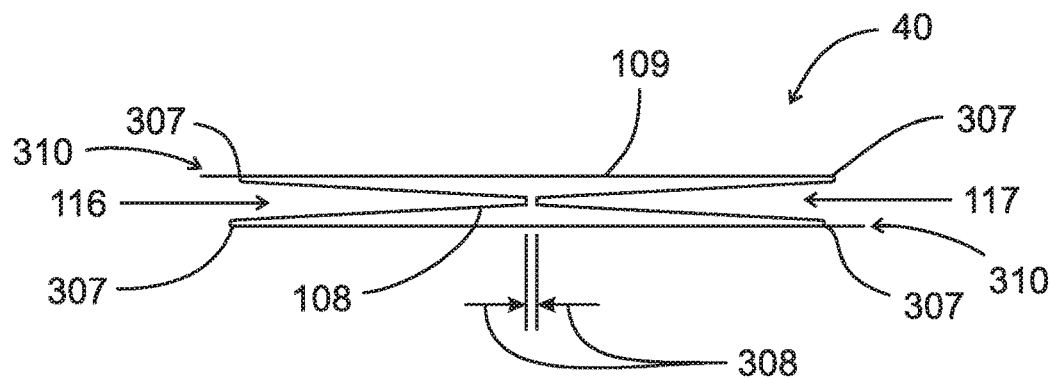
FIG. 36 is an end view of a preferred embodiment of a discharge tube of a bottom and discharge assembly of the present invention in a folded, gusseted configuration.
Figure 44:
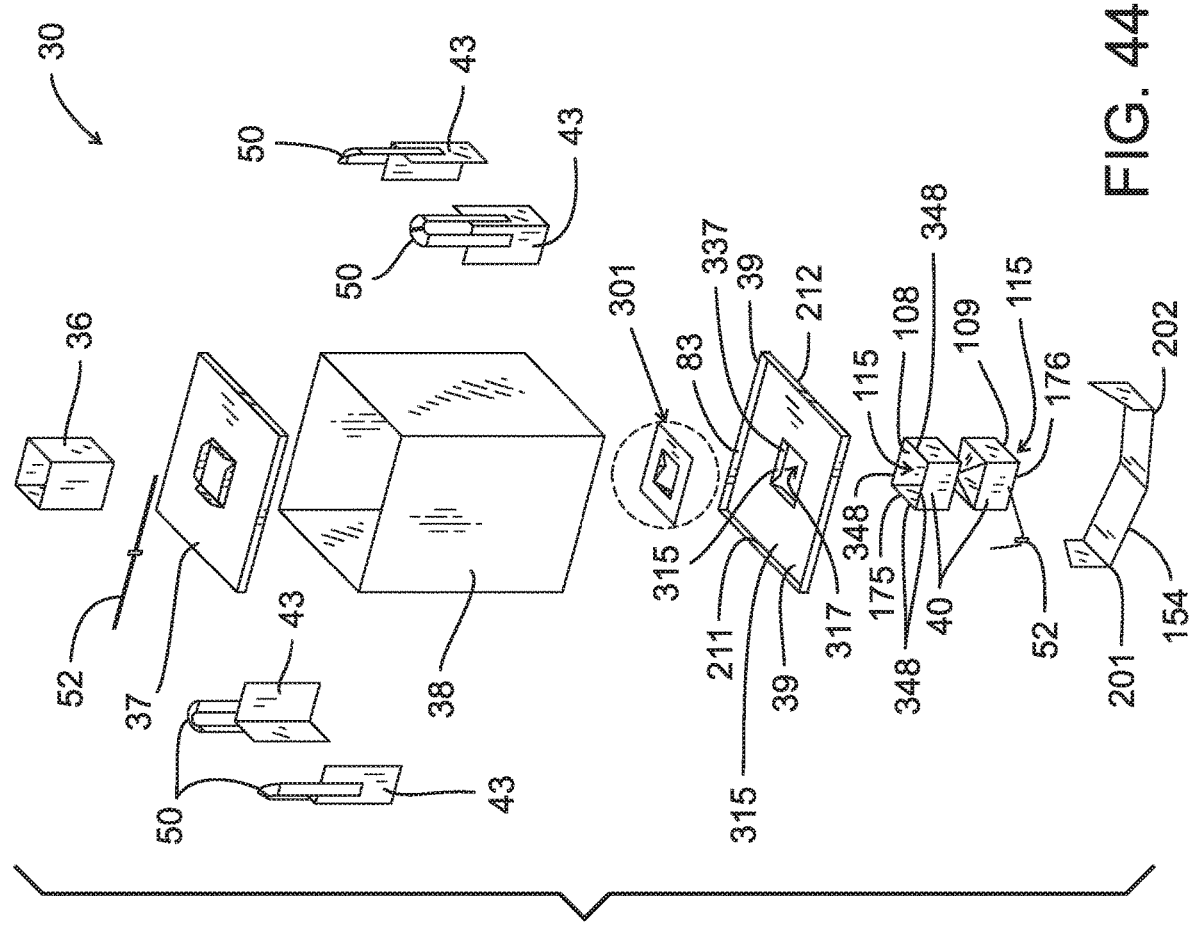
FIG. 44 is an exploded view of a preferred embodiment of a bulk bag including a preferred embodiment of a bottom and discharge assembly of the present invention.

Discharge tube 40 can have an inner surface 108 and an outer surface 109 (see FIG. 44). Discharge tube 40 preferably is folded in a gusseted configuration as shown in FIGS. 35 and 36 with two gusset portions 116 and 117 prior to assembly of a bulk bag 30. In gusseted configuration, a width of discharge tube 40 can be 11 to 11.5 inches, more preferably 11 to 11.25 inches, and most preferably 11.19 inches. A half width of discharge tube 40 in gusseted configuration can be about 5.5 to 5.75 inches, more preferably about 5.5 to 5.6 inches and most preferably about 5.6 inches (14.2 cm).

Figure 32:
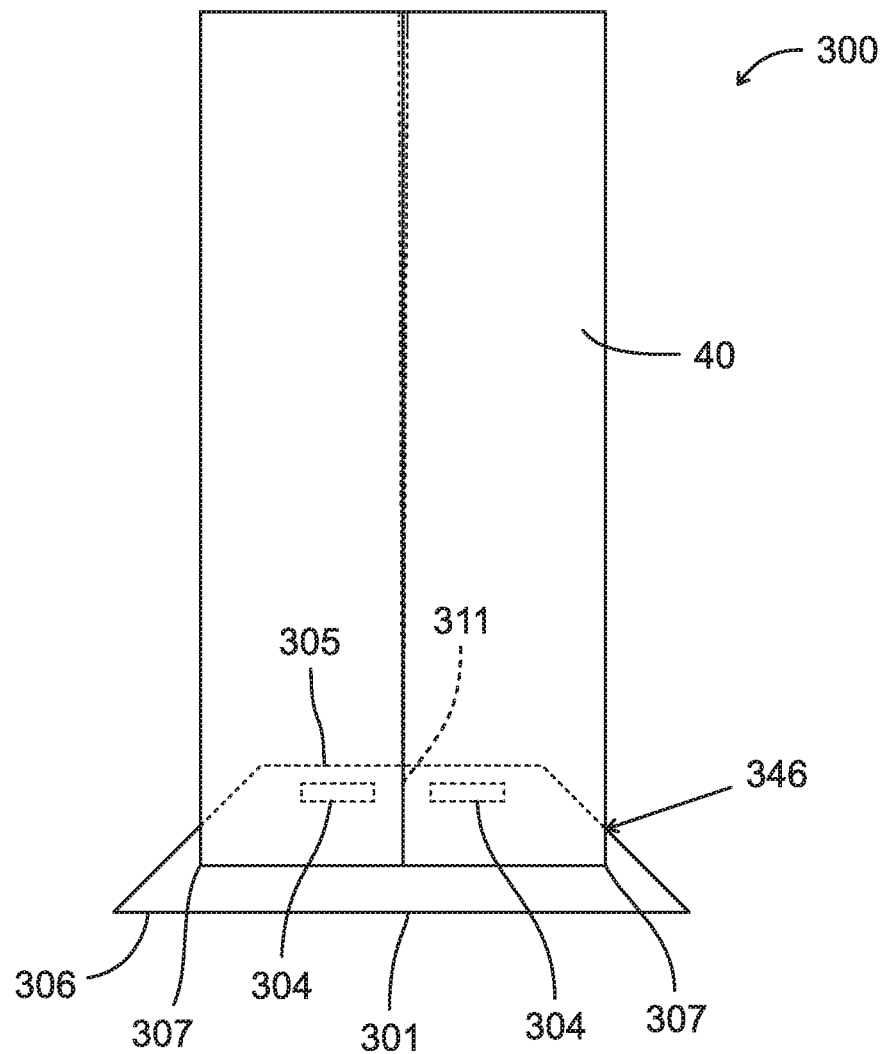
FIG. 32 is a partial view of a preferred embodiment of a bottom and discharge assembly illustrating a bottom insert and discharge tube in overlapped configuration.
Figure 33:
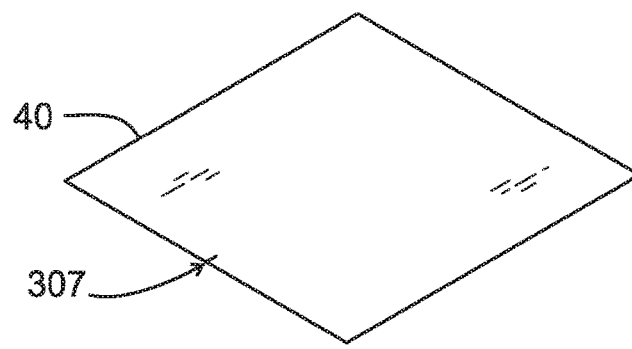
FIG. 33 is a perspective view of a preferred embodiment of a discharge tube of a preferred embodiment of a bottom and discharge assembly of the present invention.
Figure 39:
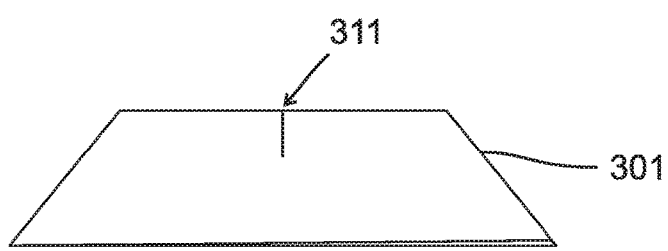
FIG. 39 is a top view of a preferred embodiment of the bottom insert shown in FIG. 37 in a folded, gusseted configuration.
Figure 40:
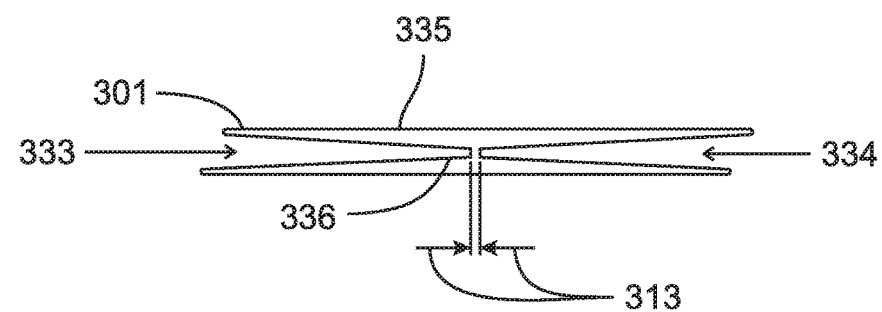
FIG. 40 is an end view of a preferred embodiment of the bottom insert shown in FIG. 37 in a folded, gusseted configuration.

Slits 307 are preferably included in discharge tube 40 as shown in the figures, which preferably are at or about at gusset portion 116, 117 edges or corners when discharge tube 40 is in gusseted configuration (see FIGS. 33, 35-36) to facilitate insertion of insert 301 into discharge tube 40 during assembly when insert 301 is in a folded gusseted configuration having an at least substantially trapezoidal shape as shown in FIGS. 32 and 39-40. In gusseted configuration of discharge tube 40, preferably a space as shown between arrows 308 is provided such that inner surfaces of gussets 116 and 117 are not in contact with one another (see FIG. 36), which can help prevent unwanted bag joints from forming (e.g., depending on whether a coating is on an interior surface 108 of discharge tube 40 and what type of coating is on an interior surface 108 of discharge tube 40) and can help enable expansion to an open or expanded configuration after heat sealing of a bag 30.

Insert 301 preferably is formed from a piece of fabric having a substantially square shape and which has a substantially square shape opening 312. Preferably opening 312 of insert 301 has the same dimensions or at least close to the same dimensions as an opening 115 in discharge tube 40. In other embodiments, insert 301 can also have other shapes as desired, with insert 301 preferably having a shape adapted to reinforce a bottom 39 and discharge tube 40 joint such that a portion of insert 301 extends under the bottom 39 and discharge tube 40 joint at least around a perimeter of openings 317, 115 in the bottom 39 and discharge tube 40. Insert 301 also preferably has a shape that does not restrict flow of materials through a bottom 39 opening 317 and a discharge tube 40 opening 115. In some embodiments, opening 312 can be an irregular shape, e.g., a shape resembling an octagon. If opening 312 is an irregular shape, then preferably an insert 301 opening 312 has an even multiple of even sides 4, 8, 12, 16, for example, and with a mating portion, e.g., a mating discharge tube 40 or bottom 39, having an even number of gussets. Preferably, rounded corners are not included with an opening 312 as this would not work efficiently because rounded corners would give a dimensional aspect to the zero point.

Figure 68:
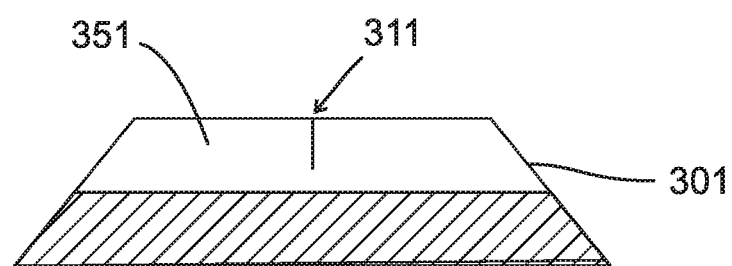
FIG. 68 is a top view of a preferred embodiment of the bottom insert or reinforcer shown in FIG. 67 in a folded, gusseted configuration, with cross-hatching illustrating a portion of the bottom insert or reinforcer in folded, gusseted configuration that can be coupled to a bottom portion.

Insert 301 preferably includes slits 311 which allow for some movement during assembly and heat sealing of a bottom and discharge assembly 300. Insert 301 can be folded in a gusseted configuration as shown in FIGS. 39-40, 68. In gusseted configuration, insert 301 preferably has an exterior surface 335 and an interior surface 336. In gusseted configuration, insert 301 also preferably has two gusset portions 333 and 334 (see FIG. 40). Preferably, a space is left in between inner surfaces of gusset portions 333 and 334, e.g., in between arrows 313 as shown in FIG. 40, which can help prevent unwanted bag joints from forming (e.g., depending on whether a coating is on an interior surface 336 of insert 301 and what type of coating is on an interior surface 336 of insert 301) and can help enable expansion to an open or expanded configuration after heat sealing of a bag 30.

Figure 50:
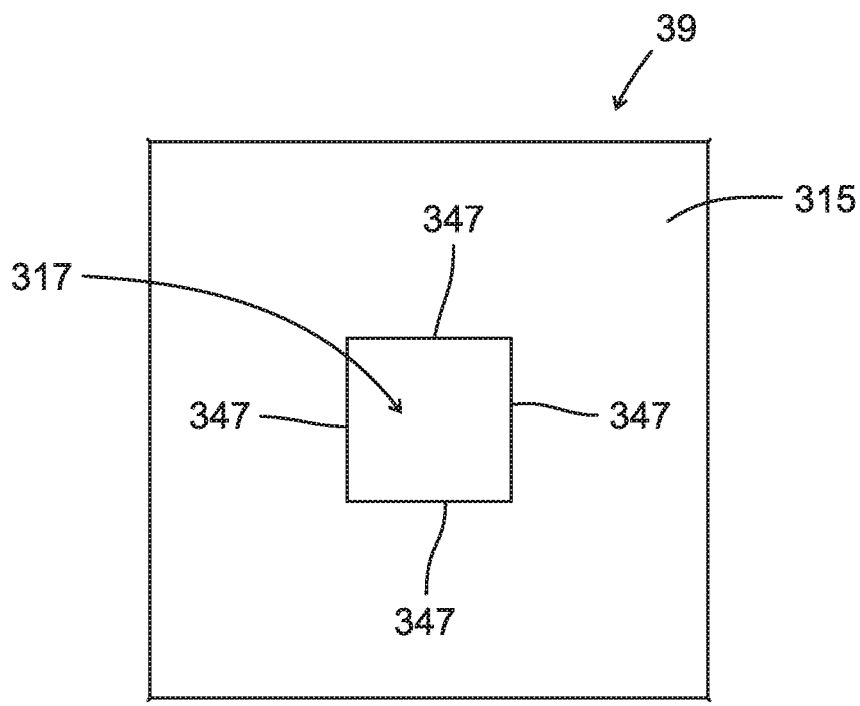
FIG. 50 is a bottom view of the bottom portion shown in FIG. 49.
Figure 51:
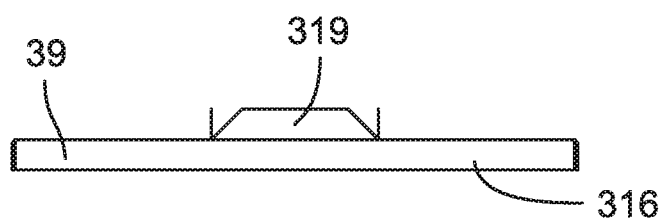
FIG. 51 is a side view of the bottom portion shown in FIG. 49.

Bottom portion 39 preferably starts with a piece of fabric having an interior side 315 and an exterior side 316 and can comprise four tabs or flaps 319, 320, 321, 322 positioned around an opening 317, which is preferably at least substantially square (see FIGS. 49-51). Preferably, the dimensions of opening 317 are the same as or at least substantially close to the dimensions of opening 115 of discharge tube 40 and opening 312 of insert 301 for enabling unrestricted flow of bulk material from bulk bag 30 through discharge assembly 300. In some embodiments, opening 317 can be an irregular shape, e.g., a shape resembling an octagon. If opening 317 is an irregular shape, then preferably a bottom 39 opening 317 has an even multiple of even sides 4, 8, 12, 16, for example, and with a mating portion, e.g., a mating discharge tube 40 or insert 301, having an even number of gussets. Preferably, rounded corners are not included with an opening 317 as this would not work efficiently because rounded corners would give a dimensional aspect to the zero point.

In flat, non-gusseted configuration, a bottom 39 can have a width of about 40.5 to 41.5 inches, more preferably a width of about 40.75 to 41.25 inches, and most preferably a wide of about 41 inches for a 37×37 inch bag. Opening 317 can be positioned about centrally within bottom 39. Opening 317 can have a width of about 7.25 to 7.75 inches, more preferably a width of about 7.38 to 7.6 inches, and most preferably a width of 7.5 inches. A corner of opening 317 can be about 15.75 to 16.25 inches away from a fabric edge of bottom 39, more preferably about 15.9 to 16.1 inches away from a fabric edge of bottom 39 and most preferably about 16 inches away from a fabric edge of bottom 39. Dimensions of a bottom 39 can be adjusted for smaller or larger bags.

Figure 52:
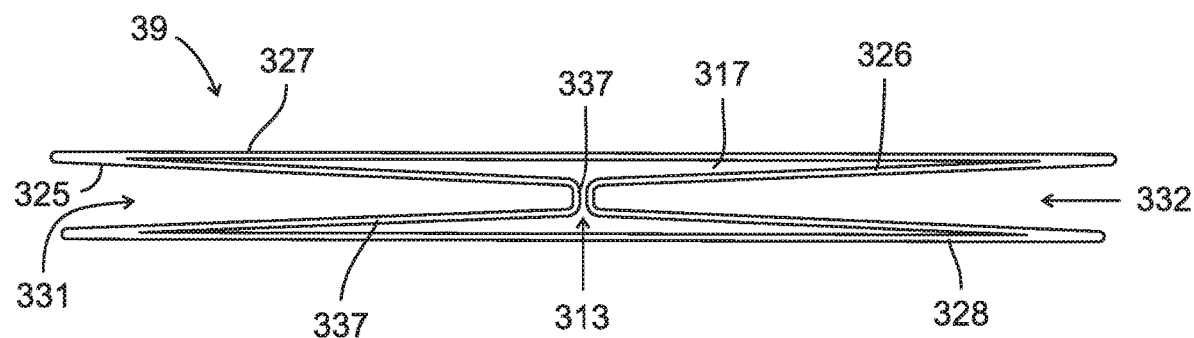
FIG. 52 is an end view of a preferred embodiment of a bottom portion in folded, gusseted configuration that can be used in a preferred embodiment of a bottom and discharge assembly of the present invention.
Figure 53:
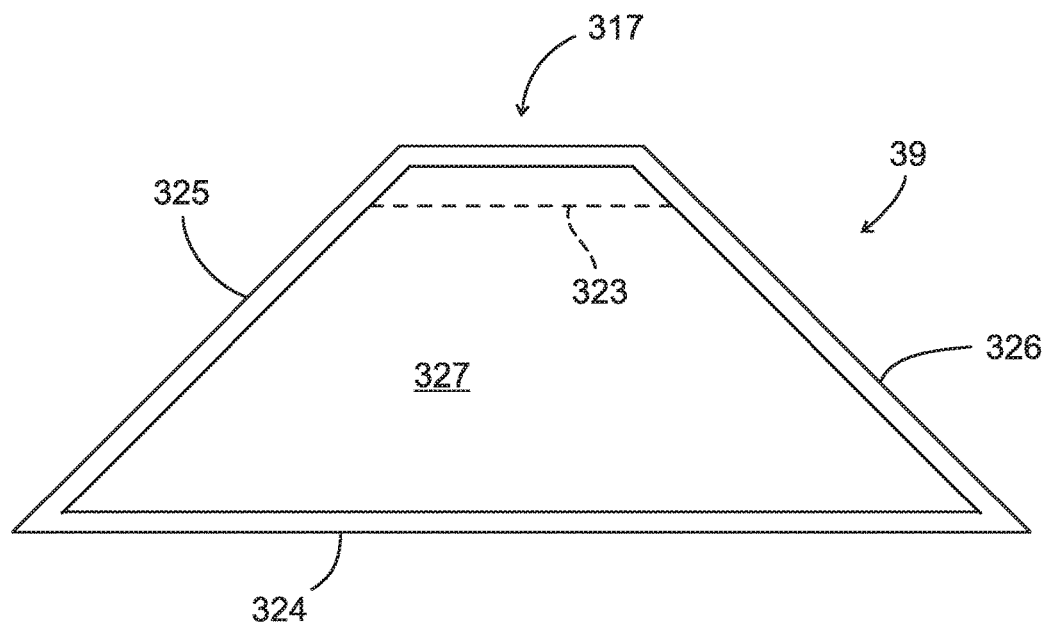
FIG. 53 is top view of a preferred embodiment of a bottom portion in folded, gusseted configuration that can be used in a preferred embodiment of a bottom and discharge assembly of the present invention.
Figures 54, 55:
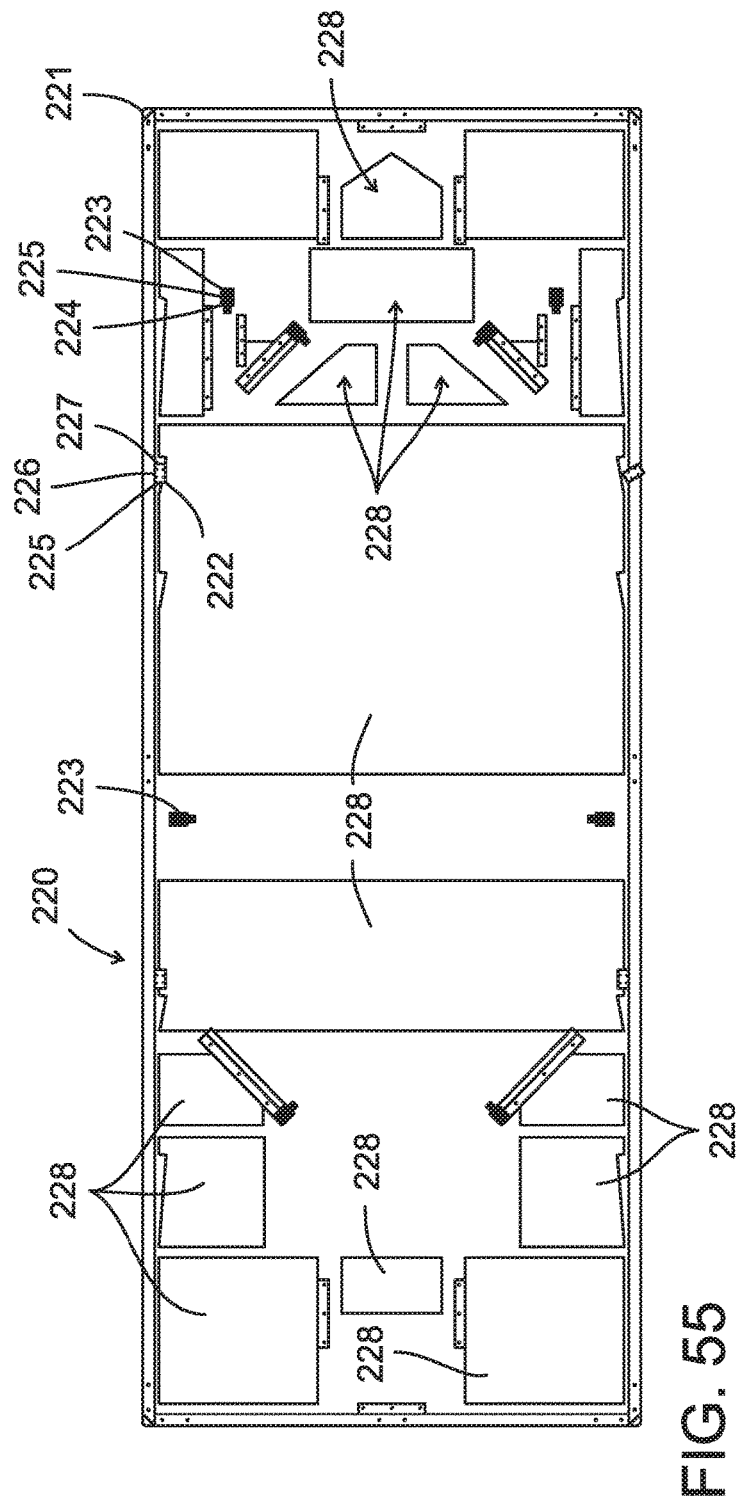
FIG. 54 is a table listing testing results for bulk bags including a preferred embodiment of a bottom and discharge assembly of the present invention.
FIG. 55 is a top view of a preferred embodiment of a carrier plate that can be used for assembly and heat sealing of a preferred embodiment of a bulk bag that includes a preferred embodiment of a bottom and discharge assembly of the present invention.

Flaps or tabs 319, 320, 321, 322 can be formed by providing four slits 318 in bottom 39 extending away from opening 317 at or about at corners of opening 317 and then folding portions of bottom 39 extending between two of any of said slits 318 backwards, e.g., at fold line 323 as shown in FIG. 53 (see also FIGS. 29, 49). A slit 318 can be about 1 to 3 inches long and preferably is 1 and ⅞ inches in length. When in folded, gusseted configuration as shown in FIG. 53, bottom 39 also preferably includes an open or unsealed bottom portion 324. In folded gusseted position, bottom 39 can include first fold 325, second fold 326, front side 327 and back side 328. FIG. 52 illustrates an end view of folded, gusseted bottom 39 depicting forming gusset portions 331 and 332 in bottom 39 to affect a folded, gusseted form. Bottom 39 also preferably has an interior surface 315 extending around an entire interior circumference of bottom 39 in folded, gusseted configuration including on an interior surface of flaps 319, 320, 321, 322. Bottom 39 also preferably has an exterior surface 316 extending around an entire exterior circumference of bottom 39 in folded, gusseted configuration. Flaps 319, 320, 321, 322 can be heat fused to discharge spout 40 on each side of discharge spout 40, wherein a joint or heat seal bond 41 is formed in between each flap 319, 320, 321, 322 interior surface 315 and discharge tube 40 exterior surface 109.

Bottom 39 also preferably includes an upper portion 83 around a circumference of interior surface 315 that can be heat sealed to a body portion 38 (see, e.g., FIG. 44). Preferably interior surface 315 of bottom 39 comprises a heat sealing coating 337 at least on flaps 319, 320, 321, 322 for forming one or more joints 41 with discharge tube 40 (see FIGS. 44, 49). Preferably, interior surface 315 of bottom 39 also includes a heat sealing coating 337 in upper portion 83 for forming a joint 41 with body 38. Preferably, bottom 39 also includes a heat sealing coating 337 on interior surface 315 for forming a joint 41 with insert 301.

The folded, gusseted configurations of bag portions as shown herein enable bag portions to be overlapped prior to heat sealing in two dimensional form and enable the bag portions to be expanded to an open or expanded configuration after heat sealing of respective bag portions together.

In a preferred embodiment of a bottom and discharge assembly 300 as shown in FIGS. 31-53, at least a portion of insert 301 is preferably positioned under a heat sealed joint 41 of discharge tube 40 and bottom 39 such that insert 301 reinforces the heat sealed joint 41 of discharge tube 40 and bottom 39, including at zero point locations 303. Referring to FIGS. 37-40, insert 301 can be folded in a gusseted configuration as shown in FIGS. 39-40 and positioned inside discharge tube 40 while discharge tube 40 is in folded, gusseted configuration (see FIGS. 35-36). Preferably, a portion of insert 301 extends outward from discharge tube 40 as shown in FIG. 32 when the remaining portion of insert 301 is positioned inside discharge tube 40.

Insert 301 and discharge tube 40 can then be inserted into opening 317 of bottom 39 while bottom 39 is in folded, gusseted configuration as shown in FIGS. 52-53, wherein the portion of insert 301 that extends exterior to discharge tube 40 can be in contact with bottom 39 interior surface 315, and wherein bottom flaps 319, 320, 321, 322 of bottom 39 can be in contact with an exterior surface of discharge tube 40. FIGS. 41-43, 69-71 illustrate views of bottom and discharge assembly 300 in expanded form showing insert 301 coupled to interior surface 315 of bottom 39 around opening 317. Discharge tube 40 is coupled to interior surface 315 of bottom 39 at bottom flaps 319, 320, 321, 322, with bottom flap 319 shown coupled to discharge tube 40 in FIG. 43.

Figure 66:
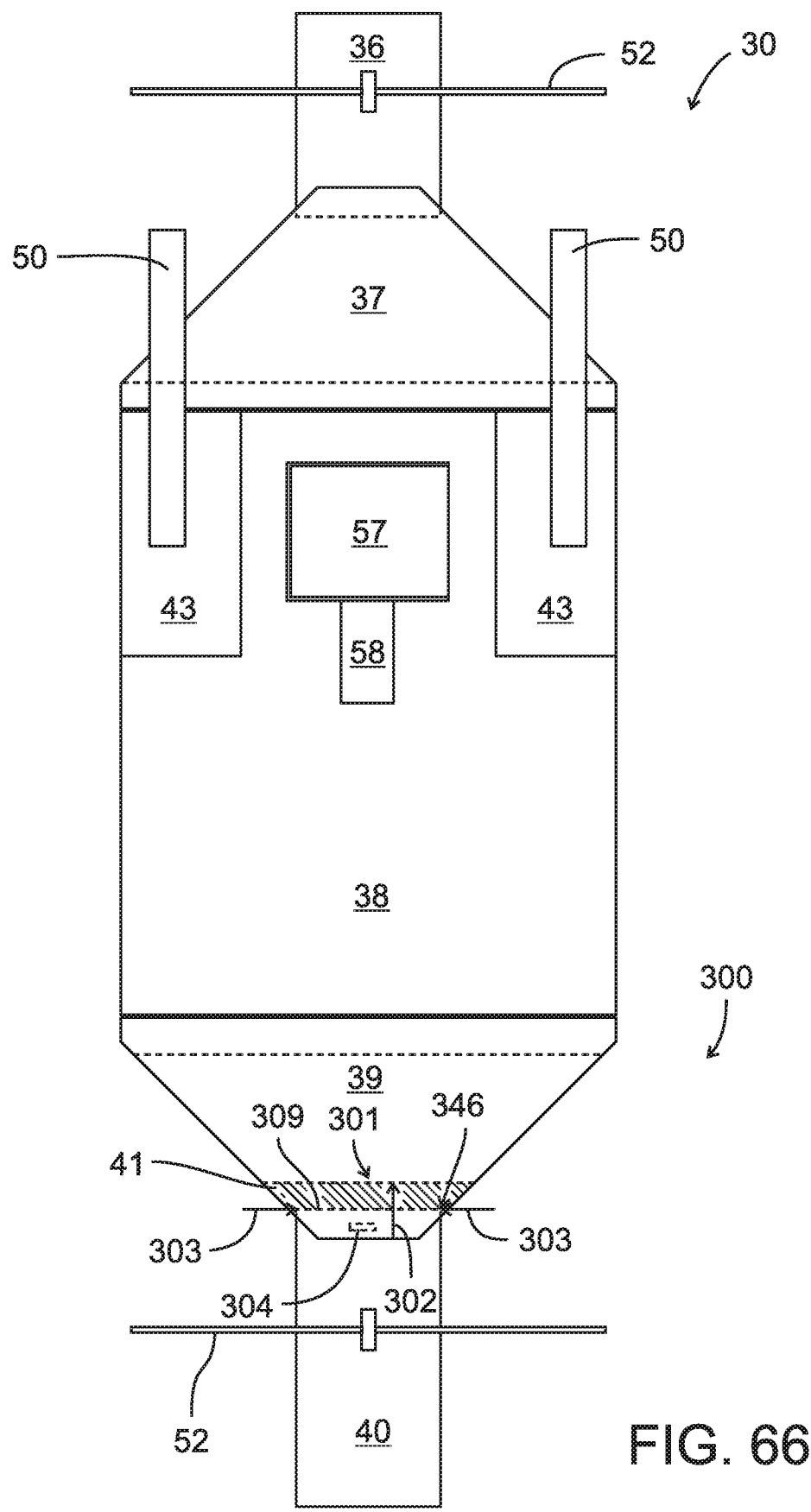
FIG. 66 is a top view of a preferred embodiment of a bulk bag of the present invention in a folded, gusseted configuration and including a preferred embodiment of a bottom and discharge assembly of the present invention, wherein cross-hatching designates an area where a bottom and insert are overlapped and where a bond can form therebetween.
Figure 67:
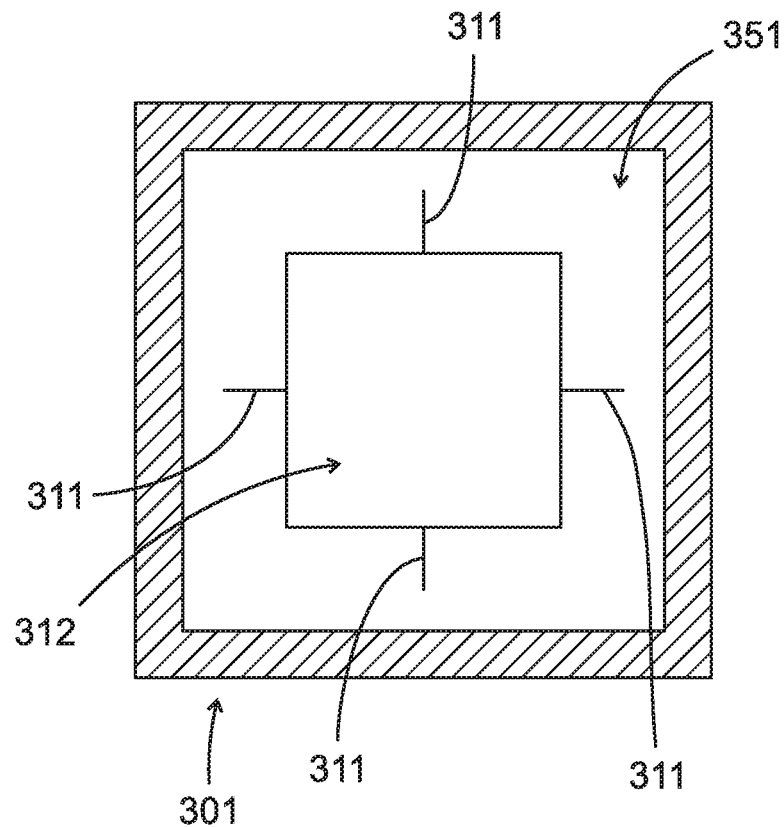
FIG. 67 is a top view of a preferred embodiment of a bottom insert or reinforcer of a preferred embodiment of a bottom and discharge assembly shown in flat, non-folded/non-gusseted configuration, with cross-hatching illustrating a portion of the bottom insert or reinforcer that can be coupled to a bottom portion.

Referring to FIGS. 37-40, 67 and 68, views of an insert 301 are shown prior to being positioned in a bottom and discharge assembly 300. Insert 301 is shown in flat, non-folded, non-gusseted configuration in FIGS. 37-38, 67. The portion of insert 301 shown in cross-hatching in FIG. 67 is the portion of insert 301 that can be coupled to a bottom 39, e.g., via heat sealing, after insert 301 is folded in folded, gusseted configuration as shown in FIG. 68 and overlapped with discharge tube 40 and bottom 39 as shown in FIGS. 31, 32, 66, 69-71. Portion 351 of insert 301 that is not shown in cross-hatching in FIGS. 67-68 is the portion that preferably is not coupled to discharge tube 40 or to bottom 39 when overlapped with discharge tube 40 and bottom 39 as shown in FIGS. 31, 32, 44, 66, 69 and placed through a heat sealing machine.

Figure 69:
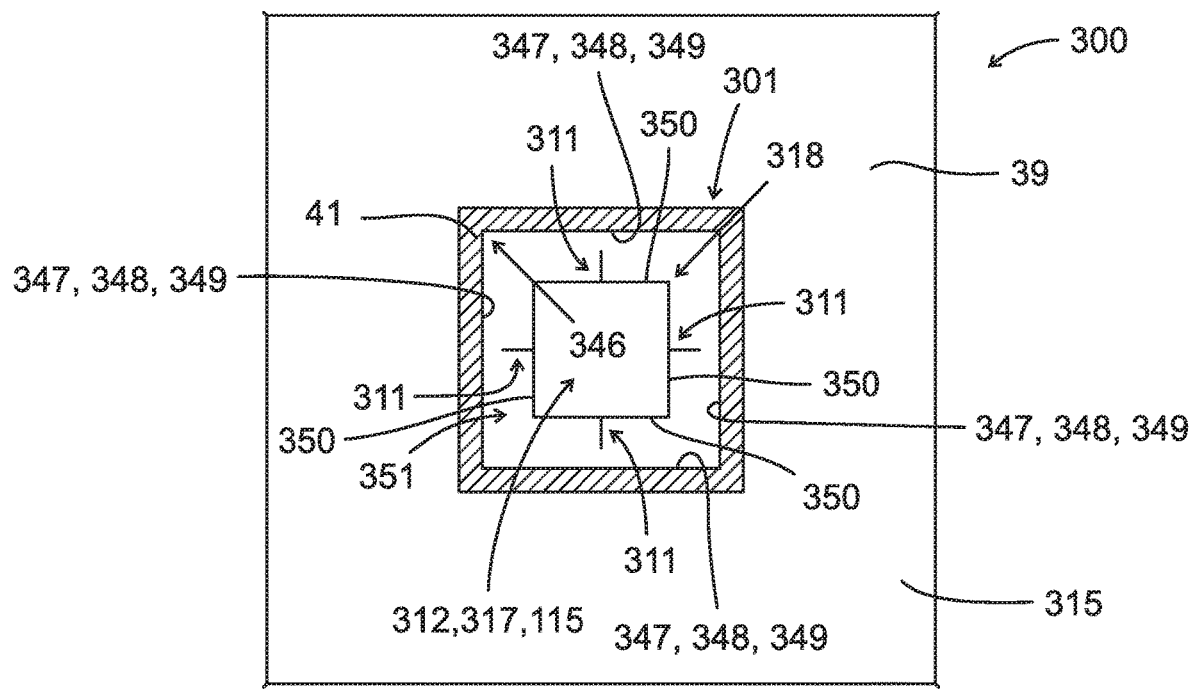
FIG. 69 is a top view of a preferred embodiment of a bottom and discharge assembly in expanded form as shown in FIGS. 41, 42 wherein cross-hatching represents an area where a bottom insert or reinforcer is coupled to a bottom portion.

Thus, the non-cross-hatched portion 351 in FIGS. 67-69 can be a free portion or non-bonded portion of insert 301 that is not heat sealed or otherwise coupled to discharge tube 40 and also is not heat sealed or otherwise coupled to bottom 39. The cross-hatched portion of FIG. 69 represents the portion of insert 301 that is coupled to bottom 39 and a joint 41, which can, for example, be a heat sealed bond between bottom 39 and insert 301. As shown in FIG. 69, slits 311 of insert 301 preferably are spaced away from a joint 41 between insert 301 and bottom 39, and preferably insert 301 is not coupled to another piece of fabric in the area where slits 311 are located. Slits 311 allow for some movement of insert 301 when a bulk bag 30 is expanded and being filled with bulk material and when bulk material is being discharged from a bulk bag 30.

Figure 41:
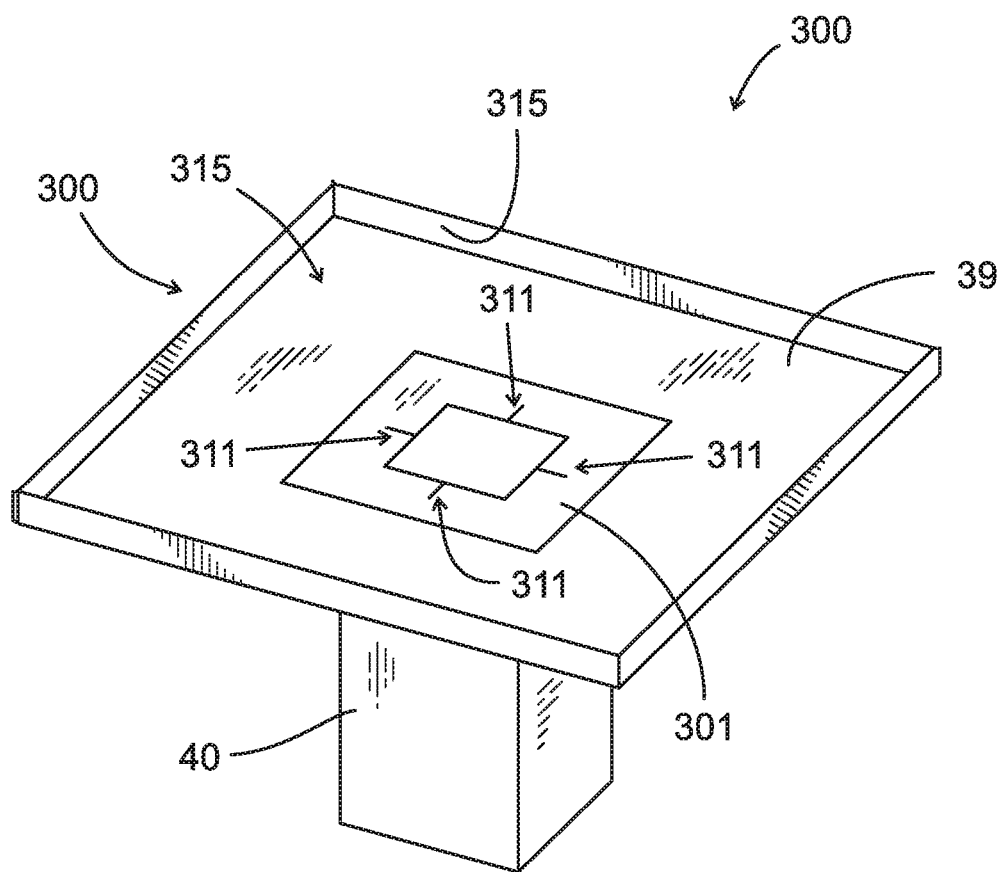
FIG. 41 is a perspective view of a preferred embodiment of a bottom and discharge assembly of the present invention shown in an expanded configuration.
Figure 42:
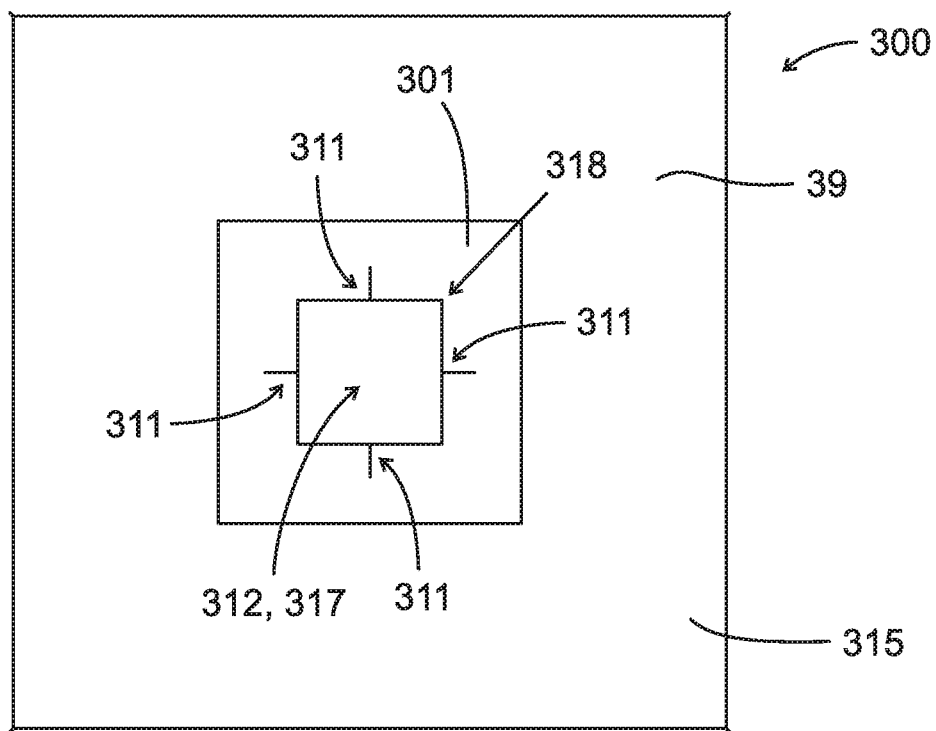
FIG. 42 is a top view of a preferred embodiment of the bottom and discharge assembly shown in FIG. 41.
Figure 43:
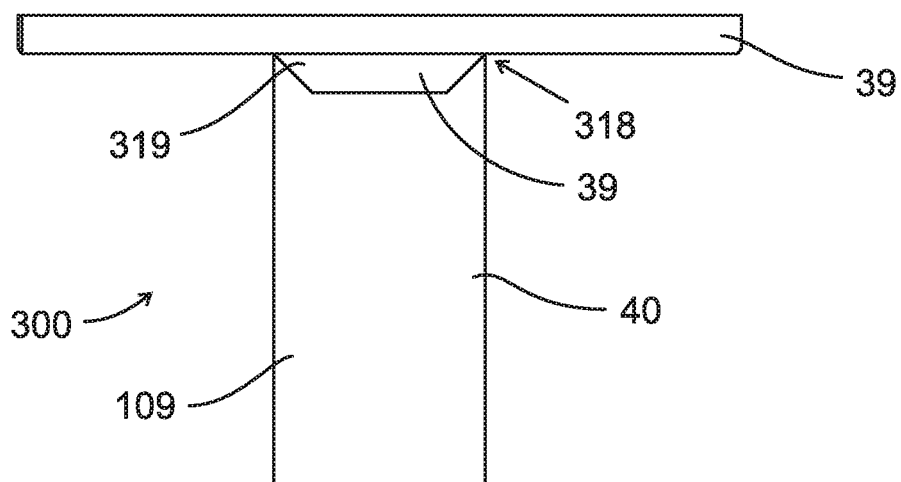
FIG. 43 is a side view of a preferred embodiment of the bottom and discharge assembly shown in FIG. 41.

The views of discharge assembly 300 as shown in FIGS. 41, 42 and 69, depict how an insert 301 is positioned in a bulk bag 30 when the bulk bag 30 is in an expanded configuration, e.g., filled with bulk material. The cross-hatching in FIG. 69 illustrates a bonded or connected portion, or a joint 41, between insert 301 and bottom 39 which ends at or about at a bottom opening 317 edge 347 and discharge tube opening 115 edge 348. Before discharge of material from a bulk bag 30, insert 301 opening 312 has edges 350 and the insert opening 312 is smaller than the bottom opening 317 and discharge tube opening 115.

The non-bonded or non-coupled portion 351 of insert 301 can extend out a distance over bottom opening 317 and discharge tube opening 115 in the filled configuration of a bulk bag 30. However, upon discharge of materials from bulk bag 30, the force of material exiting through insert opening 312, bottom opening 317, and discharge tube opening 115 causes non-bonded or free portion 351 of insert 301 to fold at or about along edges 349 of an insert 301 downward into discharge tube opening 115 which widens opening 312 of insert 301 to edges 349, to be the same dimensions of, or at least about the same dimensions, as bottom opening 317 and discharge tube opening 115, e.g., as shown in expanded view in FIGS. 44 and 64. This enables unrestricted flow of material through insert opening 312, bottom opening 317 and discharge tube opening 115.

In other embodiments, however, it is possible to couple the non-cross-hatched portion 351 shown in FIGS. 67 and 69 to a discharge tube 40 if desired. This however will cause a restriction of flow through insert 301, bottom 39 and discharge tube 40 as insert opening 312 will not widen as described above, and thus it is not preferred to attach non-cross-hatched portion 351 to discharge tube 40.

Figure 70:
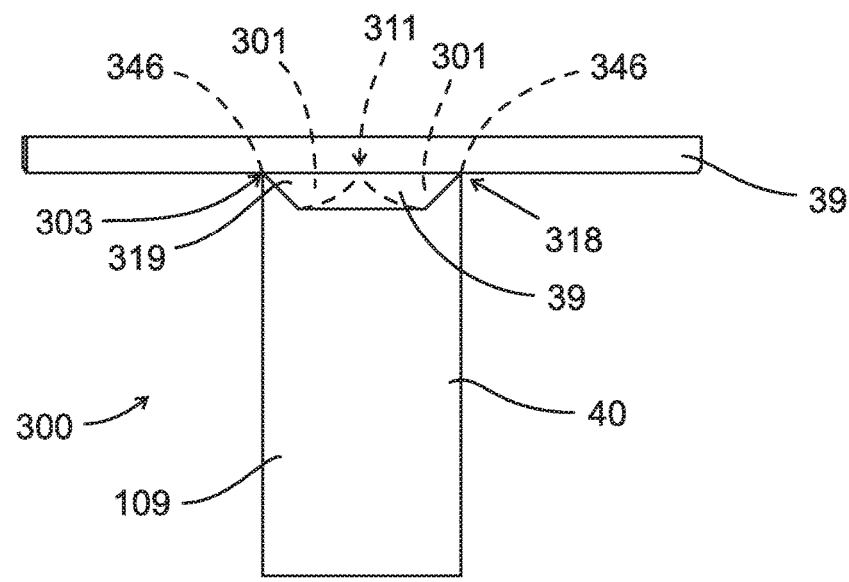
FIG. 70 is a side view of a preferred embodiment of a bottom and discharge assembly in expanded form as shown in FIGS. 41, 43 illustrating in phantom view how a bottom insert or reinforcer can be folded down along a discharge tube interior side and wherein a slit in a bottom insert or reinforcer can widen or open while materials are discharged from a bulk bag.

FIG. 70 illustrates a slit 311 of insert 301 in phantom view as non-cross hatched portion 351 is folded down into bottom opening 317 and discharge tube opening 115 along an interior side surface of discharge tube 40 upon discharge of material from a bulk bag 30. Slits 311 can open up and/or widen as material is discharged, which is depicted in phantom view in FIG. 70.

Figure 71:
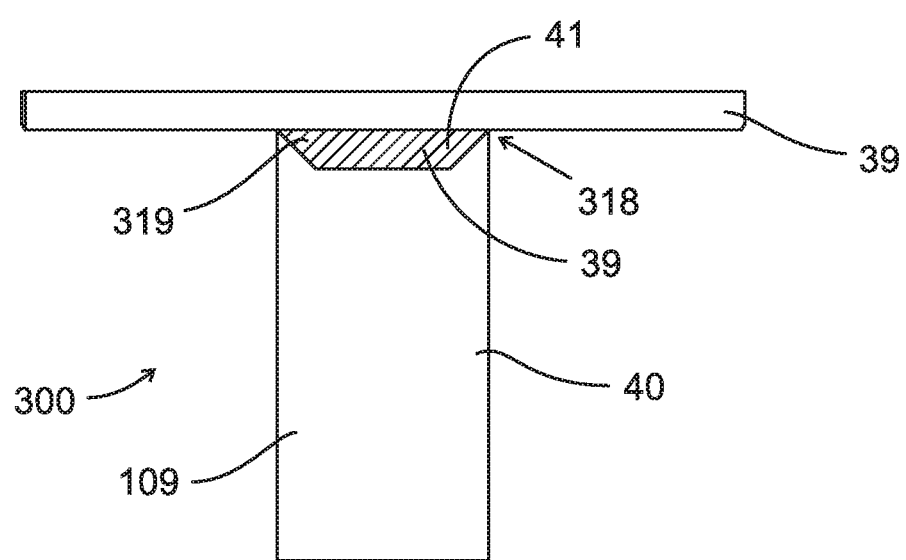
FIG. 71 is a side view of a preferred embodiment of the bottom and discharge assembly in expanded form as shown

In FIG. 71, the cross-hatched portion represents a joint 41 in the area where flap 319 of bottom 39 is coupled to discharge tube 40, e.g., via heat sealing. Insert 301 fabric, which is folded back under bottom 39 and discharge tube 40 (see also FIGS. 44, 64, 66, 70) reinforces the zero point locations shown in FIGS. 70, 71 at a zero point reinforcing portion 346 (see FIGS. 69, 70, 71).

The three overlapped bag portions, i.e., overlapped bottom 39, insert 301, and discharge tube 40 can be positioned under a heat seal bar to seal the bottom 39 to insert 301 and bottom 39 to discharge tube 40. Preferably, during assembly, slits 311 of insert 301 are offset from slits 318 of bottom 39 to ensure that fabric of insert 301 reinforces any zero point locations 303 at or about at the corner locations wherein discharge tube opening 115 is aligned with bottom opening 317. Arrow 303 represents the location of a zero point in FIG. 31, where the 90 degree turn begins for discharge spout 40. Preferably, each slit 311 of insert 301 is positioned about centrally between slits 318 and/or about centrally between corners of opening 317 of bottom 39 during assembly and heat sealing (see FIGS. 42, 44, and 49).

Tape 304 as shown in FIG. 32, which preferably is doubled back tape, can be coupled to top and bottom sides of insert 301 in gusseted configuration to aid in positioning of insert 301 within discharge tube 40 and to help maintain the position of insert 301 within discharge tube 40 when inserted into bottom 39 and during heat sealing of a bottom and discharge assembly 300. Tape 304 is thus provided for assembly purposes to hold discharge tube 40 in place coupled to insert 301 so that when they are positioned into bottom 39 both are still together in the right location. Tape 304 is preferably food grade and can stay in a bag 30 permanently.

Figure 64:
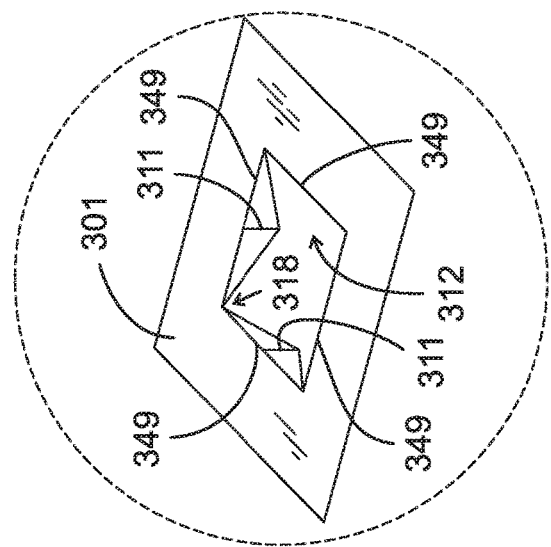
FIG. 64 is a close-up detail view of a preferred embodiment of an insert of the present invention as shown in FIG. 44.

As noted, insert 301 preferably is first positioned into discharge tube 40, e.g., as shown in FIG. 32 during assembly, and then both the discharge tube 40 and insert 301 are inserted into opening 317 of bottom 39 while bottom 39 is in folded, gusseted configuration. In FIG. 44, insert 301 is shown between bottom 39 and body 38 for depicting how insert 301 is positioned in a completed bag 30 after bottom and discharge assembly 300 is formed. As shown in FIGS. 41 and 44, in open and expanded configuration in a bag 30, at least a portion of insert 301 is on an upper, inner surface of bottom 39 around opening 317 of bottom 39. FIG. 64 illustrates an enlarged detail view of insert 301 as shown in FIG. 44. Slits 311 as shown are in position to be located in between any zero points of a joint between a bottom 39 and discharge tube 40 and so that any zero points of a bottom 39 and discharge tube 40 joint are covered by insert 301.

In one or more preferred embodiments, discharge tube 40 and insert 301 are not heat sealed together; rather bottom 39 is heat sealed to both insert 301 and discharge tube 40, which holds bottom and discharge assembly 300 together. However, it is possible that discharge tube 40 can also be heat sealed to insert 301 if desired, e.g., depending on whether a coating is applied to both sides of an insert 301 and discharge tube 40, and if so, which type of coating is applied to the fabric pieces of the assembly 300 as described further below.

Figure 31:
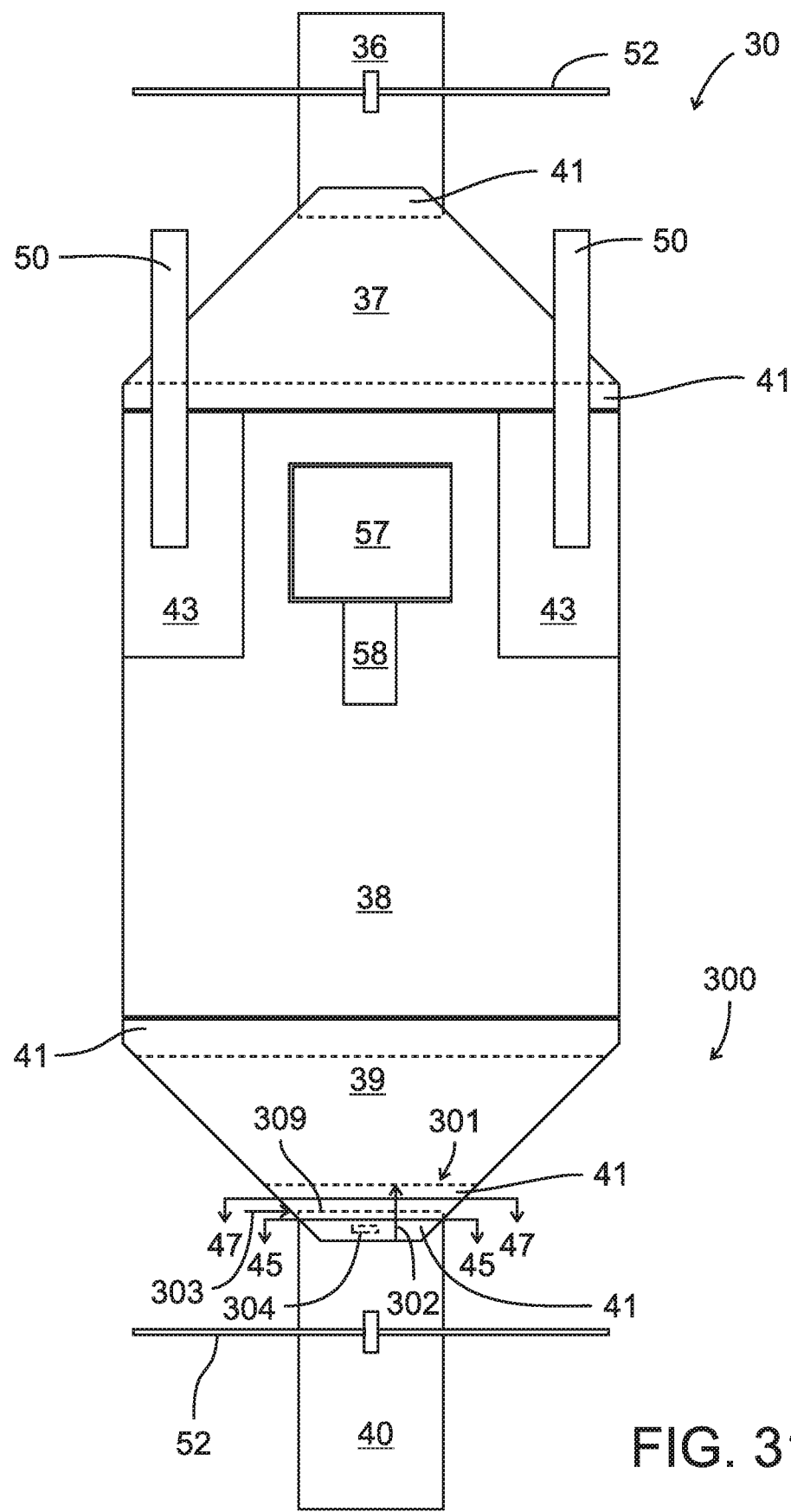
FIG. 31 is top view of another preferred embodiment of a bulk bag of the present invention in a folded, gusseted configuration and including a preferred embodiment of a bottom and discharge assembly of the present invention including a reinforcer.

FIG. 31 illustrates a bag 30 assembled with bag portions overlapped and ready for heat sealing. Line 309 represents a top edge of discharge tube 40 after being inserted through opening 317 of bottom 39 in overlapped configuration. Arrow 302 shows the location of insert 301 in bottom and discharge assembly 300 in overlapped configuration, with the top of arrow 302 representing the location of a top edge of wider portion/wider edge 306 of insert 301 in folded, gusseted configuration after being inserted through opening 317 of bottom 39 and with the bottom of arrow 302 representing the location of narrower portion/narrower edge 305 of insert 301 in folded, gusseted configuration inside discharge tube 40 (see FIG. 32). FIG. 31 also shows a document pouch 57 and tag 58 that can potentially be included on bag 30 body 38.

Bag 30 can be assembled on a carrier plate 220, e.g., as shown in FIG. 55 and then placed in heat sealing machinery, e.g., as shown in FIGS. 56-59, which are designed to heat seal overlapped areas of bag parts to form desired bag joints 41 of a bag 30. A carrier plate 220 can include a side and end rail assembly 221, an edge guide 222, clamps 223, screws 224, 226, nuts 225, and washers 227. Openings 228 are also provided. For example, a heat seal bar assembly 231 can heat seal a bottom and discharge assembly 300 together through an opening 228 in carrier plate 220 where bag joints 41 to be formed are aligned over openings 228.

Figure 60:
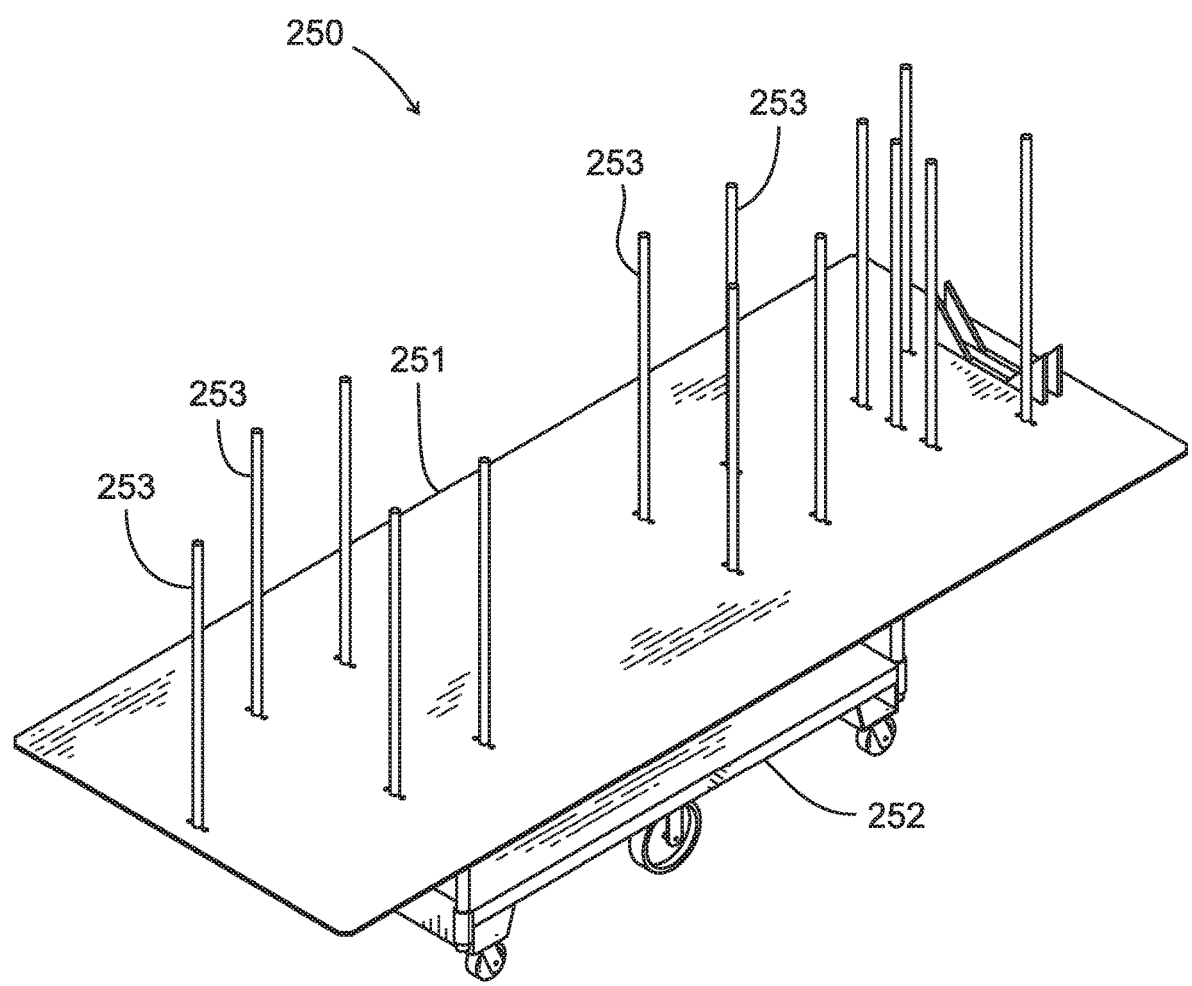
FIG. 60 is a perspective view of a preferred embodiment of a carrier cart that can hold bulk bag portions prior to assembly.
Figure 61:
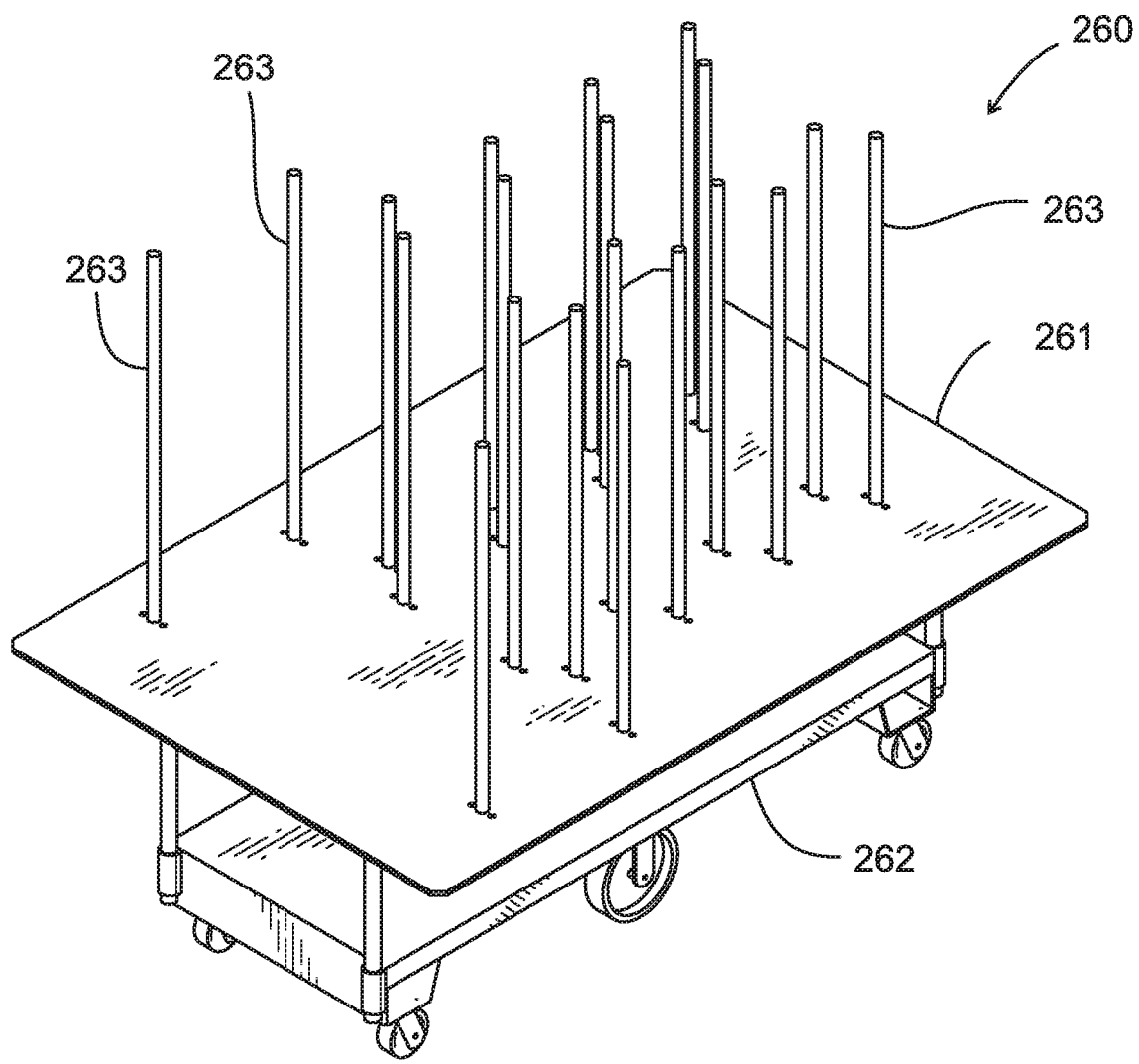
FIG. 61 is a perspective view of another preferred embodiment of a carrier cart that can hold bulk bag portions prior to assembly.

FIGS. 60 and 61 illustrate carrier carts 250 and 260, which can hold various bag parts and pieces in gusseted configuration prior to assembly on a carrier plate 220. Carrier cart 250 can have a platform 252 and top carrier cart assembly 251 with rods 253 wherein respective bag parts can be held in gusseted form between rods 253. Carrier cart 260 can have a platform 262 and a carrier cart top assembly 261 and rods 263 wherein respective bag parts can be held in gusseted form between rods 263.

Reference is made to U.S. Pat. No. 10,618,225 and U.S. patent application Ser. No. 16/796,521, incorporated herein by reference, for further details on assembly line heat seal production of bulk bags, which can be used to manufacture a bag 30. A bag 30 with a bottom and discharge assembly 300 can be heat sealed in a similar manner using a carrier plate 220, main body heat sealing machinery 230 with seal bar assemblies 231, 232, 233, 234 and 235 and table 236 which can receive a carrier plate 220 (see FIGS. 56-57), and lift loop assembly and bottom cover heat sealing machinery 240, with seal bar assemblies 241 and 242 with heat seal bars 245 (having space/opening 244 so the seal bar does not cover a lift loop 50) and 246, and table 243 for receiving a carrier plate 220 (see FIGS. 58-59).

Figure 56:
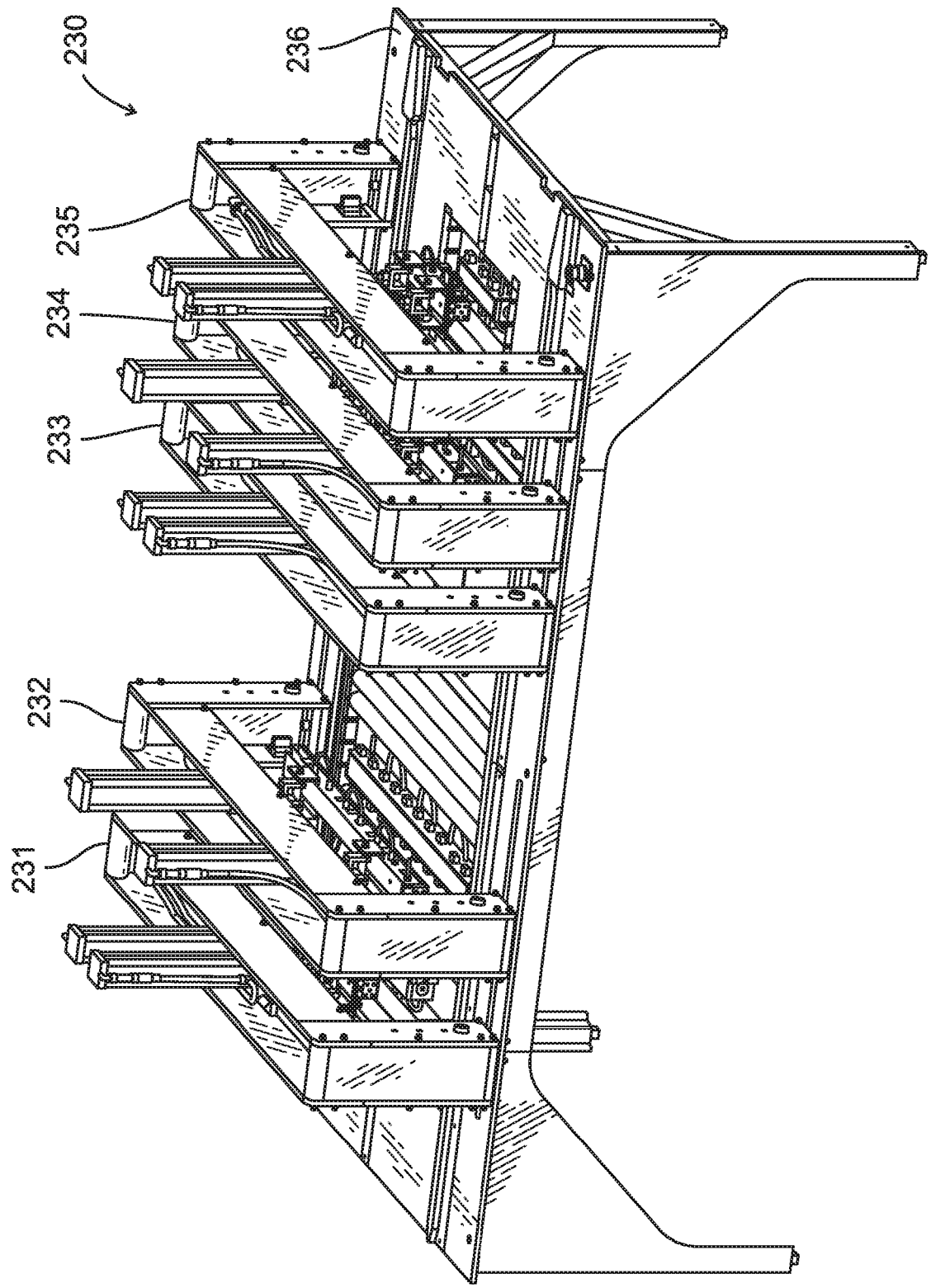
FIG. 56 is a perspective view of a preferred embodiment of a bulk bag main body heat sealing machine that can heat seal a bottom and discharge assembly of the present invention, a bottom portion to a body portion, a label/tag to a body portion, a body portion to a top portion, and a top portion to a fill spout portion.
Figure 57:
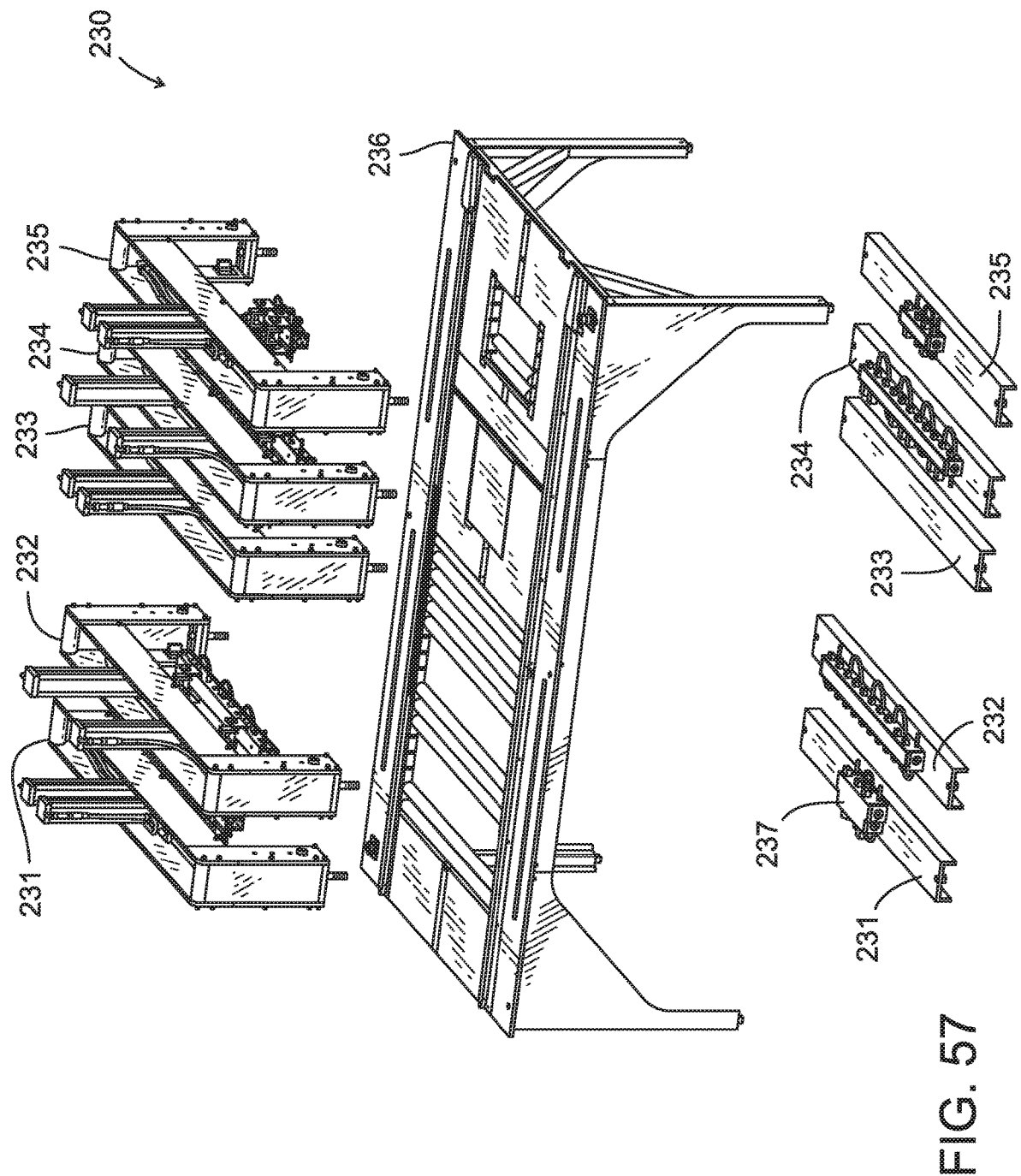
FIG. 57 is an exploded view of a preferred embodiment of a bulk bag main body heat sealing machine that can heat seal a bottom and discharge assembly of the present invention, a bottom portion to a body portion, a label/tag to a body portion, a body portion to a top portion, and a top portion to a fill spout portion.

A heat seal bar assembly 231 as shown in FIGS. 56 and 57 can be used to form bag joints of a bottom and discharge assembly 300. A heat seal bar 237 can be included in heat seal bar assembly 231, which preferably has a shape configured to heat seal the overlapped area of bottom 39, insert 301 and discharge tube 40 as shown in FIG. 31 between the bottom of arrow 302 to top of arrow 302 to form respective bonds between a discharge tube 40 and bottom 39 and between insert 301 and bottom 39. A heat seal bar 237 is preferably sized to at least cover the area from the bottom of arrow 302 to the top of arrow 302. A heat seal bar 237 is more preferably sized to extend at least a distance a little beyond the area from the bottom of arrow 302 to the top of arrow 302 to ensure that non-graspable edges of the fabric of a bag joint are formed during heat sealing. A seal bar 237 can be about 4 inches wide or a little wider. A seal bar 237 can be formed from two seal bars that are each 2 inches wide, for example.

A main body heat sealing machine 230 is preferably at least semi-automatic. Preferred specifications for a semi-automatic standard main body heat sealing machine 230 are:
1) Size—112" L×68" W×35" H;
2) Electrical—240 VAC, 60 Hz, Three Phase;
3) Air—filtered at 30 psi;
4) Internet compliant with full data collection and storage bag traceability with data including: Serial number, Manufacturing times and date, Operator, Seal/cool down temperatures, Seal bake times, machine cycle times, Air pressure, Error messages;
5) 30" to 55" body tube length—56" to 75" requires center folding;
6) 37" body tube width;
7) 14" diameter×15" fill spout;
8) 14" diameter×22" discharge spout; and
9) Five carrier plates—Standard Body Sealing Machine and Standard Loop Sealing Machine: 50" body length× 37" body width; 14" diameter×15" fill spout; 14" diameter×22" discharge spout.

Options can include:
1) 41" body width;
2) 16" and 18" diameter spouts—fill spouts and discharge spouts (note in general, new carrier plates are required for any bag dimensional change from standard); and
3) Input voltage—can customize requirement.

Preferably a lift loop assembly and bottom cover/diaper heat seal machine 240 is at least semi-automatic. Preferred specifications for a standard semi-automatic lift loop assembly and bottom cover/diaper heat seal machine 240 are:
1) Size—112" L×68" W×35" H;
2) Electrical—240 VAC, 60 Hz, Three Phase;
3) Air—filtered at 30 psi;
4) Internet compliant with full data collection and storage bag traceability with data including: Serial number, Manufacturing times and date, Operator, Seal/cool down temperatures, Seal bake times, machine cycle times, Air pressure, Error messages;
5) 30" to 55" body tube length—56" to 75" requires center folding;
6) 37" body tube width;
7) 14" diaper width;
8) 10" standard loop height above top of bag down to 5" loop height for oversize top;
9) Five carrier plates—same carrier plates for both Body Sealing Machine and Loop Sealing Machine;
10) Vision system—verification distance check of loop patch from edge of bag prior to start initiation; and
11) Tilt system—verification thickness check of loop patch area prior to start initiation.

Figure 65:
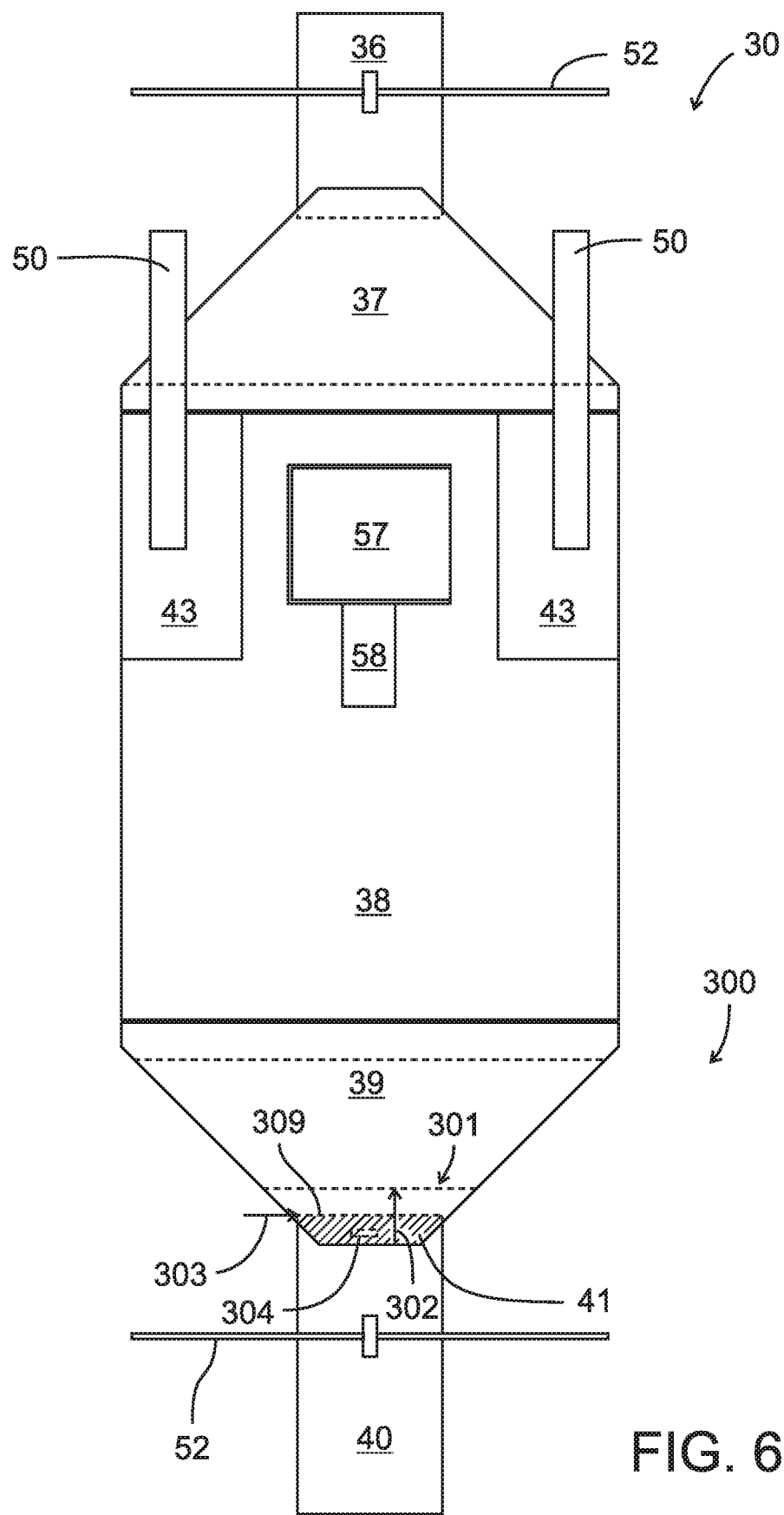
FIG. 65 is a top view of a preferred embodiment of a bulk bag of the present invention in a folded, gusseted configuration and including a preferred embodiment of a bottom and discharge assembly of the present invention, wherein cross-hatching designates an area where a bottom, discharge tube and insert are overlapped.

Options can include:
1) 41" body width;
2) 16" and 18" diameter spouts—fill spouts and discharge spouts
(Note: new carrier plates generally are required for any bag dimensional change from standard); and
3) Input voltage—can customize requirement Referring to FIGS. 31, 65, in the overlapped portion of bag 30 from the bottom of arrow 302 to line 309, a heat seal joint can be formed between bottom 39 and discharge tube 40. Cross-hatching in FIG. 65 between the bottom of arrow 302 and line 309 designates an area where bottom 39, discharge tube 40 and insert 301 are overlapped, but as discussed herein, in preferred embodiments a bond, a connection, or a bag joint 41 is only formed in this area between bottom 39 and discharge tube 40, with no bond, connection, or bag joint 41 formed between discharge tube 40 and insert 301 in this area. The distance between the bottom of arrow 302 and line 309 preferably is about 2 inches and can also be a distance of about ½ inch to 4 inches, depending on the strength requirements. If more strength is needed, the distance will increase.

In the area between line 309 and the top of arrow 302 a bond, connection, or joint 41 can be formed between bottom 40 and insert 301, and the distance between line 309 and the top of arrow 302 preferably can be about 2 inches and can also be a distance of about ½ inch to 4 inches, depending on the strength requirements. If more strength is needed, the distance will increase. Cross hatching in FIG. 66 between line 309 and a top of arrow 302 designates an area where just bottom 39 and insert 301 are overlapped and where a bond, a connection or joint 41 can form between a coating 19 on bottom 39 and a coating 19 on insert 301.

FIG. 32 illustrates preferred positioning of an insert 301 when overlapped with a discharge tube 40. Numeral 305 illustrates the position of a narrower edge 305 of insert 301 in folded, gusseted configuration inside discharge tube 40, which can be inserted into discharge tube 40 to a distance of about ½ inch to 4 inches, and preferably at 2 inches. FIG. 32 illustrates two pieces of tape 304, which preferably are included on top and bottom sides of insert 301. As shown in FIG. 32, preferably a wider portion of insert 301, represented by numeral 306, in folded gusseted form extends outside of discharge tube 40. Numeral 306 represents an edge of insert 301 that extends outside of discharge tube 40 and which will be in contact with bottom 39 inner surface 315 when overlapped with bottom 39.

Slits 307 are preferably included in discharge tube 40 as shown in FIGS. 32-36 to allow insert 301 to take the shape as shown in FIG. 32 when insert 301 is overlapped with discharge tube 40, when both discharge tube 40 and insert 301 are in folded, gusseted configurations as shown in FIGS. 35-36 and 39-40, respectively. Slits 307 can be about 1 to 4 inches and preferably are 1 inch long, depending on strength requirements. Slits 307 can also be 1 1/16 inch. Referring to FIG. 36, in gusseted configuration slits 307 can be at or at least near or very close to the edges of the gussets of discharge tube 40.

Figure 37:
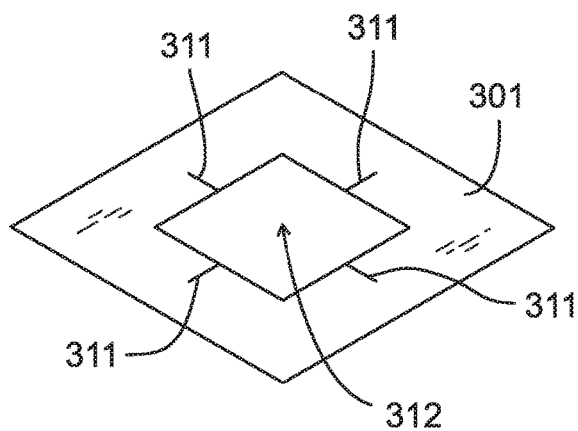
FIG. 37 is a perspective view of a preferred embodiment of a bottom insert or reinforcer of a preferred embodiment of a bottom and discharge assembly of the present invention.
Figure 38:
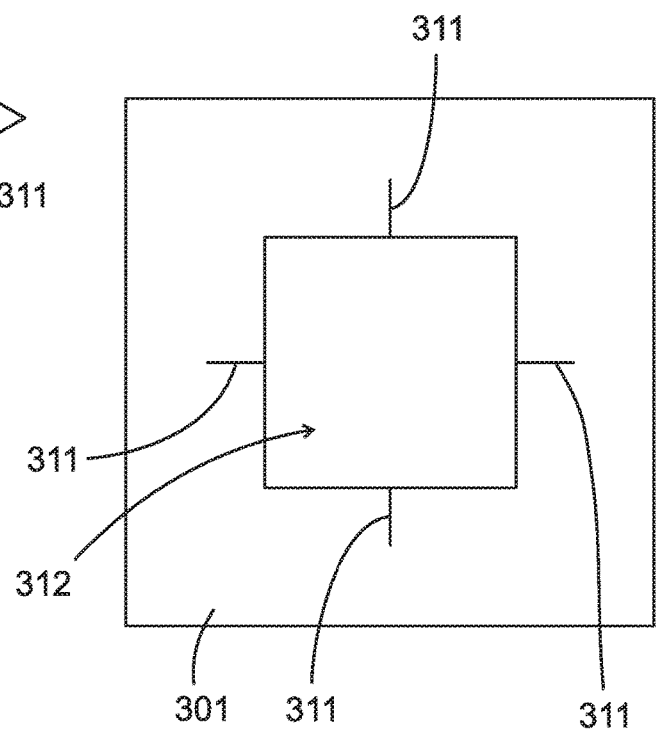
FIG. 38 is a top view of a preferred embodiment of the bottom insert shown in FIG. 37.

Slits 311 are preferably included in insert 301 as shown in FIGS. 37 and 38 to allow for movement of the insert so that it can make a bend without tearing away from bottom 39. Slits 311 can be about 1 to 4 inches, and preferably are about 1 inch long, which allows the trapezoid shape of insert 301 in folded, gusseted form as shown in FIGS. 39, 68 to open up to an expanded form as shown in FIGS. 37, 44 having an opening 312 that is at least about near the size of opening 115 of discharge tube 40 to prevent having any restricted flow during discharge of bulk material from a bag 30. Slits 311 can also be 1 5/8 inch to 1 7/8 inches.

An insert 301 in non-gusseted form preferably has a square or substantially square shape to help reinforce the connection of a discharge tube 40 and bottom 39 at or about near square openings of a discharge tube 40 and bottom 39. An insert 301 could also be more of an irregular shape. Other shapes besides square or at least substantially square can be used but a square shape or at least substantially square shape is most efficient in both sealing area efficiency and strength.

In non-gusseted form, sides of an insert 301 can have a width of about 15.5 to 16 inches, more preferably a width of about 15.6 to 15.8 inches and most preferably a side of insert 301 has a width of about 15 5/8 inches to 15 7/8 inches for use in a 37×37 inch bag. Opening 312 preferably is positioned about centrally in insert 301. A corner of opening 312 can be about 3.75 to 4.25 inches, more preferably about 3.8 to 4.1 inches, and most preferably is about 4 to 4¼ inches, away from a fabric edge of insert 301. A side of an opening 312 can be about 7.2 to 7.7 inches, more preferably about 7.3 to 7.6 inches, and most preferably is about 7 3/8 to 7 5/8 inches long, with a half distance of about 3.4 to 3.9 inches, more preferably a half 20 distance of about 3.6 to 3.8 inches and most preferably a half distance of about 3 5/8 inches to 3 7/8 inches. Dimensions of an insert 301 can be adjusted for smaller or larger bags.

Figure 45:
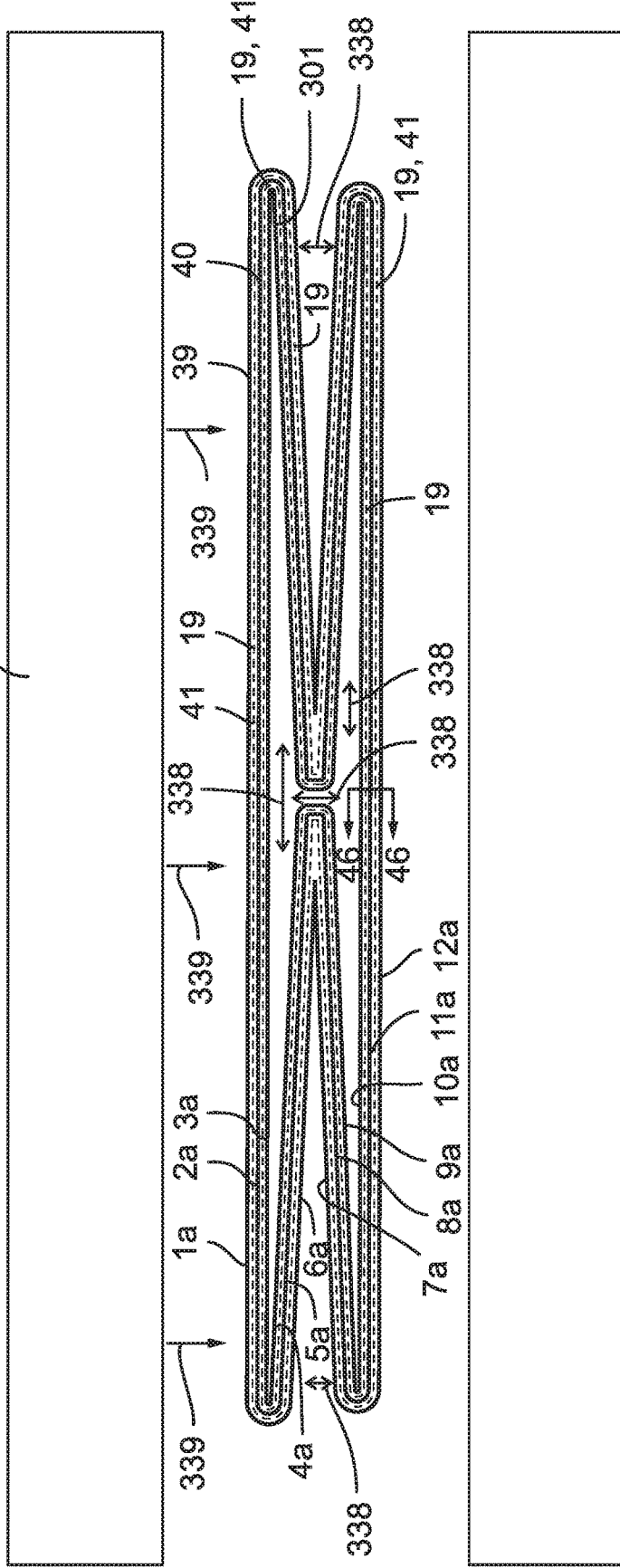
FIG. 45 is a partial view of a preferred embodiment of a bottom and discharge assembly in folded, gusseted configuration under heat seal bars, illustrating an overlapped configuration of the bottom and discharge assembly taken along lines 45-45 of FIG. 31.
Figure 46:
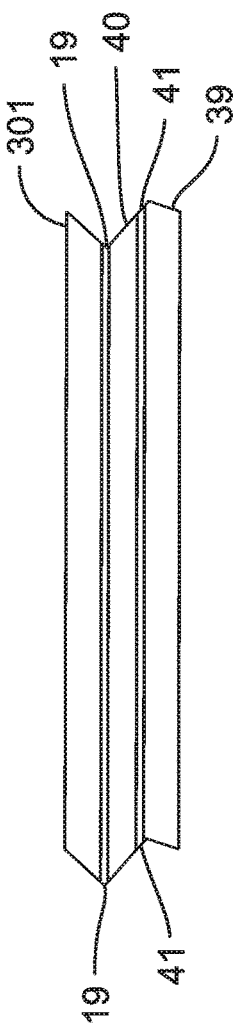
FIG. 46 is a sectional view taken along lines 46-46 of FIG. 45.

FIGS. 45-46 illustrate layers of fabric in an overlapped portion of bottom and discharge assembly 300 as taken along lines 45-45 of FIG. 31. As shown, in the overlap area between the bottom of arrow 302 and line 309 (see FIGS. 31, 65), three bag portions, i.e., bottom 39, discharge tube/spout 40 and insert 301 are each in folded, gusseted configuration and overlapped such that 12 layers of fabric are between the heat seal bars 314 during heat sealing. The dotted lines between layers of fabric of the bottom 39, discharge tube/spout 40 and insert 301 represent coatings 19 on surfaces of the fabric layers. When a heat seal bar 314 is lowered in the direction of arrows 339 to press respective layers 1a, 2a, 3a, 4a, 5a, 6a, 7a, 8a, 9a, 10a, 11a, 12a together, if a coating 19 is a fusion or heat seal coating touching another coating 19 that is a fusion or heat seal coating, or if a coating 19 is a fusion or heat seal coating touching another coating 19 that is a standard coating under the seal bars, a bag joint 41 will be formed between respective layers of fabric that are in contact with one another. In areas where a standard polypropylene fabric coating is touching a standard polypropylene fabric coating, where a standard polypropylene coating is touching fabric without a coating, and/or where fabric without a coating is touching fabric without a coating, a bag joint is not formed between respective layers in contact with one another when heat sealing is performed at a temperature below the melting point of the bag fabric, so that the bag can expand to an open configuration, e.g., as shown in exploded view in FIG. 44. Arrows 338 in FIG. 45 illustrate areas where a joint 41 or heat seal bond is not formed between layers or fabric that come into contact with one another while pressed between the heat seal bars 314.

Thus, in a preferred embodiment where discharge tube 40 has a standard coating on its exterior surface and a standard coating on its interior surface (or no coating on its interior surface) and when an insert 301 has a standard coating on its exterior or top surface, no bag joint is formed between surfaces or coatings 19 of a discharge tube 40 and insert 301 that are in contact with one another under the heat seal bars. In FIG. 46, the area designated by numeral 19 thus can be an area where no joint 41 is formed between a discharge tube 40 and an insert 301 when under heat and pressure from one or more heat seal bars 339 as shown in FIG. 45. A bag joint 41, however is formed between a standard coating on an exterior surface of discharge tube 40 and a heat sealing coating on the interior surface/side 315 of bottom 39 when heat sealing the coatings 19 in between bottom 39 fabric and discharge tube 40 fabric as shown in FIGS. 45-46.

If desired, a bond or joint 41 can be formed between an insert 301 and discharge tube 40 if insert 301 and/or discharge tube 40 has a fusion or heat sealing coating on surfaces that are in contact with one another when under heat and pressure from a heat seal bar 314. If so, then a joint 41 can be formed in the area designated as 19 in FIG. 46.

FIGS. 47 and 48 illustrate the layers of fabric in the overlapped portion as taken along lines 47-47 of FIG. 31, between line 309 and the top of arrow 302 (see also FIG. 66). In this overlapped area, only bottom 39 and insert 301 are overlapped in a preferred gusseted/folded configuration of bottom and discharge assembly 300 and there are 8 layers of overlapped fabric. In a preferred embodiment, when a heat seal bar 314 is lowered in the direction of arrows 339 to press respective layers 1b, 2b, 3b, 4b, 5b, 6b, 7b, 8b together between the heat seal bars 314, a bag joint is formed between bottom 39 and insert 301 in areas where a standard coating on a top surface of insert 301 is in contact with a fusion or heat sealing coating on interior surface/side 315 of bottom 39. In areas where a standard polypropylene fabric coating is touching a standard polypropylene fabric coating, where a standard polypropylene fabric coating is touching fabric without a coating, or where fabric without a coating is touching fabric without a coating, a bag joint is not formed when heat sealing at a temperature below the melting point of the bag fabric so that the bag can expand to an open configuration, e.g., as shown in exploded view in FIG. 44. Arrows 340 on FIG. 47 illustrate areas where no joint or heat seal bond is formed between respective layers or fabric that are in contact when pressed between heat seal bars 314.

Including insert 301 under the heat sealed joint of bottom 39 and discharge tube 40 as shown in the figures greatly increases the strength of the bag and eliminates problems associated with a zero point 303 that can occur at or about at corner locations of a joint between bottom 39 and discharge tube 40 around a periphery of bottom 39 and discharge tube 40 openings 317, 115. FIG. 54 includes 5 to 1 industry safety lifting test results for a bulk bag with a bottom and discharge assembly as shown in FIG. 31, for example, wherein bottom 39 is sealed to discharge tube 40 and insert 301, and wherein discharge tube 40 and insert 301 are not heat sealed together. Each bag passed the tests with break points occurring at over 14,000 pounds and up to 16,460 pounds, when the weight capacity needed for the bags to pass the test was 11,000 pounds. In bulk bags with heat fused joints between a bottom and discharge tube that did not include an insert 301, in 5 to 1 industry safety lifting tests, many of the bags were breaking around 10,000 pounds.

In preferred embodiments, a coating 19 on bottom portion 39, which preferably is a fusion or heat seal coating as described further below on bottom portion 39, forms a bond or joint 41 between a coating 19 on an exterior surface 335 of insert 301, which preferably is a standard polypropylene fabric coating when the fabric of insert 301 is woven polypropylene fabric. Coating 19 on bottom 39 inner surface 315 of flaps 319, 320, 321, 322, which preferably is a fusion or heat seal coating, forms a bond or joint 41 with a coating 19, on exterior surface 109 of discharge tube 40, which preferably is a standard polypropylene fabric coating when fabric of discharge tube 40 is woven polypropylene. Both insert 301 and discharge tube 40 can have a standard polypropylene fabric coating, for example, on discharge tube 40 inner surface 108 and inner surface 336 of insert 301, or inner surface 108 of discharge tube 40 and inner surface 336 of insert 301 can have no coating 19 thereon, such that no heat seal bond is formed between insert 301 and discharge tube 40 when in overlapped, gusseted configuration as shown in FIGS. 31, 45 and 46, for example. A bond also is not formed in any areas wherein exterior surface 335 of insert 301 is in contact with inner surface 108 of discharge tube 40 when a standard coating or no coating is on those surfaces. When a standard polypropylene fabric coating, for example, is in contact with another standard polypropylene fabric coating under heat and pressure, at heat less than the melting point of the bag and under pressure, a heat seal bond or joint 41 does not form that can support weights held in the bag. When heat sealing layers as shown in FIG. 46, areas where a standard coating comes into contact with another standard coating do not get bonded together so that the bag can expand to open configuration, for example, when heat-sealing at a temperature that will melt a heat seal coating as described herein but not woven polypropylene fabric. Areas where woven polypropylene fabrics with no coatings come into contact with one another also will not form a heat seal bond or joint 41 when heat seal temperatures are below the melting point of the fabric but high enough to melt the heat seal coating.

In one or more embodiments, the discharge tube 40 and insert 301 can include a heat sealing coating and the bottom 39 can include a standard coating such that a bond 41 is formed between the bottom 39 and insert 301 when heat sealing and a bond 41 is also formed between the discharge tube 40 and bottom portion 39 when heat sealing in overlapped configuration as shown in FIGS. 45-48.

In one or more embodiments, the discharge tube 40 and insert 301 and bottom 39 can each include a heat sealing coating such that a bond 41 is formed between the discharge tube 40 and insert 301 when heat sealing, and a bond 41 is formed between the discharge tube 40 and bottom portion 39, when heat sealing and a bond is formed between bottom portion 39 and insert 301.

In general, to form a heat seal bond or joint 41 on a bag 30, a fusion or heat sealing coating, as described below, can be coupled to another fusion or heat sealing coating under heat and pressure, or a fusion or heat sealing coating can be coupled to a standard coating, as described below, under heat and pressure.

In one or more embodiments, a heat seal coupler includes a coating 19 on one side of insert 301 that can form a bond with a coating 19 on bottom 39.

In one or more embodiments, a heat seal coupler includes a standard coating on one side of bottom 39 that can form a bond with a heat seal coating on a discharge tube 40.

In one or more preferred embodiments a coating on one side of insert 301 is a standard coating that can form a bond with heat seal coatings on bottom 39 and discharge tube 40.

In one or more preferred embodiments, a coating on both sides of insert 301 is a standard coating.

In one or more preferred embodiments, a coating on an exterior side of insert 301 in gusseted configuration is a standard or heat sealing coating, and no coating is on an interior side of insert 301 in gusseted configuration.

A heat seal coating on one side of insert 301, e.g., an exterior side in gusseted configuration of insert 301, can form a bond with either a standard coating or heat seal coating that is on bottom 39. A heat sealing coating on one side of an insert 301, e.g., an exterior side in gusseted configuration of insert 301, can be a coating that can form a bond with either a standard coating or heat sealing coating on discharge tube 40, or a coating that will not form a bag joint with a coating on discharge tube 40.

A fusion or heat sealing coating that can be included on an insert 301, bottom 39 and/or discharge tube 40 can be a coating comprising propylene based elastomers or plastomers. In various preferred embodiments, a fusion or heat sealing coating can comprise about 50% to 90% of propylene-based plastomers, propylene-based elastomers, or mixtures thereof and about 10% to 50% polyethylene resins and additives, having a melting point that is preferably at least about 5 degrees lower than the melting point of the polypropylene fabrics to be joined together. In other embodiments, the fusion or heat sealing coating can comprise about 50% to 90% of VERSIFY™ 3000 (Trademark of The Dow Chemical Company) and about 10% to 50% polyethylene resins, having a melting point that is preferably at least about 5 degrees lower than the melting point of the polypropylene fabrics to be joined together. Suitable propylene based elastomers or plastomers can be purchased for example under the trademark VERSIFY™ 3000, and EXXON™.

In various preferred embodiments a mixture of a minimum of about 70% pure VERSIFY™ 3000 and about 25% polyethylene, and about 5% other additives such as pigments or Ultra Violet (UV) inhibitors, can be used for a fusion or heat sealing coating. Other potential additives may include anti-static protection. Properly sealed, this system will produce heat sealed joints or bonds 41 resulting in an average joint strength of about 92% of the strength of standard 5 ounces per square yard (169.53 grams per square meter) woven polypropylene.

In one or more preferred embodiments, a standard coating can be included on insert 301, discharge tube 40 or bottom 39 instead of a heat sealing coating. A standard industry coating or standard coating for polypropylene fabrics, generally comprises a majority percentage of polypropylene and a small percentage of polyethylene. Preferably, a standard polypropylene fabric coating used with one or more embodiments of the present invention has about 70-85 percent polypropylene with a balance of polyethylene, i.e., 15 to 30 percent polyethylene. More preferably, a standard polypropylene coating used in various preferred embodiments of the present invention has about 70-85 percent polypropylene, with a balance of polyethylene and some UV inhibitors, and other additives.

For polyethylene fabrics, a standard coating can be a laminated film or coating that is comprised of polyethylene, or a mixture of polyethylene and other additives. If a standard polyethylene coating is included on fabrics, a stronger bond can be formed between two standard polyethylene fabric coatings than what is formed between two standard polypropylene fabric coatings. Therefore, when heat sealing, fabrics having standard polyethylene fabric coatings thereon, buffers, e.g., wax paper can be included between standard polyethylene fabric coatings to prevent unwanted bonds from being formed. Buffers, e.g., wax paper can generally be included between layers of fabric wherever a bond is not wished to be formed when heat sealing overlapped layers of fabric.

Generally, a standard coating can be applied to the fabrics used in one or more embodiments of the present invention at about 1 mil (0.025 millimeters) thickness. Preferably, a standard coating is applied to fabrics at about 2.5 mil (0.064 millimeters) thickness. A standard coating can also be applied to fabrics at about 1 to 2.5 mil (0.025 to 0.064 millimeters) thickness or over about 2.5 mil (0.064 millimeters) thickness.

Preferably a fusion or heat sealing coating is applied at about 2.5 mil (0.064 millimeters) thickness. In other embodiments, a heat sealing coating can be applied at about 1 to 2.5 mil (0.025 to 0.064 millimeters) thickness or over about 2.5 mil (0.064 millimeters) thickness. Given the high cost of a heat sealing coating, preferably a heat sealing coating is not applied above about 2.5 mil (0.064 millimeters) thickness, although it can be applied at a greater thickness.

Figure 58:
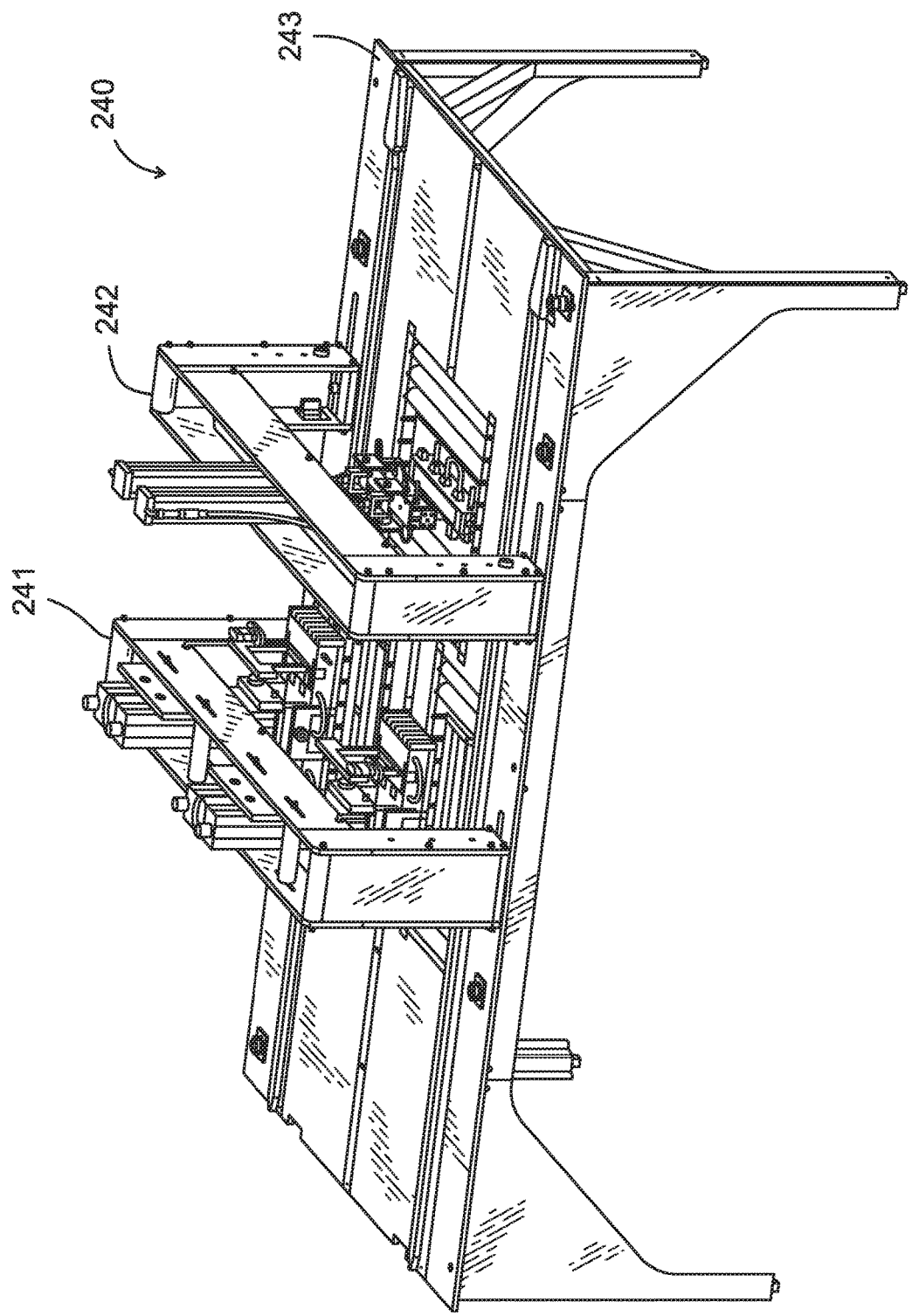
FIG. 58 is a perspective view of preferred embodiment of a lift loop assembly and bottom cover/diaper heat sealing machine that can heat seal lift loop assemblies to a bulk bag and a bottom cover/diaper to a bulk bag.
Figure 59:
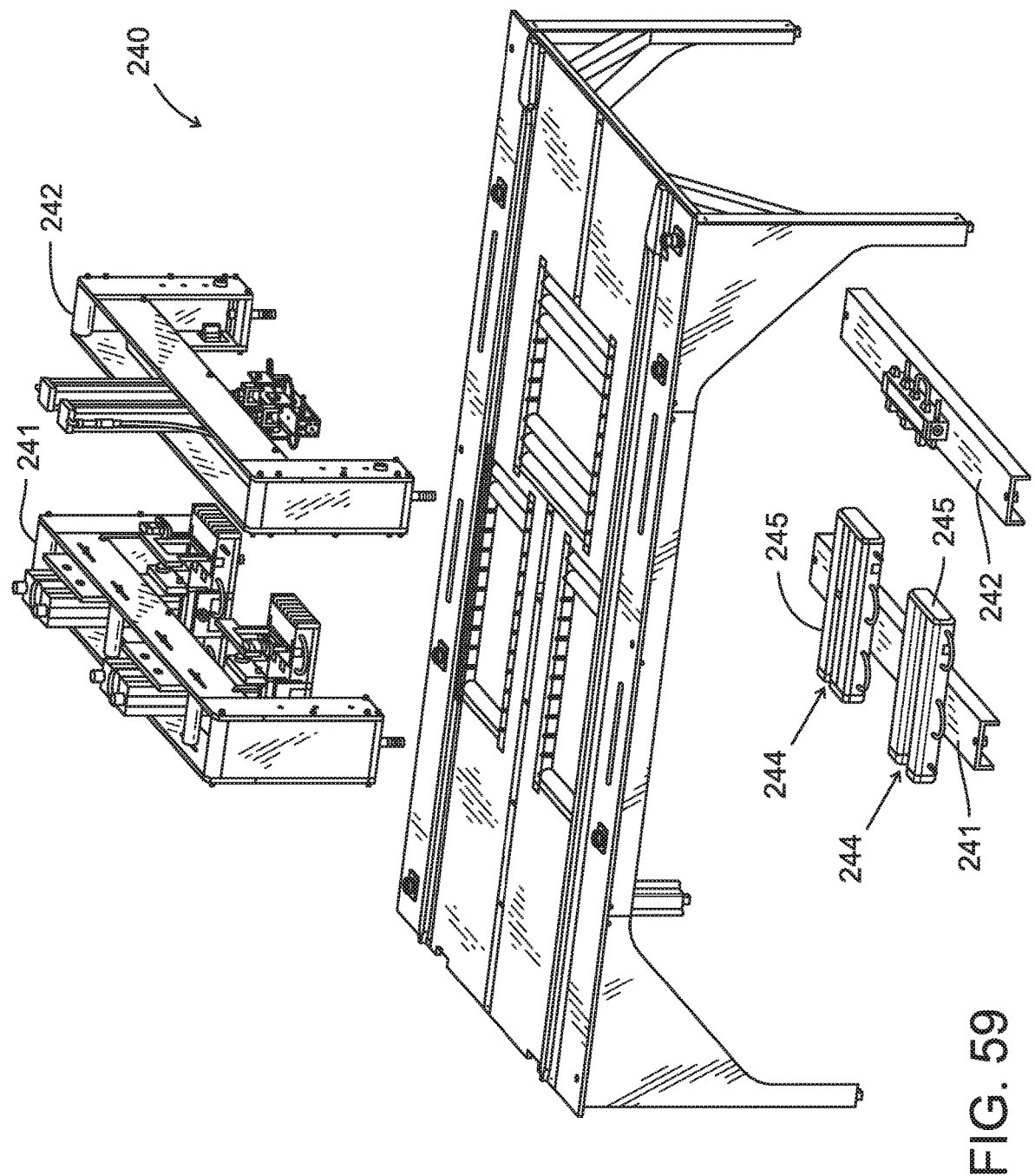
FIG. 59 is an exploded view of preferred embodiment of a lift loop assembly and bottom cover/diaper heat sealing machine that can heat seal lift loop assemblies to a bulk bag and a bottom cover/diaper to a bulk bag.
Figure 62:
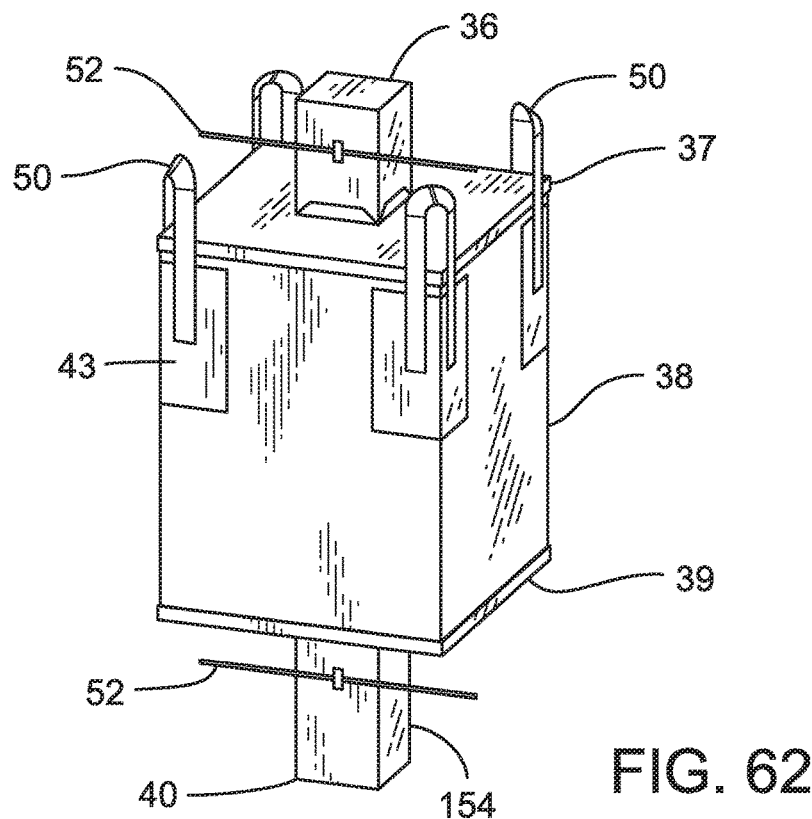
FIG. 62 is a perspective view of a bulk bag including a preferred embodiment of a bottom and discharge assembly and also a preferred embodiment of a bottom cover.
Figure 63:
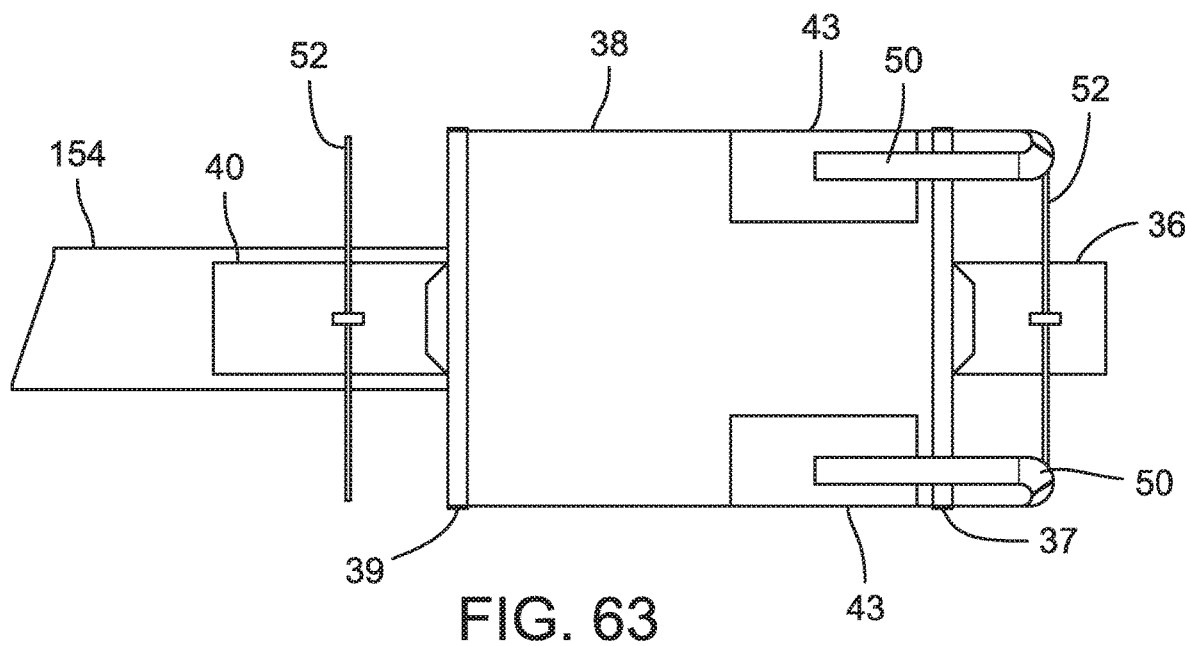
FIG. 63 is a top view of a bulk bag including a preferred embodiment of a bottom and discharge assembly and also a preferred embodiment of a bottom cover.

As shown in FIGS. 62-63, a bottom cover/diaper 154 as shown and described herein can be included on a bag 30 having a bottom and discharge assembly 300. A cover 154 can be heat sealed to a bag 30 using lift loop assembly and bottom cover heat sealing machine 240 as shown in FIGS. 58-59. When cover 154 is coupled to a bag 30 with a bottom and discharge assembly 300, preferably there is a shorter distance between the bend locations 201, 202 of cover 154 as compared to the distance between edges 211 and 212 of bottom 39, to in effect cinch the bag bottom 39, as described herein, and provide even greater strength to a bag 30 (see FIG. 44). As described herein, when the distance between bottom cover 154 bends 201, 202 is shorter than the distance between bottom edges 211, 212 the cover 154 adds strength to the bag. Preferably the distance between bottom cover bends 201, 202 is at least 2 inches shorter than the distance between bottom edges 211, 212 on a bag 30.

As desired, a bag 30 with a bottom and discharge assembly 300 can include a rolled discharge tube assembly 160 as described herein or a discharge tube assembly 190 with a tie 52.

In general for a bag 30, a heat seal bond can be formed between a heat sealing coating on one piece of fabric and a heat sealing coating on another piece of fabric when heat is applied to melt the heat sealing coating(s) so that a bond between the two heat sealing coatings is formed. A heat seal bond can also be formed between one piece of fabric having a heat sealing coating and another piece of fabric having a standard coating when heat is applied to melt the heat sealing coating. Preferably when heat is applied to form bag joints of bag 30, the heat is below the melting point of bag fabric.

Referring again to FIGS. 34-36, it is noted that in preferred embodiments a portion of a coating 19 (either a fusion or heat sealing coating or a standard coating) applied to one or more bag portions, extends a distance over the edge of the fabric, e.g., at over edge coating portion 310 of discharge tube 40 designated by arrows 344 in FIG. 34. An over edge portion of coating can also be applied to a fill spout 36 or body portion 38 and reference is made to U.S. Pat. No. 10,618,225, which is incorporated herein by reference, for more details.

When applying the coating to a tubular fabric portion 36, 38 or 40, the tubular fabric portion can be positioned on a substantially flat surface. The tubular bag fabric portion 36, 38, 40 can have two open end portions, and two edge portions that are not open. Coating can be applied on a first side wherein it extends past a coated edge in an over edge coating portion 310, which can be positioned on the tubular portion, e.g., on discharge tube 40 about 0 to 0.4 centimeters for, example, from a fabric edge. The coating can also be applied on a second side of the tubular fabric portion 36, 38, 40 in the same manner so that it extends beyond a coated fabric edge in an over edge coated portion 310. When coating is applied to the second side, the over edge portion of the second side will adhere to the over edge portion of the first side coating. An over edge coating portion can also be applied to other bag parts if desired.

In a final coated tubular fabric portion, two over edge coating areas 310 will be present as shown in FIG. 36. Each tubular piece with an over edge coating portion can be gusseted so that a first over edge portion 310 is on a top side of a gusset edge, and the second over edge portion 310 is on a bottom side gusset edge, as shown in FIG. 36. The over edge coating can extend about 0.03 to 0.18 inches (0.076 to 0.457 cm) beyond a fabric edge, and preferably can be ⅛ inch or 0.32 cm beyond a fabric edge in folded, gusseted configuration.

Applying a coating with an overedge coating portion as described herein can be used for both a bonding coating or a standard fabric laminate coating, e.g., a standard polypropylene fabric coating. The over edge coating portion helps to maintain a seamless moisture barrier. If there is no overedge sealed coating, this can leave open yarns exposed. If the overedge is sealed, then there is no exposed edge that could delaminate thus allowing additional moisture penetration.

In preferred embodiments, a discharge tube 40 is made from 3 oz polypropylene fabric. A discharge tube 40 can also be made from 2 to 9 oz polypropylene fabric.

In preferred embodiments, an insert 301 is made from 5 oz polypropylene fabric. An insert 301 can also be made from 2 to 9 oz polypropylene fabric.

In preferred embodiments, a bag bottom 39 is made from 5 oz polypropylene fabric. A bag bottom 39 can also be made from 3 to 9 oz polypropylene fabric.

In preferred embodiments, a bag body 38 is made from 5 oz polypropylene fabric. A bag body 38 can also be made from 3 to 9 oz polypropylene fabric.

In preferred embodiments, a bag top 37 is made from 3 oz polypropylene fabric. A bag top 37 can also be made from 2 to 10 oz polypropylene fabric.

In preferred embodiments a bag fill spout 36 is made from 3 oz polypropylene fabric. A bag fill spout 36 can also be made from 2 to 9 oz polypropylene fabric.

The above discussion is meant to be illustrative of the principles and various preferred embodiments of the present disclosure. While certain embodiments have been shown and described, modifications thereof can be made by one skilled in the art without departing from the spirit and teachings of the disclosure. The embodiments described herein are exemplary only and are not limiting. Accordingly, the scope of protection is not limited by the description set out above, but is only limited by the claims which follow, that scope including all equivalents of the subject matter of the claims.

PARTS LIST

The following is a list of parts and materials suitable for use in the present invention:

1a layer
1b layer
2a layer
2b layer
3a layer
3b layer
4a layer
4b layer
5a layer
5b layer
6a layer
6b layer
7a layer
7b layer
8a layer
8b layer
9a layer
10a layer
11a layer
12a layer
10 bulk bag
19 coating or lamination
30 bulk bag
36 top spout/fill tube
37 upper portion/top
38 immediate portion/body/body panel
39 lower portion/bottom
40 bottom spout/discharge spout/discharge tube
41 seam/joint/heat seal bond/heat seal connection
43 patch
50 lift loop
52 spout tie
54 outer cover
56 tie or cord
57 document pouch
58 tag
60 prior art discharge assembly
62 pinch point
83 upper portion bottom panel
104 heat sealing or fusion or sewn connection
106 heat sealing or fusion or sewn connection
108 discharge tube inner or interior surface
109 discharge tube outer or exterior surface
115 discharge tube opening
116 discharge tube gusset
117 discharge tube gusset
140 rolled discharge spout/rolled discharge tube/rolled bottom spout
142 circular discharge spout
144 gusseted spout/square or rectangular discharge spout/discharge tube
146 gussets
148 rolled layers/stacked layers
152 coupler/tie/adhesive tape
154 cover
160 discharge assembly 162 coupling
164 coupling
166 coupling
168 tape location
170 tab
175 discharge tube end
176 discharge tube end
180 tab
190 discharge assembly
201 bend/bend line/bend location
202 bend/bend line/bend location
211 edge
212 edge
220 carrier plate
221 side and end rail assembly
222 edge guide
223 clamp
224 screw
225 nut
226 screw
227 washer
228 opening
230 bulk bag main body heat sealing machinery
231 heat seal bar assembly for discharge tube and bottom joint
232 heat seal bar assembly for bottom and body joint
233 heat seal bar assembly for label/tag joint
234 heat seal bar assembly for body and top joint
235 heat seal bar assembly for top and fill spout joint
236 table
237 heat seal bar
240 lift loop assembly and bottom cover/diaper heat seal machine
241 heat seal bar assembly for lift loop assembly joints
242 heat seal bar assembly for bottom cover/diaper joints
243 table
244 space/opening
245 lift loop patch heat seal bar
246 lift loop patch heat seal bar
250 carrier cart
251 carrier cart top assembly
252 platform
253 rod
260 carrier cart
261 carrier cart top assembly
262 platform
263 rod
300 bottom and discharge assembly
301 insert/reinforcer
302 arrow/insert location
303 arrow/zero point location
304 tape
305 insert line/narrower edge
306 insert line/wider edge
307 slit
308 arrow—space between gussets of discharge tube
309 line, top of discharge tube/spout
310 coating/over edge portion of coating
311 slit
312 insert opening
313 arrow—space between gussets of insert
314 heat seal bar
315 interior surface/inner side bottom
316 exterior surface/outer side bottom
317 bottom opening
318 bottom slit
319 flap/tab
320 flap/tab
321 flap/tab
322 flap/tab
323 fold line
324 open/unsealed bottom portion
325 bottom fold
326 bottom fold
327 bottom front side
328 bottom back side
331 bottom gusset portion
332 bottom gusset portion
333 insert gusset portion
334 insert gusset portion
335 insert exterior surface
336 insert interior surface
337 fusion coating/heat sealing coating
338 arrow
339 arrow
340 arrow
341 arrow
342 arrow
343 arrow
344 arrow
345 arrow
346 zero point reinforcing portion
347 bottom opening edge
348 discharge tube opening edge
349 insert opening edge when material is being discharged
350 insert opening edge when material is not being discharged
351 non-cross hatched portion/non-bonded portion/free portion of insert All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A flexible fabric bulk bag with a bottom and discharge assembly, the bottom and discharge assembly comprising:
   a) a bottom having a bottom inner surface and a bottom opening with a periphery, and comprising bottom fabric, and the bottom comprising a bottom expanded configuration and a bottom gusseted configuration;
   b) a discharge tube having a first open end and a second open end, and having a discharge tube expanded configuration and discharge tube gusseted configuration that is different from the bottom gusseted configuration;
   c) an insert that is formed from insert fabric that is separate from the discharge tube and bottom, the insert having an insert opening, and the insert having an insert gusseted configuration that is different from the discharge tube gusseted configuration;
   wherein the bottom inner surface is directly coupled to both the insert and to the discharge tube at a bottom-discharge tube connection and at a bottom-insert connection;
   wherein the discharge tube is connected to the bag at the bottom-discharge tube connection and wherein the insert is connected to the bag at the bottom-insert connection;
   wherein a portion of the insert that is not coupled to the bottom inner surface is also not coupled to the discharge tube and extends under the discharge tube at a location where the bottom inner surface is coupled to the discharge tube along the periphery of the bottom opening and reinforces the bottom-discharge tube connection; and wherein bulk material contained within the bag can be discharged through the insert opening, through the bottom opening, through the first open end of the discharge tube and through the second open end of the discharge tube.

2. The flexible fabric bulk bag of claim 1 wherein a heat seal coupler couples the bottom to the insert and to the discharge tube.

3. The flexible fabric bulk bag of claim 2 wherein the insert is not coupled to the discharge tube, and the bottom-discharge tube connection and the bottom-insert connection hold the bottom and discharge assembly together and in place on the bag.

4. The flexible fabric bulk bag of claim 2 wherein a portion of the discharge tube is also coupled to the insert.

5. The flexible fabric bulk bag of claim 2 wherein the heat seal coupler includes a heat seal coating on the bottom inner surface that forms a bond with a discharge tube coating that is on an outer surface of the discharge tube to form the bottom-discharge tube connection and forms another bond with an insert coating that is on an outer surface of the insert to form the bottom-insert connection.

6. The flexible fabric bulk bag of claim 5 wherein the heat seal coating on the bottom is different from the discharge tube coating and the insert coating.

7. The flexible fabric bulk bag of claim 1 wherein the bottom opening has a substantially square shape with bottom opening corners and wherein bottom slits extend from at or about the bottom opening corners into the bottom fabric.

8. The flexible fabric bulk bag of claim 7 wherein the insert opening has a substantially square shape with insert opening corners, and wherein an insert slit is included in between two of said insert opening corners.

9. The flexible fabric bulk bag of claim 8 wherein each insert slit is offset from a said bottom opening corner and from a said bottom slit such that the insert fabric reinforces the bottom opening corners.

10. The flexible fabric bulk bag of claim 9 wherein each insert slit is spaced away from a connection between the bottom inner surface and the insert and wherein the insert is not connected to another piece of fabric at a location of said insert slits.

11. The flexible fabric bulk bag of claim 8 wherein each said insert slit extends from the insert opening into insert fabric at an angle of about 90 degrees.

12. A flexible fabric bulk bag with a bottom and discharge assembly, the bottom and discharge assembly comprising:
a) a bottom having a bottom inner surface and a bottom opening with a periphery, and comprising bottom fabric;
b) a discharge tube having a first open end and a second open end;
c) an insert that is formed from insert fabric that is separate from the discharge tube and bottom, the insert having an insert opening;
  wherein the bottom inner surface is directly coupled to both the insert and to the discharge tube at a bottom-discharge tube connection and at a bottom-insert connection;
  wherein the discharge tube is connected to the bag at the bottom-discharge tube connection and wherein the insert is connected to the bag at the bottom-insert connection;
  wherein a portion of the insert that is not coupled to the bottom inner surface is also not coupled to the discharge tube and extends under the discharge tube at a location where the bottom inner surface is coupled to the discharge tube along the periphery of the bottom opening and reinforces the bottom-discharge tube connection; and
  wherein bulk material contained within the bag can be discharged through the insert opening, through the bottom opening, through the first open end of the discharge tube and through the second open end of the discharge tube;
  wherein the bottom opening has a substantially square shape with bottom opening corners and wherein bottom slits extend from at or about the bottom opening corners into the bottom fabric;
  wherein the insert opening has a substantially square shape with insert opening corners, and wherein an insert slit is included in between two of said insert opening corners; and
  wherein the bottom is adapted to be folded into a bottom gusseted configuration with a substantially trapezoidal shape that can be unfolded to a bottom expanded configuration.

13. The flexible fabric bulk bag of claim 12 wherein the insert is adapted to be folded into an insert gusseted configuration with a substantially trapezoidal shape that can be unfolded to an insert expanded configuration.

14. The flexible fabric bulk bag of claim 13 wherein the discharge tube is adapted to be folded into a discharge tube gusseted configuration with a shape that is not substantially trapezoidal and adapted to be unfolded to a discharge tube expanded configuration.

15. The flexible fabric bag of claim 14 wherein the bottom, the insert, and the discharge tube are overlapped together in an overlapped configuration while the bottom is in the bottom gusseted configuration, the insert is in the insert gusseted configuration and the discharge tube is in the discharge tube gusseted configuration, and wherein the bottom is coupled via heat sealing to the insert and to the discharge tube while in the overlapped configuration.

16. The flexible fabric bulk bag of claim 7 wherein the bottom slits extend from the bottom opening into the bottom fabric at an angle of about 45 degrees.

17. The flexible fabric bulk bag of claim 1 wherein the discharge tube first open end has a substantially square shape with discharge tube corners, and wherein a discharge tube slit extends from the discharge tube corners into discharge tube fabric.

18. The flexible fabric bulk bag of claim 17 wherein each said discharge tube slit extends into discharge tube fabric at an angle of about 90 degrees.

19. A flexible fabric bulk bag with a bottom and discharge assembly, the bottom and discharge assembly comprising:
a) a bottom comprising a substantially flat piece of bottom fabric having a bottom opening with a periphery, the bottom having a bottom gusseted configuration that has a bottom folded shape and having a bottom expanded configuration;
b) a discharge tube comprising a tubular piece of fabric and having a discharge tube first end that is open and a discharge tube second end that is open, and having a discharge tube gusseted configuration that has a discharge tube folded shape that is different from the bottom folded shape, and having a discharge tube expanded configuration; and c) a reinforcer comprising a substantially flat piece of reinforcer fabric, the reinforcer for reinforcing a connection between the bottom and the discharge tube, the reinforcer having a reinforcer opening, having a reinforcer gusseted configuration that has a reinforcer folded shape that is at least substantially the same as the bottom folded shape, and having a reinforcer expanded configuration, and wherein in the reinforcer folded shape there is a reinforcer first end that is open and a reinforcer second end that is open;

d) a bottom-discharge tube connection that connects the bottom to the discharge tube and a bottom-reinforcer connection that connects the bottom to the reinforcer, and wherein the discharge tube is connected to the bag at the bottom-discharge tube connection and wherein the reinforcer is connected to the bag at the bottom-reinforcer connection;

e) wherein the reinforcer is not coupled to the discharge tube; and f) wherein a portion of the reinforcer that is not connected to the bottom freely extends downward along the discharge tube and reinforces the bottom-discharge tube connection when the bottom is in the bottom expanded configuration, when the discharge tube is in the discharge tube expanded configuration, and when the reinforcer is in the reinforcer expanded configuration.

20. A flexible fabric bulk bag with a bottom and discharge assembly, the bottom and discharge assembly comprising:

a) a bottom comprising bottom fabric, the bottom having a bottom opening with a periphery, having a bottom gusseted configuration that has a bottom folded shape, and having a bottom expanded configuration;

b) a discharge tube comprising discharge tube fabric, the discharge tube having an interior surface, having a discharge tube first end that is open and a discharge tube second end that is open, having a discharge tube gusseted configuration that has a discharge tube folded shape that is different from the bottom folded shape, and having a discharge tube expanded configuration; and c) a reinforcer comprising reinforcer fabric with a reinforcer opening, the reinforcer having a reinforcer gusseted configuration that has a reinforcer folded shape that is different from the discharge tube folded shape, and having a reinforcer expanded configuration, and wherein in the reinforcer folded shape there is a reinforcer first end that is open and a reinforcer second end that is open;

d) a bottom-discharge tube connection that connects the bottom to the discharge tube and a bottom-reinforcer connection that connects the bottom to the reinforcer; and e) wherein the reinforcer is not coupled to the discharge tube and a portion of the reinforcer that is not coupled to the bottom freely extends downward along the interior surface of the discharge tube and strengthens the bottom-discharge tube connection when the bottom is in the bottom expanded configuration, when the discharge tube is in the discharge tube expanded configuration and when the reinforcer is in the reinforcer expanded configuration.

* * * * *